(12) United States Patent
Xiao et al.

(10) Patent No.: US 12,400,071 B2
(45) Date of Patent: Aug. 26, 2025

(54) COMMENT ADDING METHOD, ELECTRONIC DEVICE, AND RELATED APPARATUS

(71) Applicant: HUAWEI TECHNOLOGIES CO., LTD., Guangdong (CN)

(72) Inventors: Dong Xiao, Wuhan (CN); Zexi Chen, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 18/040,493

(22) PCT Filed: Jul. 29, 2021

(86) PCT No.: PCT/CN2021/109360
§ 371 (c)(1),
(2) Date: Feb. 3, 2023

(87) PCT Pub. No.: WO2022/028310
PCT Pub. Date: Feb. 10, 2022

(65) Prior Publication Data
US 2023/0306192 A1 Sep. 28, 2023

(30) Foreign Application Priority Data
Aug. 5, 2020 (CN) .......................... 202010778050.8

(51) Int. Cl.
*G06F 40/169* (2020.01)
*G06F 3/0354* (2013.01)
(Continued)

(52) U.S. Cl.
CPC ........ *G06F 40/169* (2020.01); *G06F 3/03545* (2013.01); *G06F 3/04883* (2013.01); *G06F 40/171* (2020.01); *G06F 2203/04808* (2013.01)

(58) Field of Classification Search
CPC .. G06F 40/169; G06F 40/171; G06F 3/03545; G06F 3/04883; G06F 2203/04808
See application file for complete search history.

(56) References Cited

U.S. PATENT DOCUMENTS

| | | | |
|---|---|---|---|
| 2012/0154295 | A1 | 6/2012 | Hinckley et al. |
| 2014/0098041 | A1 | 4/2014 | Ji et al. |
| | | (Continued) | |

FOREIGN PATENT DOCUMENTS

CN 110196675 A 9/2019

OTHER PUBLICATIONS

EP Communication Pursuant to Article 94(3) EPC in European Appln. No. 21854351.0, mailed on Nov. 15, 2024, 9 pages.
(Continued)

*Primary Examiner* — Haoshian Shih
(74) *Attorney, Agent, or Firm* — Fish & Richardson P.C.

(57) ABSTRACT

Example comment adding methods and communication terminals are disclosed. One example comment adding method includes displaying, by an electronic device, in a first region, first content at a content layer. The electronic device receives a first operation of a finger and a second operation of a stylus within a first preset duration range. The electronic device loads a comment layer on the content layer in response to the first operation and the second operation. The electronic device receives, at the comment layer in response to a third operation of the stylus, a first comment input by the stylus for the first content. The electronic device displays, in the first region in response to the first comment, the first content including the first comment. The first region is any region that can be displayed on the display, and a display position of the first content in the first region remains unchanged.

20 Claims, 24 Drawing Sheets

(51) Int. Cl.
*G06F 3/04883* (2022.01)
*G06F 40/171* (2020.01)

(56) References Cited

U.S. PATENT DOCUMENTS

| | | | |
|---|---|---|---|
| 2014/0267078 A1 | 9/2014 | Kukulski et al. | |
| 2016/0077663 A1 | 3/2016 | Durojaiye et al. | |
| 2017/0315974 A1* | 11/2017 | Kong | G06F 40/166 |
| 2017/0351650 A1* | 12/2017 | Yang | H04L 51/216 |
| 2018/0239482 A1* | 8/2018 | Hinckley | G06F 3/03545 |
| 2021/0227286 A1* | 7/2021 | Kusano | H04N 21/8133 |

OTHER PUBLICATIONS

International Search Report and Written Opinion in International Appln. No. PCT/CN2021/109360, mailed on Sep. 1, 16, 2021, 15 pages (with English translation).

\* cited by examiner

AAAAAAAAAAAAA aaaaaaaaaaaaaaaaaaaaaaaaaaaaaaaaaaaaaaaaaaaa
aaaaaaaaaaaaaaaaa
Key point 1 bbbbbbbbbbbbbbbbbbbbbbbbbbbbbbbbbbbbbbbbbbbb
bbbb

Key point 2
ccccccccccccccccccccccccccccccccccccccccccccccccc

FIG. 6A

AAAAAAAAAAAAA aaaaaaaaaaaaaaaaaaaaaaaaaaaaaaaaaaaaaaaaaaaa
aaaaaaaaaaaaaaaaa
Key point 1 bbbbbbbbbbbbbbbbbbbbbbbbbbbbbbbbbbbbbbbbbbbb
bbbb

FIG. 6B

COMMENT ADDING METHOD, ELECTRONIC DEVICE, AND RELATED APPARATUS

CROSS-REFERENCE TO RELATED APPLICATIONS

This application is a national stage of International Patent Application No. PCT/CN2021/109360, filed on Jul. 29, 2021, which claims priority to Chinese Patent Application No. 202010778050.8, filed on Aug. 5, 2020. Both of the aforementioned applications are hereby incorporated by reference in their entireties.

TECHNICAL FIELD

This application relates to the field of terminal technologies, and in particular, to a comment adding method, an electronic device, and a related apparatus.

BACKGROUND

As one of increasingly important functions of electronic devices such as a tablet computer, a comment function has been widely applied to people's work and learning, thereby improving people's work and learning efficiency.

The following describes several related technologies for implementing the comment function by the electronic device.

In a related technology 1, when the electronic device displays content by using a first application (application, APP), a user needs to set the first app and a notes app in a split-screen manner or set the notes app on an interface of the first app in a floating manner, so that the user can record a comment in the notes app.

In a related technology 2, when the electronic device displays content by using a first app, a user needs to exit the first app and open a notes app, so that the user can record a comment in the notes app.

In a related technology 3, when the electronic device displays content by using a first app, a user needs to perform a screenshot operation on the content currently displayed on the electronic device, and tap an editing operation button in a screenshot picture, so that the user can make a comment on the screenshot picture.

In conclusion, all the several related technologies can implement the comment function of the electronic device. However, in a process of implementing the comment function of the electronic device, to comment the content displayed on the electronic device, in the related technology 1 the user needs to perform the operation of split-screen setting or floating setting; in the related technology 2, the user needs to perform the operation of exiting the first app; and in the related technology 3, the user needs to perform the screenshot operation or the like. Consequently, the user has a large quantity of operation steps, and the displayed content cannot be directly commented. This is unfavorable to user experience.

SUMMARY

This application provides a comment adding method, an electronic device, and a related apparatus, to comment content displayed on the electronic device through cooperation between a stylus and a linger, thereby reducing operation steps of a user and improving user experience.

According to a first aspect, this application provides a comment adding method, including: An electronic device displays, in a first region, first content at a content layer, where the content layer is configured to store content that can be displayed on a display of the electronic device. The electronic device receives a first operation of a finger and a second operation of a stylus in a first preset duration range. The electronic device loads a comment layer on the content layer in response to the first operation and the second operation, where the comment layer is configured to receive content corresponding to a moving track formed by the stylus on the display. The electronic device receives, at the comment layer in response to a third operation of the stylus, a first comment input by the stylus for the first content in the first region. The electronic device displays, in the first region in response to the first comment, the first content including the first comment, where the first region is any region that can be displayed on the display, and a display position of the first content in the first region remains unchanged.

It may be understood that the display may include a display region and a non-display region, or the entire display may be a display region. The first region may be any part of the display region, or may be the entire display region. This is not limited in this application.

The first operation and the second operation may include but are not limited to operations such as tapping, double tapping, touching and holding, and sliding. For example, the first operation of the finger may be pressing the display by fingers whose quantity is greater than or equal to a preset quantity. The second operation of the stylus may be that touch pressure of the stylus is greater than or equal to preset pressure, and touch duration of the stylus is greater than or equal to preset duration. In addition, a hand of the finger performing the first operation and a hand using the stylus may be a same hand of a user, or may be different hands of the user. This is not limited in this application. The third operation may be understood as an operation corresponding to the moving track formed by the user on the display by using the stylus, for example, content such as a handwritten text, a letter, a pattern, a symbol, and a line.

According to the comment adding method provided in the first aspect, through cooperation between the finger and the stylus and based on hand touch information, stylus touch information, and a time interval for separately obtaining the hand touch information and the stylus touch information, the electronic device is quickly triggered to quickly provide a comment function for the user, so that the electronic device can add and display comment content in time, and the electronic device can complete interaction with a comment operation of the user when displaying any content. In this way, operation steps of the user are reduced, and a task procedure corresponding to content currently displayed on the electronic device does not need to be interrupted. In addition, an accidental touch during an operation of the user is prevented, application scenarios of the stylus are enriched, and user experience is improved. Moreover, the comment function of the electronic device can be implemented regardless of whether an application corresponding to the content currently displayed on the electronic device supports the comment function.

In a possible design, the method further includes: The electronic device displays, in the first region in response to a fourth operation of the finger, second content at the content layer, where the second content and the first content are continuous, and the first comment is not displayed in the first region. The electronic device displays, in the first region in response to a fifth operation of the finger, third content including the first comment, where the third content is content at the content layer, and the third content at least partially overlaps the first content.

It may be understood that the first content is related to the second content. In some embodiments, the first content and the second content are continuous, for example, the first content and the second content partially overlap; or positions of the first content and the second content are adjacent, and there is no content overlapping. In some other embodiments, positions of the first content and the second content are not adjacent, and there is no content overlapping. The third content and the first content may fully overlap, or may partially overlap, provided that the first comment is displayed when the third content is displayed on the display.

The fourth operation and the fifth operation may include but are not limited to operations such as tapping, double tapping, touching and holding, and sliding. The fourth operation is used to indicate continuing to browse content related to the first content, and the fifth operation is used to indicate obtaining the first comment. Specific implementations of the fourth operation and the fifth operation are not limited in this application.

For example, when the fourth operation is a sliding operation performed by the finger along a first direction on the display, the fifth operation is a sliding operation performed by the finger along a second direction on the display. Specific directions of the first direction and the second direction are not limited in this application, and the first direction and the second direction are opposite directions.

For another example, when the fourth operation is a tap operation performed by the finger on a next-page operation button, the fifth operation is a tap operation performed by the finger on a previous-page operation button. Alternatively, when the fourth operation is a tap operation performed by the finger on a previous-page operation button, the fifth operation is a tap operation performed by the finger on a next-page operation button. The tap operation may be N taps, where N is a positive integer.

For another example, when the fourth operation is a drag operation performed by the finger on a backward-dragging fast-forward operation button, the fifth operation is a drag operation performed by the finger on a forward-dragging fast-forward operation button. Alternatively, when the fourth operation is a drag operation performed by the finger on a forward-dragging fast-forward operation button, the fifth operation is a drag operation performed by the finger on a backward-dragging fast-forward operation button.

According to the possible design, the electronic device may display the content (for example, the second content) related to the first content in response to an operation of the finger, so that the user can continue to browse the content related to the first content. In this way, when the electronic device implements a task procedure of the comment function, the task procedure corresponding to the content currently displayed on the electronic device is not interrupted. In addition, in response to the operation of the finger, the electronic device may further display, from the content related to the first content, the third content including the first comment, so that the user can continue to browse and/or edit the first comment. In this way, when the electronic device implements a task procedure corresponding to content displaying, the task procedure of implementing the comment function by the electronic device is not interrupted. In this way, not only the electronic device can implement the task procedure corresponding to content displaying and the task procedure for implementing the comment function at the same time, but also the two task procedures do not affect each other, so that the content can be continuously displayed and the comment can be replayed and/or re-edited, thereby helping improve user experience.

In a possible design, the comment layer is further configured to store a correspondence between the first comment and the first content, and the content layer is further configured to store a correspondence between the third content and the first content. That the electronic device displays, in the first region, third content including the first comment includes: The electronic device determines a first position of the first comment in the third content based on the correspondence between the first comment and the first content and the correspondence between the third content and the first content, display the third content in the first region, and display the first comment at the first position in the third content. In this way, the electronic device determines, in a timely and accurate manner based on a position change corresponding to the operation of the finger, the third content that needs to be displayed on the display, and can accurately determine the position of the first comment in the third content based on a binding between the first comment and the first content and a correspondence between the first content and the second content, so that the user can replay the first comment.

In a possible design, a type of content displayed in the first region includes any one of a video, a web page, a picture, a document, or an interface. In this way, the electronic device can implement the comment function without being limited to the type of the content displayed in the first region. In addition, the electronic device is also limited to an application corresponding to the content displayed in the first region, and the electronic device can implement the comment function regardless of whether the application supports the comment function.

In a possible design, when the type of the content displayed in the first region is the web page, the correspondence between the first comment and the first content is a position of the first content on a web page on which the first content is located, or a position relationship between the first content and content other than the first content on the web page on which the first content is located. In this way, the electronic device may bind the first comment to the first content in a plurality of implementations, so that the user can replay the first comment.

In a possible design, after the electronic device displays, in the first region, the second content at the content layer, the method further includes: The electronic device receives, at the comment layer in response to a sixth operation of the stylus, a second comment input by the stylus for the second content in the first region. The electronic device displays, in the first region in response to the second comment, the second content including the second comment, where a display position of the second content in the first region remains unchanged. In this way, on a basis that the comment layer is loaded on the content layer, the electronic device continues to receive a comment at the comment layer, to implement a function of adding a comment to the displayed content, thereby helping meet a user requirement of adding a plurality of comments.

The sixth operation may be understood as an operation corresponding to the moving track formed by the user on the display by using the stylus, for example, content such as a handwritten text, a letter, a pattern, a symbol, and a line. In addition, the sixth operation may be the same as or different from the third operation. This is not limited in this application.

In a possible design, the method includes: The electronic device loads the comment layer on the content layer when a preset trigger condition is met. The preset trigger condition includes any one of the following: a quantity of fingers is greater than or equal to a preset quantity, touch pressure of the stylus is greater than or equal to preset pressure, and touch duration of the stylus is greater than or equal to preset duration; a distance between a touch position of the finger and a touch position of the stylus is less than or equal to a first preset distance; a quantity of fingers is greater than or equal to a preset quantity, touch pressure of the stylus is greater than or equal to preset pressure, touch duration of the stylus is greater than or equal to preset duration, and a distance between a touch position of the finger and a touch position of the stylus is less than or equal to a first preset distance; or a quantity of fingers is greater than or equal to a preset quantity, touch pressure of the stylus is greater than or equal to preset pressure, touch duration of the stylus is greater than preset duration, and a distance between different fingers is less than or equal to a second preset distance.

In this way, through cooperation between the finger and the stylus, not only the comment function of the electronic device is accurately triggered, but also a problem that the comment function of the electronic device is triggered due to an accidental touch operation of the user can be avoided, thereby improving user experience.

In a possible design, the comment layer is further configured to store the correspondence between the first comment and the first content, and the content layer is further configured to store a correspondence between the first content and content at the content layer. After the electronic device receives the first comment, the method further includes: The electronic device determines, in response to a seventh operation of the stylus or an eighth operation of the finger, fourth content at the content layer based on the correspondence between the first comment and the first content and the correspondence between the first content and the content at the content layer, where the fourth content at least partially overlaps the first content. The electronic device saves, based on a first format, the fourth content including the first comment, where the first format is related to the seventh operation or the eighth operation.

The seventh operation and the eighth operation may include but are not limited to operations such as tapping, double tapping, touching and holding, and sliding. For example, the seventh operation may be tapping, by the stylus, a control that is on the display and that is configured to save the first comment. The eighth operation may be an operation of tapping, by the finger, the control that is on the display and that is configured to save the first comment, or pressing, by the finger, a space region other than the control on the display, or the like. In addition, that the first format is related to the seventh operation or the eighth operation may be understood as follows: When receiving the seventh operation or the eighth operation, the electronic device may save the first comment and the fourth content in a default saving manner. Alternatively, the electronic device saves the first comment and the fourth content based on a saving manner corresponding to the seventh operation or the eighth operation.

In a possible design, the first format includes any one of a picture format, a portable document format PDF, or a text document TXT format. In this way, based on an intention of the user, the electronic device may use any one of the foregoing saving formats to save the displayed content including the comment content in a folder, a gallery, or a note, so that the user can browse and/or edit the first comment again in the folder, the gallery, or the note.

In a possible design, the comment layer is further configured to store a correspondence between the second comment and the second content, and the content layer is further configured to store a correspondence between the second content and the content at the content layer. After the electronic device receives the second comment, the method further includes: The electronic device determines, in response to an eleventh operation of the stylus or a twelfth operation of the finger, sixth content based on the correspondence between the second comment and the second content and the correspondence between the second content and the content at the content layer, where the sixth content at least partially overlaps the second content. The electronic device saves, based on a second format, the sixth content including the second comment, where the second format is related to the eleventh operation or the twelfth operation.

The eleventh operation and the twelfth operation may include but are not limited to operations such as tapping, double tapping, touching and holding, and sliding. For example, the eleventh operation may be tapping, by the stylus, a control that is on the display and that is configured to save the second comment. The twelfth operation may be an operation of tapping, by the finger, the control that is on the display and that is configured to save the second comment, or pressing, by the finger, a space region other than the control on the display, or the like. In addition, that the second format is related to the eleventh operation or the twelfth operation may be understood as follows: When receiving the eleventh operation or the twelfth operation, the electronic device may save the second comment and the sixth content in a default saving manner. Alternatively, the electronic device saves the second comment and the sixth content based on a saving manner corresponding to the eleventh operation or the twelfth operation.

In a possible design, the second format includes any one of the picture format, the portable document format PDF, or the text document TXT format. In this way, based on an intention of the user, the electronic device may use any one of the foregoing saving formats to save the displayed content including the comment content in a folder, a gallery, or a note, so that the user can browse and/or edit the second comment again in the folder, the gallery, or the note.

In a possible design, after the electronic device loafs the comment layer on the content layer, the method further includes: The electronic device receives a ninth operation of the finger and a tenth operation of the stylus within a second preset duration range. The electronic device displays, in the first region in response to the ninth operation and the tenth operation, fifth content at the content layer, where the fifth content is content displayed on the electronic device before the ninth operation and the tenth operation.

The ninth operation and the tenth operation may include but are not limited to operations such as tapping, double tapping, touching and holding, and sliding. For example, the ninth operation of the finger may be pressing the display by fingers whose quantity is greater than or equal to the preset quantity. The tenth operation of the stylus may be that the touch pressure of the stylus is greater than or equal to the preset pressure, and the touch duration of the stylus is greater than or equal to the preset duration. In addition, a hand of the finger performing the ninth operation and the hand using the stylus may be a same hand of the user, or may be different hands of the user. This is not limited in this application.

It should be noted that, this application is not limited to provide the comment function of the electronic device for the user in the foregoing implementations. For example, the user may tap, by using the finger, a control that is on the display and that is used to implement the foregoing process.

In a possible design, the method further includes: The electronic device deletes content from the comment layer when a preset release condition is met. In this way, storage space corresponding to the comment layer is moved for other use, thereby helping reduce storage space of the electronic device and improve a processing rate of the electronic device.

The preset release condition may include but is not limited to: whether the remaining storage space of the comment layer is less than a first preset threshold, whether storage duration of comment content and a correspondence is greater than preset duration, whether a sum of storage space of the comment content and the correspondence exceeds a second preset threshold, and the like. Specific values of the first preset threshold, the preset duration, and the second preset threshold are not limited in this application.

According to a second aspect, this application provides a communication apparatus, including: a display manager, configured to: obtain first content at a content layer from a displayed content storage module, where the content layer is configured to store content that can be displayed on a display electrically connected to an electronic device; and indicate a driver module to drive the display to display the first content in a first region; an input manager, configured to receive a first instruction, where the first instruction is used to indicate that the electronic device receives a first operation of a finger and a second operation of a stylus within a first preset duration range; and a window manager, configured to load a comment layer on the content layer in response to the first instruction, and create a stylus service cache module, where the comment layer is configured to receive content corresponding to a moving track formed by the stylus on the display, and the stylus service cache module is configured to store content at the comment layer. The input manager is further configured to receive a second instruction, where the second instruction is used to indicate that the electronic device receives a third operation of the stylus, the second instruction includes a first comment at the comment layer, and the first comment is content input by the stylus for the first content in the first region. The window manager is further configured to store the first comment in the stylus service cache module in response to the second instruction. The display manager is further configured to obtain the first comment from the stylus service cache module, and indicate the driver module to drive the display to display the first content including the first comment in the first region. The first region is any region that can be displayed on the display, and a display position of the first content in the first region remains unchanged.

In a possible design, the input manager is further configured to receive a third instruction, where the third instruction is used to indicate that the electronic device receives a fourth operation of the finger. The display manager is further configured to: in response to the third instruction, obtain second content at the content layer from the displayed content storage module, and indicate the driver module to drive the display to display the second content in the first region, where the second content and the first content are continuous, and the first comment is not displayed in the first region. The input manager is further configured to receive a fourth instruction, where the fourth instruction is used to indicate that the electronic device receives a fifth operation of the finger. The display manager is further configured to: in response to the fourth instruction, obtain third content at the content layer from the displayed content storage module, obtain the first comment from the stylus service cache module, and indicate the driver module to drive the display to display the third content including the first comment in the first region, where the third content at least partially overlaps the first content.

In a possible design, the displayed content storage module is further configured to store a correspondence between the third content and the first content. The window manager is further configured to store a correspondence between the first comment and the first content in the stylus service cache module in response to the second instruction. The display manager is specifically configured to: obtain the correspondence between the first comment and the first content from the stylus service cache module, obtain the correspondence between the third content and the first content from the displayed content storage module, determine a first position of the first comment in the third content based on the correspondence between the first comment and the first content and the correspondence between the third content and the first content, obtain the third content from the displayed content storage module, obtain the first comment from the stylus service cache module, and indicate the driver module to drive the display to display the third content in the first region and display the first comment at the first position in the third content.

In a possible design, a type of content displayed in the first region includes any one of a video, a web page, a picture, a document, or an interface.

In a possible design, when the type of the content displayed in the first region is the web page, the correspondence between the first comment and the first content is a position of the first content on a web page on which the first content is located, or a position relationship between the first content and content other than the first content on the web page on which the first content is located.

In a possible design, the input manager is further configured to receive a fifth instruction, where the fifth instruction is used to indicate that the electronic device receives a sixth operation of the stylus, the fifth instruction includes a second comment at the comment layer, and the second comment is content input by the stylus for the second content in the first region. The window manager is further configured to store the second comment in the stylus service cache module in response to the fifth instruction. The display manager is further configured to obtain the second comment from the stylus service cache module, and indicate the driver module to drive the display to display the second content including the second comment in the first region. A display position of the second content in the first region remains unchanged.

In a possible design, the first instruction is specifically used to indicate that the first operation of the finger and the second operation of the stylus that are received by the electronic device within the first preset duration range meet a preset trigger condition. The preset trigger condition includes any one of the following: a quantity of fingers is greater than or equal to a preset quantity, touch pressure of the stylus is greater than or equal to preset pressure, and touch duration of the stylus is greater than or equal to preset duration; a distance between a touch position of the finger and a touch position of the stylus is less than or equal to a first preset distance; a quantity of fingers is greater than or equal to a preset quantity, touch pressure of the stylus is greater than or equal to preset pressure, touch duration of the stylus is greater than or equal to preset duration, and a distance between a touch position of the finger and a touch position of the stylus is less than or equal to a first preset distance; or a quantity of fingers is greater than or equal to a preset quantity, touch pressure of the stylus is greater than or equal to preset pressure, touch duration of the stylus is greater than preset duration, and a distance between different fingers is less than or equal to a second preset distance.

In a possible design, the displayed content storage module is further configured to store a correspondence between the first content and content at the content layer. The window manager is further configured to store the correspondence between the first comment and the first content in the stylus service cache module in response to the second instruction. The input manager is further configured to receive a sixth instruction, where the sixth instruction is used to indicate that the electronic device receives a seventh operation of the stylus or an eighth operation of the finger. A content provider is configured to determine, in response to the sixth instruction, fourth content at the content layer based on the correspondence between the first comment and the first content and the correspondence between the first content and the content at the content layer, where the fourth content at least partially overlaps the first content. The content provider is further configured to obtain the fourth content from the displayed content storage module, obtain the first comment from the stylus service cache module, and indicate the driver module to drive a memory that is electrically connected to the electronic device to save, based on a first format, the fourth content including the first comment, where the first format is related to the seventh operation or the eighth operation.

In a possible design, the first format includes any one of a picture format, a portable document format PDF, or a text document TXT format.

In some embodiments, the displayed content storage module is further configured to store a correspondence between the second content and the content at the content layer. The window manager is further configured to store the correspondence between the second comment and the second content in the stylus service cache module in response to the fifth instruction. The input manager is further configured to receive an eighth instruction, where the eighth instruction is used to indicate that the electronic device receives an eleventh operation of the stylus or a twelfth operation of the finger. The content provider is configured to determine, in response to the eighth instruction, sixth content at the content layer based on the correspondence between the second comment and the second content and the correspondence between the second content and the content at the content layer, where the sixth content at least partially overlaps the second content. The content provider is further configured to obtain the sixth content from the displayed content storage module, obtain the second comment from the stylus service cache module, and indicate the driver module to drive the memory that is electrically connected to the electronic device to save, based on a second format, the sixth content including the second comment, where the second format is related to the eleventh operation or the twelfth operation.

In some embodiments, the second format includes any one of the picture format, the portable document format PDF, or the text document TXT format.

In a possible design, the input manager is further configured to receive a seventh instruction, where the seventh instruction is used to indicate that the electronic device receives a ninth operation of the finger and a tenth operation of the stylus within a second preset duration range. The display manager is further configured to: in response to the seventh instruction, obtain fifth content at the content layer from the displayed content storage module, and indicate the driver module to drive the display to display the fifth content in the first region, where the fifth content is content displayed before the electronic device responds to the ninth operation and the tenth operation.

In a possible design, the communication apparatus further includes: the window manager is further configured to: in response to the seventh instruction, when a preset release condition is met, delete content from the comment layer, and delete the stylus service cache module from the content provider.

For beneficial effects of the communication apparatus provided in the second aspect and the possible designs of the second aspect, refer to the beneficial effects brought by the first aspect and the possible implementations of the first aspect. Details are not described herein again.

According to a third aspect, this application provides an electronic device including a display, a sensor, a processor, and a memory. The electronic device is configured to be electrically connected to a stylus, the stylus is configured to form a moving track on the display, the memory is coupled to the processor, the memory is configured to store computer program code, and the computer program code includes computer instructions. When the processor executes the computer instructions, the electronic device performs the comment adding method according to the first aspect and any possible design of the first aspect.

Parameters such as quantities and types of displays, sensors, processors, and memories are not limited in this application.

According to a fourth aspect, this application provides an electronic device, including a processor and a memory. The memory is coupled to the processor. The memory is configured to store computer program code, and the computer program code includes computer instructions. When the processor executes the computer instructions, the electronic device is enabled to perform the comment adding method according to any one of the first aspect and the possible designs of the first aspect.

Parameters such as quantities and types of processors and memories are not limited in this application.

According to a fifth aspect, this application provides an electronic device, including a communication apparatus configured to perform any one of the second aspect or the possible designs of the second aspect.

According to a sixth aspect, this application provides a communication system, including a stylus and the electronic device according to any one of the second aspect and the possible designs of the second aspect. The stylus is configured to form a moving track on a display electrically connected to the electronic device.

According to a seventh aspect, this application provides a chip system. The chip system is applied to an electronic device including a memory, a display, and a sensor, and the chip system includes one or more interface circuits and one or more processors. The interface circuit and the processor are interconnected through a line. The interface circuit is configured to receive a signal from the memory, and send the signal to the processor. The signal includes computer instructions stored in the memory. When the processor executes the computer instructions, the electronic device performs the comment adding method according to any one of the first aspect or the possible designs of the first aspect.

The chip system may include one chip, or may include a plurality of chips. When the chip system includes a plurality of chips, parameters such as a type and a quantity of the chips are not limited in this application.

According to an eighth aspect, this application provides a computer-readable storage medium. The computer-readable storage medium stores instructions, and when the instructions are run on an electronic device, the electronic device is enabled to perform the comment adding method according to any one of the first aspect or the possible designs of the first aspect.

According to a ninth aspect, an embodiment of this application provides a computer program product. When the computer program product is run on a computer, the computer is enabled to perform the comment adding method according to any one of the first aspect and the possible designs of the first aspect.

BRIEF DESCRIPTION OF DRAWINGS

FIG. 6A to FIG. 6D are schematic diagrams of a picture according to an embodiment of this application;

DESCRIPTION OF EMBODIMENTS

Figure 1:
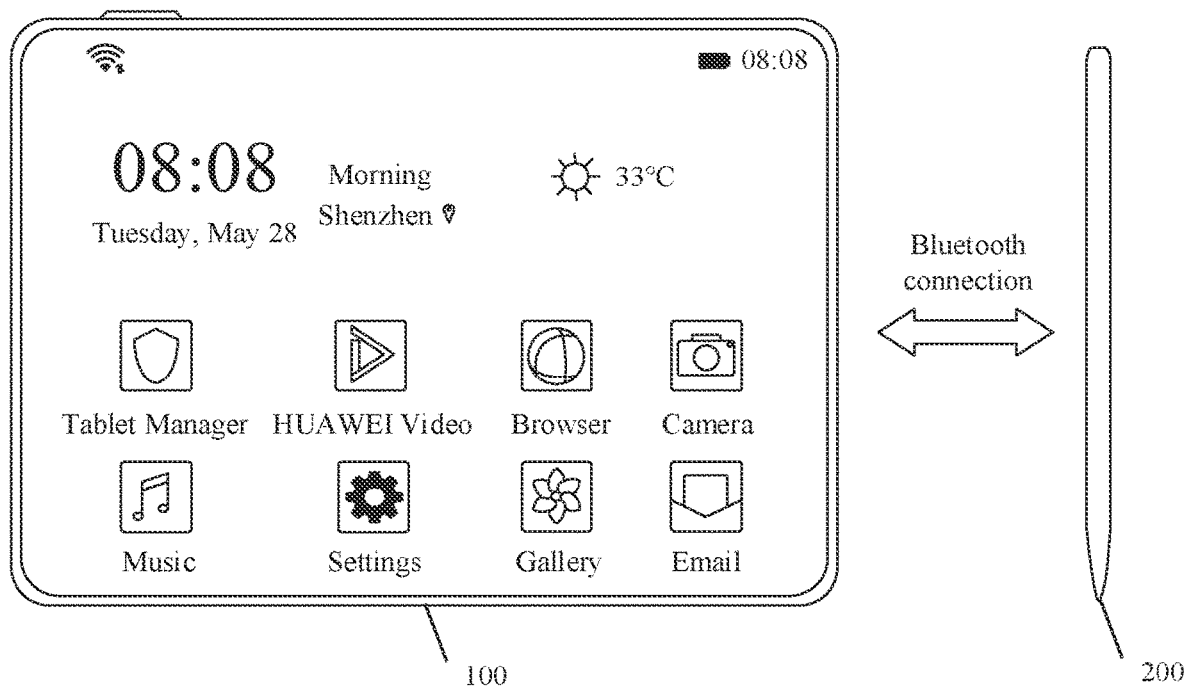
FIG. 1 is a schematic diagram of an application scenario of an electronic device and a stylus according to an embodiment of this application.

In this application, "at least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" generally represents an "or" relationship between the associated objects. At least one of the following items (pieces) or a similar expression thereof indicates any combination of these items, including a single item (piece) or any combination of a plurality of items (pieces). For example, at least one of a, b, or c may represent: a, b, c, combination of a and b, a combination of a and c, a combination of b and c, or a combination of a, b and c, where each of a, b, and c may be in a singular form or a plural form. In addition, terms "first" and "second" are merely used for a purpose of description, and shall not be understood as an indication or implication of relative importance.

This application provides a comment adding method, and the method may be applied to electronic devices such as a tablet computer, a notebook computer, an ultra-mobile personal computer (ultra-mobile personal computer, UMPC), a netbook, a personal digital assistant (personal digital assistant, PDA), a mobile phone, a wearable device, a vehicle-mounted device, an augmented reality (augmented reality, AR)/virtual reality (virtual reality, VR) device, and a smart television. This is not limited in this application. For ease of description, an example in which the electronic device in this application is a tablet computer is used for illustration.

In this application, in response to an operation such as tapping, double-tapping, touching and holding, or sliding that is performed when a finger touches a display, an electronic device 100 may detect a signal (for example, an electrical signal such as a capacitance signal or a resistance signal) generated when the finger touches the display, and obtain corresponding hand touch information. It should be noted that touching the display by a finger is not equivalent to touching the display by a palm of a user. In this application, an area of a touch region, an area and a shape of a touch region, or the like may be used to distinguish whether the display is touched by the finger or the palm of the user. In some embodiments, a diameter of a touch region of a thumb of a person is generally about 7 mm to 10 mm. Therefore, in this application, a touch operation corresponding to a touch region whose area is greater than equal to 30 mm may be determined as a touch operation of the palm of the user, and a touch operation corresponding to a touch region whose area is less than 30 mm may be determined as a touch operation of a hand of the user.

Specific content of the hand touch information is not limited in this application. For example, the hand touch information may include but is not limited to a quantity N of fingers, a distance M2 between different fingers, touch pressure of the finger, touch duration of the finger, a touch area of the finger, a touch shape of the finger, a touch position (namely, coordinates on the display) of the finger, and the like. It should be noted that the user may also use the finger to write information such as a text on the display of the electronic device 100.

As shown in FIG. 1, the electronic device 100 may further carry a stylus 200. The stylus 200 may be a resistive stylus, an electromagnetic stylus, or a capacitive stylus. This is not limited in this application. The stylus 200 may communicate with the electronic device 100 through wireless communication such as Bluetooth, Wi-Fi, or ZigBee. For ease of description, in FIG. 1, an example in which the electronic device 100 is a tablet computer and the electronic device 100 communicates with the stylus 200 through Bluetooth is used for illustration.

In one aspect, in response to an operation such as tapping, double-tapping, touching and holding, or sliding that is performed when the user touches the display by using the stylus 200, the electronic device 100 may detect a signal (for example, an electrical signal such as a capacitance signal or a resistance signal) generated when the stylus 200 touches the display, and obtain corresponding stylus touch information.

Specific content of the stylus touch information is not limited in this application. For example, the stylus touch information may include but is not limited to touch pressure F of the stylus 200, touch duration T of the stylus 200, a touch frequency of the stylus 200, a touch area of the stylus 200, a touch shape of the stylus 200, a touch position (namely, coordinates on the display) of the stylus 200, and the like.

In another aspect, the user may use the stylus 200 to perform an operation of writing content such as a text, a letter, a pattern, a symbol, or a line on the display of the electronic device 100. In this case, in response to the operation, the electronic device 100 may detect a moving track formed by the stylus 200 on the display of the electronic device 100, and recognize content corresponding to the moving track formed by the stylus 200 on the display of the electronic device 100, and can display the content on a display 103 of the electronic device 100. In addition, the electronic device 100 may further record, in the electronic device 100, the content corresponding to the moving track formed by the stylus 200 on the display 103 of the electronic device 100.

In conclusion, the electronic device 100 can not only obtain the hand touch information and the stylus touch information, but also recognize the content corresponding to the moving track formed by the stylus 200 on the display 103. In addition, the electronic device 100 may further distinguish between the hand touch information and the stylus touch information.

In some embodiments, a frequency range (or an amplitude range or the like) in which the signal generated when the finger touches the display is located is generally different from a frequency range (or an amplitude range or the like) in which the signal generated when the stylus 200 touches the display is located. Therefore, the electronic device 100 may determine, based on a frequency range (or an amplitude range or the like) in which a signal is located, whether the signal is generated when the finger touches the display or the signal is generated when the stylus 200 touches the display, so as to determine whether obtained information is hand touch information or stylus touch information. It should be noted that this application is not limited to the foregoing manner of distinguishing between the hand touch information and the stylus touch information.

In addition, the electronic device 100 may further obtain a time interval between a response to a trigger operation of the finger and a response to a trigger operation of the stylus 200. The time interval is used to indicate synchronization between the trigger operation of the finger and the trigger operation of the stylus 200. A specific manner of representing the time interval between the two operations is not limited in this application. For example, the time interval may be represented by a time interval at which the electronic device 100 separately obtains the hand touch information and the stylus touch information.

In some embodiments, the time interval may be represented by an absolute value of a minimum difference (or a maximum difference, an average value, or the like) between a moment at which the electronic device 100 obtains the hand touch information through calculation based on the signal generated when the finger touches the display and a moment at which the electronic device 100 obtains the stylus touch information through calculation based on the signal generated when the stylus 200 touches the display.

In some other embodiments, the time interval information may be represented by an absolute value of a minimum difference (or a maximum difference, an average value, or the like) between a moment at which the electronic device 100 detects the signal generated when the finger touches the display and a moment at which the electronic device 100 detects the signal generated when the stylus 200 touches the display.

Generally, the absolute value being not in a preset duration range indicates that the trigger operation of the finger is not synchronous with the trigger operation of the stylus 200, and the absolute value being in the preset duration range indicates that the trigger operation of the finger is synchronous with the trigger operation of the stylus 200. A size of the preset duration range is not limited in this application.

The following describes a specific implementation of the electronic device 100 shown in FIG. 1.

Figure 2A:
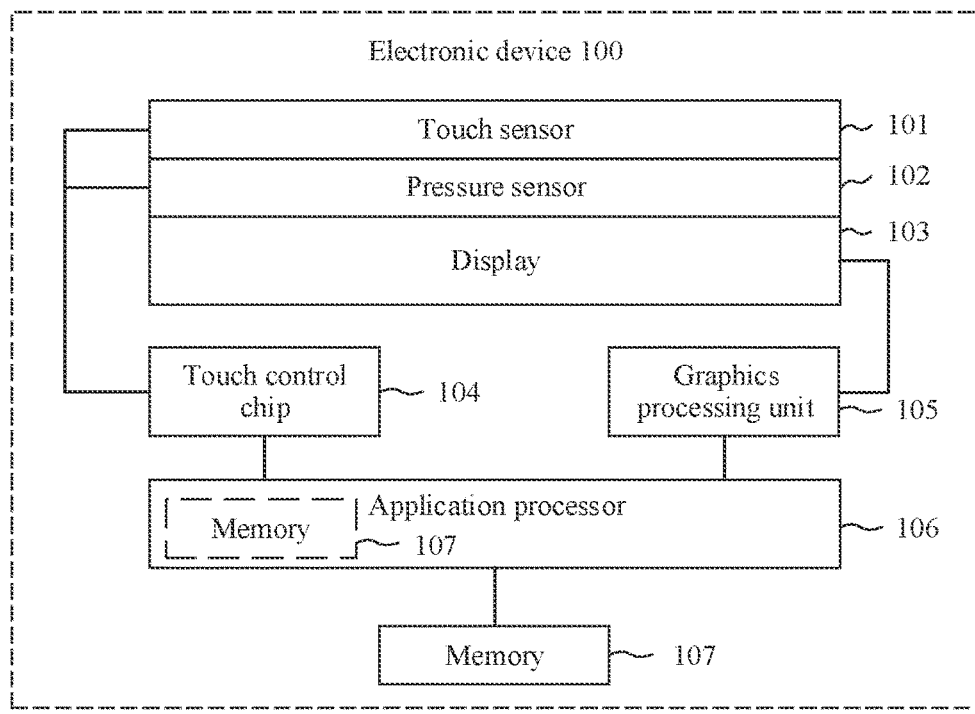
FIG. 2A is a diagram of a hardware architecture of an electronic device according to an embodiment of this application.

FIG. 2A is a diagram of a hardware architecture of the electronic device according to an embodiment of this application. As shown in FIG. 2A, the electronic device 100 may include a touch sensor 101, a pressure sensor 102, a display 103, a touch control chip 104, a graphics processing unit (graphics processing unit, GPU) 105, and an application processor (application processor, AP) 106. In addition, the electronic device 100 may further include a memory 107. Parameters such as a type, a quantity, and storage space of memories 107 are not limited in this application. In addition, the memory 107 may be disposed in an integrated manner with the application processor 106, or may be disposed separately from the application processor 106. This is not limited in this application.

The touch sensor 101 may also be referred to as a "touch panel". The touch sensor 101 may be disposed on the display 103. The touch sensor 101 and the display 103 form a touchscreen, which is also referred to as a "touch screen" The touch sensor 101 is configured to detect a touch operation performed on or near the touch sensor. The touch sensor 101 may transfer a detected touch operation to the application processor 106, to determine a type of the touch event. A visual output related to the touch operation may be provided through the display 103. In some other embodiments, the touch sensor 101 may alternatively be disposed on a surface of the electronic device 100 at a position different from that of the display 103.

The pressure sensor 102 is configured to sense a pressure signal, and may convert the pressure signal into an electrical signal. In some embodiments, the pressure sensor 102 may be disposed on the display 103. There is a plurality of types of pressure sensors 102, such as a resistive pressure sensor, an inductive pressure sensor, and a capacitive pressure sensor. The capacitive pressure sensor may include at least two parallel plates made of conductive materials. When a force is applied to the pressure sensor 102, capacitance between electrodes changes. The electronic device 100 determines pressure intensity based on the change in the capacitance. When a touch operation is performed on the display 103, the electronic device 100 detects intensity of the touch operation through the pressure sensor 102. The electronic device 100 may also calculate a touch position based on a detection signal of the pressure sensor 102. In some embodiments, touch operations that are performed at a same touch position but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The display 103 is configured to display an image, a video, and the like. The display 103 includes a display panel. The display panel may be a liquid crystal display (liquid crystal display LCD), an organic light-emitting diode (organic light-emitting diode, OLED), an active-matrix organic light emitting diode (active-matrix organic light emitting diode, AMOLED), flexible light-emitting diode (flexible light-emitting diode, FLED), a mini-LED, a micro-LED, a micro-OLED, a quantum dot light emitting diode (quantum dot light emitting diode, QLED), or the like. In sonic embodiments, the electronic device 100 may include one or N displays 103, where N is a positive integer greater than 1.

The electronic device 100 implements a display function through the GPU 105, the display 103, the application processor 106, and the like. The GPU 105 is a microprocessor for image processing, and connects the display 103 to the application processor 106. The GPU 105 is configured to perform mathematical and geometric calculation, and render an image. The electronic device 100 may include one or more GPUs that execute program instructions to generate or change display information.

In this application, the touch sensor 101 is configured to detect a signal generated by an operation of touching the display 103, for example, a signal (for example, a capacitance signal) generated by an operation of touching the display 103 by the stylus and a signal (for example, a capacitance signal) generated by an operation of touching the display 103 by the finger, and upload the signal generated by the operation of touching the display 103 to the touch control chip 104.

The pressure sensor 102 is configured to detect a signal generated by an operation of pressing the display 103, for example, a signal (for example, a resistance signal) generated by an operation of pressing the display 103 by the stylus and a signal (for example, a resistance signal) generated by an operation of pressing the display 103 by the finger, and upload the signal generated by the operation of pressing the display 103 to the touch control chip 104.

The touch control chip 104 may determine, based on the signal detected by the touch sensor 101 and the signal detected by the pressure sensor 102, hand touch information, stylus touch information, and a time interval between a moment at which the hand touch information is obtained and a moment at which the stylus touch information is obtained, and determine, based on the hand touch information, the stylus touch information, and the time interval between the moment at which the hand touch information is obtained and the moment at which the stylus touch information is obtained, whether the electronic device 100 meets a preset trigger condition.

When the electronic device 100 meets the preset trigger condition, the electronic device 100 may receive a moving track formed by the stylus 200 on the display 103, and display, on the display 103, content corresponding to the recognized moving track formed by the stylus 200 on the display 103. For ease of describing the foregoing content, an example in which the electronic device 100 enters a comment mode is used for description in this application.

When the electronic device 100 does not meet the preset trigger condition, the electronic device cannot display, on the display 103, the content corresponding to the moving track formed by the stylus 200 on the display 103. For example, the electronic device 100 may not receive the moving track formed by the stylus 200 on the display 103, or may not display, on the display 103, the content corresponding to the recognized moving track formed by the stylus 200 on the display 103. For ease of describing the foregoing content, an example in which the electronic device 100 cannot enter the comment mode is used for description in this application.

A specific implementation of the preset trigger condition is not limited in this application. In some embodiments, when the hand touch information indicates that the finger touches the display 103, the stylus touch information indicates that the stylus 200 touches the display 103, and the time interval between the moment at which the hand touch information is obtained and the moment at which the stylus touch information is obtained is within the preset duration range, the touch control chip 104 may determine that the electronic device 100 meets the preset trigger condition.

Figure 2B:
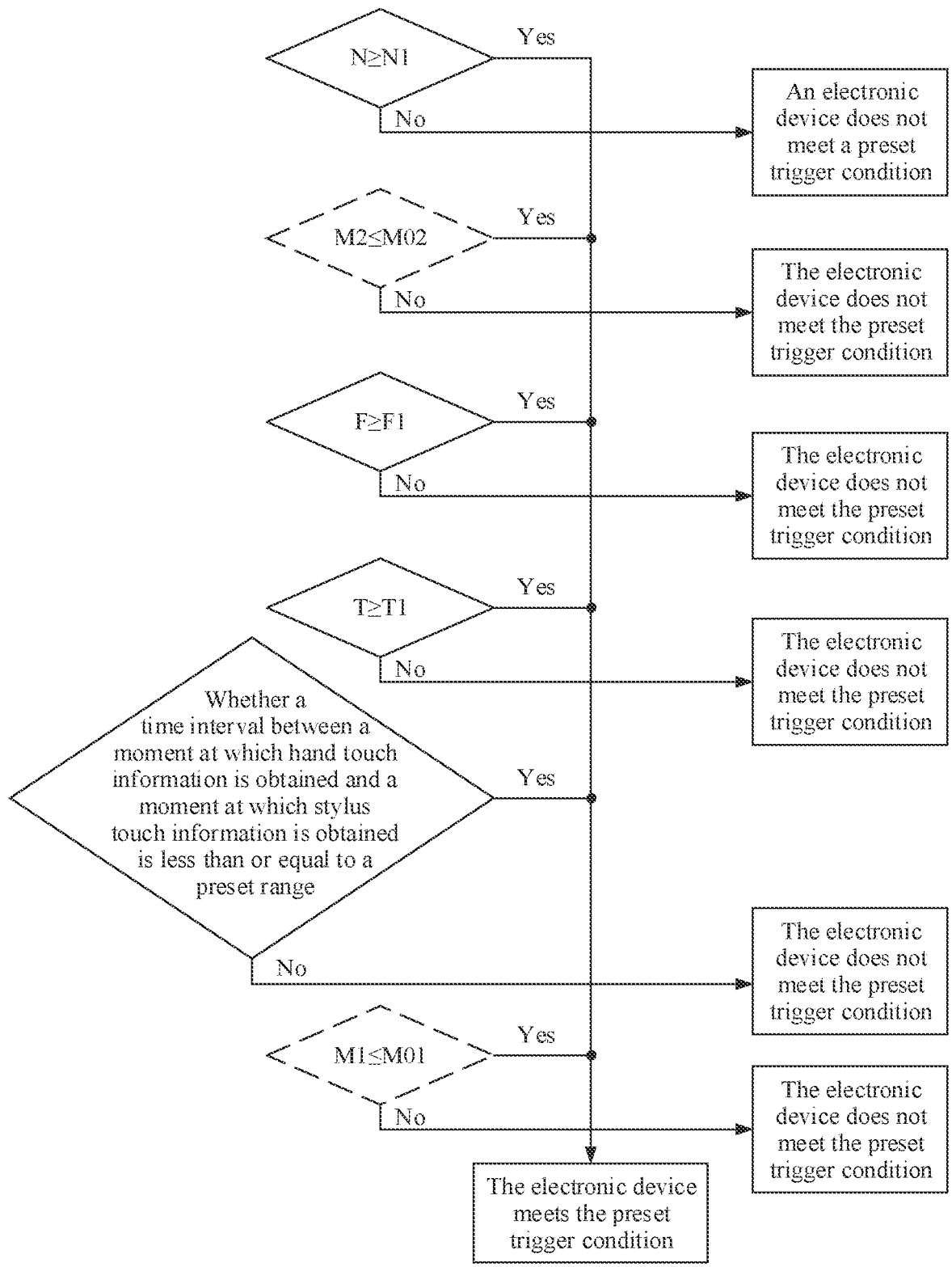
FIG. 2B is a block flowchart of determining whether an electronic device meets a preset trigger condition according to an embodiment of this application.

In this application, a plurality of implementations may be used to determine whether the hand touch information indicates that the finger touches the display 103. In a feasible implementation, as shown in FIG. 2B, if the quantity N of fingers in the hand touch information is greater than or equal to a preset quantity NI, it indicates that the hand touch information indicates that the finger touches the display 103. In this way, the electronic device 100 may accurately determine that the finger has an operation of touching the display 103, thereby avoiding a problem that the comment mode of the electronic device 100 is entered due to an accidental touch operation of the user, and improving user experience.

In this application, a plurality of implementations may be used to determine that the stylus touch information indicates that the stylus 200 touches the display 103. In a feasible implementation, as shown in FIG. 2B, if the touch pressure F of the stylus 200 in the stylus touch information is greater than or equal to preset pressure F1, and the touch duration T of the stylus 200 in the stylus touch information is greater than or equal to preset duration T1, it indicates that the stylus touch information indicates that the stylus touches the display 103. In this way, the electronic device 100 may accurately determine that the user has an operation of holding the stylus 200 and touching the display 103, thereby avoiding a problem that the comment mode of the electronic device 100 is entered due to an accidental touch operation of the stylus, and improving user experience of using the stylus.

In addition, on a basis that the foregoing preset trigger conditions are all met, still with reference to FIG. 2B, if a distance M1 between the touch position of the finger in the hand touch information and the touch position of the stylus 200 in the stylus touch information is less than or equal to a first preset distance M01, it may be accurately determined that the user uses one of the two hands to touch the display 103 by using the stylus 200, and uses a finger of the other hand to touch the display 103. In this case, the electronic device 100 may accurately determine an implementation in which the user triggers the electronic device 100 to enter the comment mode, thereby further improving accuracy of entering the comment mode by the electronic device 100.

Alternatively, if a distance M2 between different fingers in the hand touch information is less than or equal to a second preset distance M02, it may be accurately determined that the user uses one hand to touch the display 103 by using the stylus 200 and also uses a finger of the same hand to touch the display 103. In this case, the electronic device 100 may accurately determine an implementation in which the user triggers the electronic device 100 to enter the comment mode, thereby further improving accuracy of entering the comment mode by the electronic device 100.

In addition, the preset trigger condition may be further used to trigger the electronic device to implement a function such as screenshot or menu switching or invoke an application such as recording, and is not limited to triggering the electronic device to enter the comment mode in this application.

When determining that the electronic device 100 meets the preset trigger condition, the touch control chip 104 may send an instruction to the application processor 106, where the instruction is used to notify the application processor 106. A specific implementation of the instruction is not limited in this application. In this way, the application processor 106 provides, for the electronic device 100, storage space and a function service that are required by a comment function, so that the electronic device 100 implements the comment function.

Then the electronic device 100 meets the preset trigger condition, the touch control chip 104 determines, based on the signal detected by the touch sensor 101, the moving track formed by the stylus 200 on the display 103, and sends the moving track formed by the stylus 200 on the display 103 to the application processor 106. The application processor 106 recognizes the content corresponding to the moving track formed by the stylus 200 on the display 103, and displays, through the GPU 105 and the display 103, the content corresponding to the moving track formed by the stylus 200 on the display 103.

It should be noted that, in addition to the foregoing manner, the touch control chip 104 may alternatively transmit, to the application processor 106, the signal detected by the touch sensor 101 and the signal detected by the pressure sensor 102. The application processor 106 determines, based on the signal detected by the touch sensor 101 and the signal detected by the pressure sensor 102, the hand touch information, the stylus touch information, and the time interval between the moment at which the hand touch information is obtained and the moment at which the stylus touch information is obtained, so as to determine, based on the hand touch information, the stylus touch information, and the time interval between the moment at which the hand touch information is obtained and the moment at which the stylus touch information is obtained, whether the electronic device 100 meets the preset trigger condition. In addition, this application is not limited to the foregoing two implementations. For ease of description, the description of the first implementation is used as an example for illustration in this application.

In addition, in some embodiments, the electronic device 100 may alternatively use two separate touch control chips 104 to separately detect the signal generated when the stylus 200 touches the display 103 and the signal generated when the finger touches the display 103. In some other embodiments, the electronic device 100 may alternatively use separate touch control chips 104 to separately detect the signal detected by the touch sensor 101 and the signal detected by the pressure sensor 102.

A software system of the electronic device 100 may use a layered architecture, an event-driven architecture, a microkernel architecture, a micro service architecture, or a cloud architecture. A type of an operating system of the electronic device is not limited in this application. For example, the operating system may be an Android system, a Linux system, a Windows system, an iOS system, or a Harmony operating system (Harmony operating system, HarmonyOS). For ease of description, an Android system with a layered architecture is used as an example in this application. In this application, an example of a software structure of the electronic device 100 is described by using the example of the Android system with the layered architecture.

Figure 3:
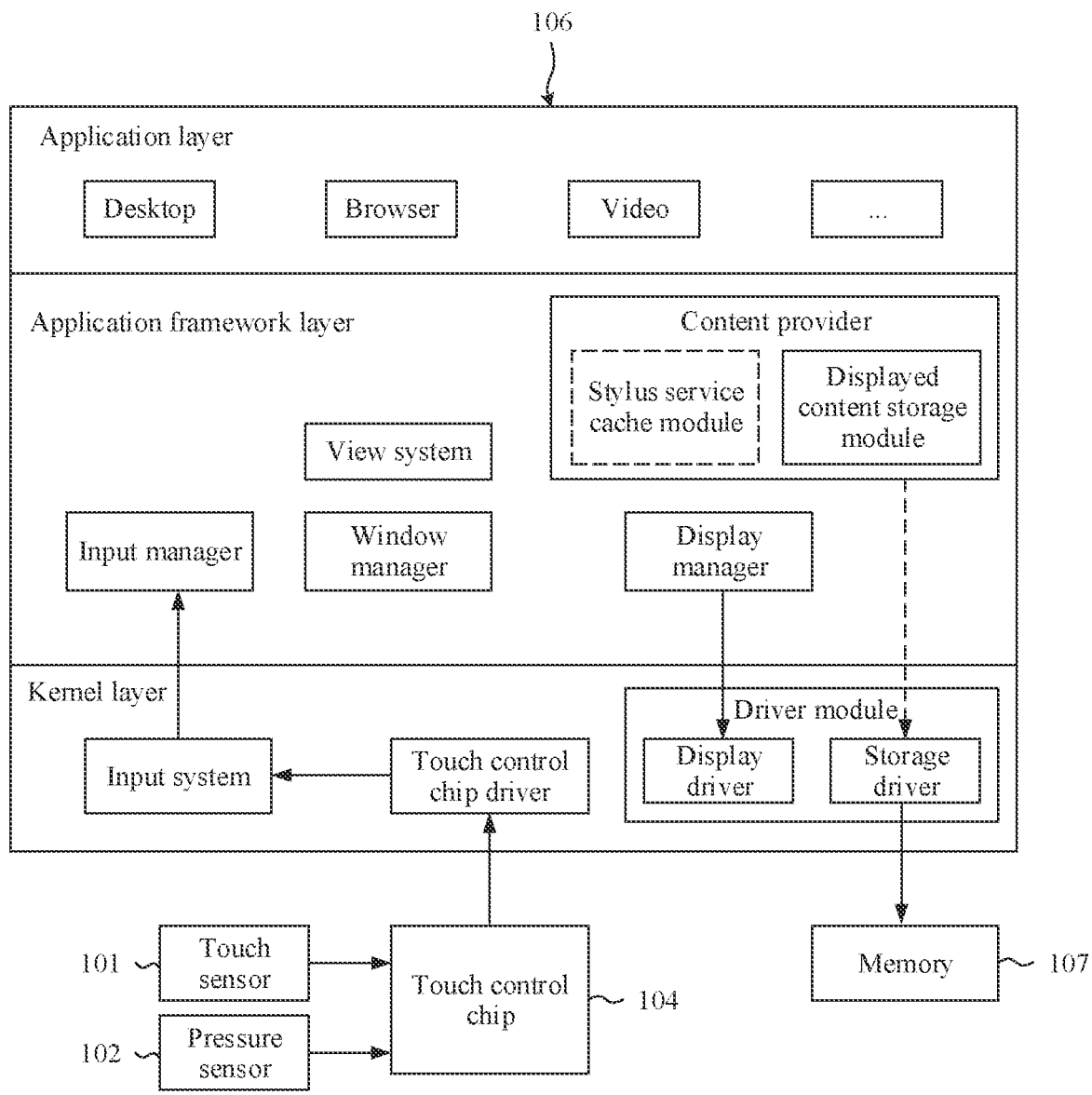
FIG. 3 is a block diagram of a structure including a system software architecture and a corresponding hardware component according to an embodiment of this application.

FIG. 3 is a block diagram of a structure including a system software architecture and a corresponding hardware component according to this application.

In the layered architecture, software is divided into several layers, and each layer has a clear role and task. The layers communicate with each other through a software interface. In some embodiments, the Android system is divided into five layers: an application layer, an application framework layer, an Android runtime (Android runtime) and system library (not shown in FIG. 3), a hardware abstraction layer (hard abstraction layer, HAL) (not shown in FIG. 3), and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Music, Videos, Game, Shopping, Traveling, Instant Messaging (for example, Messages). In addition, the application packages may further include system applications such as a home screen (namely, a desktop), a leftmost screen, a control center, and a notification center. For ease of description, in FIG. 3, an example in which the application layer includes the desktop application, a browser application, and a video application is used for illustration.

The leftmost screen may also be referred to as a "−1 screen", and refers to a user interface (user interface, UI) obtained by sliding rightward from the home screen of the electronic device until sliding to the leftmost split screen. For example, the leftmost screen may be used to place some quick service functions and notification messages, such as global search, a quick entry (a payment code, WeChat, or the like) of a page of an application, instant information, and reminders (express information, expenditure information, commuting road conditions, ride-hailing information, schedule information, and the like), and followed dynamic information (such as a football stand, a basketball stand, and stock information). The control center is a pull-down message notification bar of the electronic device, namely, a user interface displayed on the electronic device when the user performs a downward operation on the electronic device. The notification center is a pull-up message notification bar of the electronic device, namely, a user interface displayed on the electronic device when the user performs an upward operation on the electronic device.

The application framework layer provides an application programming interface (application programming interface, API) and a programming framework for an application at the application layer. The application framework layer includes some predefined functions.

As shown in FIG. 3, the application framework layer may include an input manager, a window manager, a content provider, a view system, a phone manager, a resource manager, a notification manager, a display manager, and the like. For ease of description, in FIG. 3, an example in which the application framework layer includes the input manager, the window manager, the content provider, the view system, and the display manager is used for illustration. It should be noted that any two modules of the input manager, the window manager, the content provider, the view system, and the display manager may invoke each other.

The input manager is configured to receive an instruction or a request reported by a lower layer such as the kernel layer or the hardware abstraction layer.

The window manager is configured to manage a window program. The window manager may obtain a size of the display, determine whether there is a status bar, perform screen locking, take a screenshot, and the like.

In this application, the window manager is configured to load a comment layer on a content layer when the electronic device 100 meets the preset trigger condition, that is, the comment layer covers the content layer.

The content layer is configured to receive displayed content in the memory 107, and render the displayed content. The displayed content is content that can be displayed on the display 103. The displayed content may include but is not limited to a web page, a document, a video, a picture, or the like. In addition, the displayed content may also include interface content displayed by a lock screen app, interface content displayed by the desktop app, interface content displayed by the map app, interface content displayed by a settings app, interface content displayed by a ride-hailing app, and the like. The displayed content may be content pre-stored in the memory 107, or may be content obtained by the electronic device 100 from a server corresponding to the displayed content and stored in the memory 107. In some embodiments, the electronic device 100 may display the displayed content on the display 103 by using an application such as the system app or a third-party app. The application may support a comment function, or may not support the comment function. This is not limited in this application. For example, the display 103 of the electronic device 100 may display a web page of the browser app, for example, a news resource, or may play a video in the video app, for example, an online course video, or may display a document in a folder app, for example, a document, a literature, or an email, or may display a picture in the gallery app.

In addition, a display manner of the displayed content is not limited in this application. For example, the user may browse all content of the displayed content displayed on the display 103 in a manner such as sliding up and down. For another example, the user may browse all content of the displayed content displayed on the display 103 in a manner such as page turning or dragging.

The comment layer is configured to receive comment content in the memory 107. The display may display content at the comment layer, or may display the content at the comment layer and content related to the content, such as a watermark or a logo. The comment content is content corresponding to a moving track formed by the user on the display 103 of the electronic device 100 by using the stylus 200 when the electronic device 100 meets the preset trigger condition. Specific content of the comment content is not limited in this application. For example, the comment content may include but is not limited to content such as a text, a letter, a pattern, a symbol, and a line.

It should be noted that storage space corresponding to the content layer in the memory 107 and storage space corresponding to the comment layer in the memory 107 are separated and do not interfere with each other, so that the displayed content may continue to be displayed on the display 103 when the user inputs the comment content by using the stylus 200.

The content provider is configured to: store and obtain data, and enable the data to be accessed by an application. The data may include a video, an image, audio, calls that are made and received, a browsing history and a bookmark, an address hook, and the like.

In this application, the content provider is configured to provide the displayed content and the comment content, and the content provider includes a displayed content storage module and a stylus service cache module. It should be noted that the stylus service cache module may not be disposed in the content provider, and may be independently disposed at the application framework layer.

The displayed memory storage module corresponds to the storage space corresponding to the content layer in the memory 107. The displayed content storage module is configured to provide storage space for storing the displayed content for the content layer, so that the electronic device 100 implements the display function.

The stylus service cache module corresponds to the storage space corresponding to the comment layer in the memory 107. The stylus service cache module is configured to provide storage space for storing the comment content for the comment layer, so that the electronic device 100 implements the comment function. For example, the stylus service cache module may store the comment content, or may store the comment content and a correspondence between the comment content and the displayed content. The correspondence max be understood as follows: The electronic device 100 may determine, based on the correspondence, a position of the comment content in the displayed content, so that the electronic device 100 can display, on the display 103, the displayed content including the comment content, thereby facilitating browsing by the user. A specific implementation of the correspondence is not limited in this application. In some embodiments, the correspondence may be represented by using a position of the displayed content.

For example, when the displayed content is a web page, the correspondence may be represented by using a position of a content block on the web page. The content block is a minimum composition unit of the web page. Generally, content of the web page may be divided into one or more content blocks based on a preset content block configuration, and a position of each content block on the web page is determined.

A position of any content block on the web page may be represented by using relative distances between the content block and another content block in a length direction and a width direction of the electronic device 100 separately. For example, a position of a content block 1 on the web page is coordinates (X, Y), where X represents a distance between a central position of the content block 1 and a central position of a content block 2 in the length direction of the electronic device 100, and Y represents a distance between the central position of the content block 1 and the central position of the content block 2 in the width direction of the electronic device 100.

In addition, the position of any content block on the web page may alternatively be represented by using relative distances between a central position of the content block and the web page in the length direction and the width direction of the electronic device 100 separately. For example, a position of the content block 1 on the web page is coordinates (X, Y), where X represents a distance between the central position of the content block 1 and a side edge of the web page in the length direction of the electronic device 100, and Y represents a distance between the central position of the content block 1 and a top edge of the web page in the width direction of the electronic device 100.

Therefore, the stylus service cache module stores the position of the content block on the web page as a correspondence between the comment content and the web page or a correspondence between the comment content and the content block, so that the electronic device 100 determines the position of the comment content on the web page based on the position of the content block on the web page.

For another example, when the displayed content is a document, the correspondence may be represented by using a content position in the document. For another example, when the displayed content is a video, the correspondence may be represented by using a frame quantity in the video and an image position of a frame corresponding to the frame quantity. For another example, when the displayed content is a picture, the correspondence may be represented by using an image position in the picture.

In addition, a storage manner of the comment content is not limited in this application. In some embodiments, comment content at different positions in the displayed content may be separately stored in the stylus service cache module and distinguished by using numbers or labels, or may be stored in the stylus service cache module as a whole. This is not limited in this application. It should be noted that the correspondence and the corresponding comment content are generally stored in the stylus service cache module together. In response to an operation of exiting the comment mode performed by the user, the electronic device 100 may not display, on the display 103, the content corresponding to the moving track formed by the stylus 200 on the display 103. For example, the electronic device 100 max not receive the moving track formed by the stylus 200 on the display 103, or may not display, on the display 103, the content corresponding to the recognized moving track formed by the stylus 200 on the display 103. For ease of describing the foregoing content, an example in which the electronic device 100 exits the comment mode is used for description in this application.

After the electronic device 100 exits the comment mode, when the stylus service cache module meets a preset release condition, the electronic device 100 may release content stored in the stylus service cache module, that is, delete the comment content and a binding relationship. In this way, the storage space corresponding to the comment layer in the memory 107 is moved for other use, thereby helping reduce storage space of the memory 107 and improving a processing rate of the electronic device 100.

The preset release condition may include but is not limited to: whether the remaining storage space of the stylus service cache module is less than a first preset threshold, whether storage duration of the comment content and the correspondence is greater than preset duration, whether a sum of storage space of the comment content and the correspondence exceeds a second preset threshold, and the like. Specific values of the first preset threshold, the preset duration, and the second preset threshold are not limited in this application.

In some embodiments, the electronic device 100 may save, based on the correspondence and the comment content in the stylus service cache module, the displayed content including the comment content by using a picture format, a portable document format (portable document format, PDF), a text document TXT format, or the like. For example, the displayed content is saved in a gallery, a folder, or a note of the electronic device 100, to facilitate the user to browse and/or edit the comment content.

In addition, the stylus service cache module may alternatively be included at another layer, for example, the Android runtime and system library. The view system includes visual controls such as a control for displaying a text and a control for displaying a picture. The view system may be configured to construct an application. A display interface may include one or more views. For example, a display interface including an SMS message notification icon may include a text display view and an image display view.

In this application, the view system is configured to add a toolbar on the display 103 when the electronic device 100 meets the preset trigger condition. The toolbar is configured to process or edit attribute parameters such as a color and a thickness of the comment content, to conveniently remind the user that a comment operation may be performed on the display 103. An icon, a position, a layout, and a function of the toolbar are not limited in this application. The icon of the toolbar may be displayed on the display 103 in a floating manner. Alternatively, the icon may not be displayed on the display 103, to implement a hidden setting, and the icon is displayed on the display 103 when required by the user.

It should be noted that, when the user does not need to use the toolbar, the toolbar may not be displayed on the display 103 (for example, the toolbar is hidden). For example, if the toolbar is still not used after preset duration, the toolbar may not be displayed on the display 103. When the user needs to use the toolbar, the toolbar may be displayed on the display 103. For example, an operation button for expanding or hiding the toolbar may be disposed on the display 103, and the electronic device may display or hide the toolbar in response to a user operation of tapping the operation button.

The display manager is configured to transmit, to the kernel layer, an instruction used to display the displayed content or display the displayed content and the comment content. A correspondence of the instruction is not limited in this application.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG-4, H.264, MPS, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The hardware abstraction layer HAL layer is an interface layer between operating system software and hardware components, and provides an interface for interaction between upper-layer software and lower-layer hardware. The HAL layer abstracts bottom-layer hardware as software including a corresponding hardware interface, and setting of a bottom-layer hardware device may be implemented by accessing the HAL layer. For example, a related hardware component may be enabled or disabled at the HAL layer. In some embodiments, a core architecture of the HAL layer includes at least one of C++ or C.

The kernel layer is a layer between hardware and software. The kernel layer includes at least a display driver, a camera driver, an audio driver, a sensor driver, a touch control chip driver, an input (input) system, and the like. For ease of description, in FIG. 3, an example in which the kernel layer includes the input system, the touch control chip driver, the display driver, and a storage driver is used for illustration. The display driver and the storage driver may be jointly disposed in a driver module.

It may be understood that the structure illustrated in this application does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

With reference to FIG. 3, a specific working principle for implementing the comment adding method in this application by the electronic device 100 is described.

1. The electronic device 100 enters the comment mode.

As shown in FIG. 3, first content at the content layer is displayed on the display 103 of the electronic device. The first content may be a part of the displayed content, or may be all of the displayed content.

When both the finger and the stylus touch the display 103, the touch sensor 101 of the electronic device 100 may detect a signal generated by a touch operation of the finger and a signal generated by a touch operation of the stylus, and report the signals to the touch control chip 104 of the electronic device 100. The pressure sensor 102 of the electronic device 100 may detect a signal generated by the touch operation of the finger and a signal generated by, the touch operation of the stylus, and report the signals to the touch control chip 104 of the electronic device 100.

The touch control chip 104 may determine, based on the signals detected by the touch sensor 101 and the signals detected by the pressure sensor 102, hand touch information, stylus touch information, and a time interval between a moment at which the hand touch information is obtained and a moment at which the stylus touch information is obtained, and determine, based on the hand touch information, the stylus touch information, and the time interval between the moment at which the hand touch information is obtained and the moment at which the stylus touch information is obtained, whether the electronic device 100 meets the preset trigger condition, so as to determine whether the electronic device 100 enters the comment mode.

When determining that the electronic device 100 meets the preset trigger condition, the touch control chip 104 may send an instruction to the touch control chip driver at the kernel layer, where the instruction is used to notify the application processor 106. The touch control chip driver at the kernel layer sends the instruction to the input system at the kernel layer. The input system at the kernel layer reports the instruction to the input manager at the application framework layer. Representation forms of the instruction may be the same or different. This is not limited in this application.

The input manager at the application framework layer invokes the window manager at the application framework layer, to load the comment layer on the content layer, that is, create the stylus service cache module, so as to open storage space for the comment content at the comment layer or for the comment content and the correspondence.

In addition, the input manager at the application framework layer invokes the view system at the application framework layer, to add a toolbar on the content layer, so as to remind the user that the stylus 200 may be used to perform a comment operation on the display 103. In this way, the user learns that the electronic device enters the comment mode.

2. The electronic device 100 adds and displays a first comment

When the user inputs the first comment by using the stylus 200, the comment layer receives the first comment, and the stylus service cache module stores the first comment or stores the first comment and a correspondence between the first comment and the first content. Storage of the correspondence between the first comment and the first content may be used to implement saving of the first comment. In addition, the correspondence between the first comment and the first content may alternatively be replaced with a correspondence between the first comment and the displayed content. This is not limited in this application.

The display manager at the application framework layer invokes the content provider at the application framework layer, to obtain the first content from the displayed content storage module, and obtain the first comment from the stylus service cache module. In addition, the display manager at the application framework layer transmits a request to the display driver at the kernel layer, where the request is used to display the first content including the first comment, or display the first content including the first comment and an icon of the toolbar. Therefore, the display driver drives the GPU 105 and the display 103 to display the first content including the first comment, or display the first content including the first comment and the icon of the toolbar.

3. The electronic device 100 saves the first comment.

After the electronic device 100 receives the first comment, if the stylus service cache module at the application framework layer stores the first comment and the correspondence between the first comment and the first content, the electronic device 100 may automatically save displayed content including the first comment, or may save the displayed content including the first comment in response to an operation of saving the first comment performed by the user. The displayed content herein may be the first content, or may be other content that partially overlaps or completely does not overlap the first content in the displayed content, or may be all content of the displayed content.

In some embodiments, the content provider at the application framework layer transmits a request to the storage driver at the kernel layer, where the request is used to save the first comment. Therefore, the storage driver drives the memory 107 to store the displayed content including the first comment.

In some other embodiments, if the user taps a save control that is configured to save the first comment and that is displayed on the display 103, the touch control chip 104 converts an electrical signal that corresponds to the tap operation and that is detected by the touch sensor 101 into an instruction, and transmits the instruction to the touch control chip driver at the kernel layer, where the instruction is used to instruct the application processor 106 to save the first comment. The touch control chip driver at the kernel layer transmits the instruction to the input system at the kernel layer, and the input system at the kernel layer reports the instruction to the input manager at the application framework layer. Representation forms of the instruction may be the same or different. This is not limited in this application.

The input manager at the application framework layer invokes the content manager at the application framework layer, to transmit a request to the storage driver at the kernel layer, where the request is used to save the first comment. Therefore, the storage driver drives the memory 107 to store the displayed content including the first comment.

4. The electronic device 100 adds and displays a second comment on the remaining content of the displayed content.

If the display 103 cannot display all the content of the displayed content, the user may continue to browse second content at the content layer displayed on the display 103. The second content is a part of the displayed content, and a position of the first comment in the displayed content is not included in a position region in which the second content is located. In some embodiments, the first content may partially overlap or completely not overlap the second content.

When the user inputs the second comment by using the stylus 200, the comment layer receives the second comment, and the stylus service cache module stores the second comment or stores the second comment and a correspondence between the second comment and the second content. Storage of the correspondence between the second comment and the second content may be used to implement saving of the first comment. In addition, the correspondence between the second comment and the second content may alternatively be replaced with a correspondence between the second comment and the displayed content. This is not limited in this application.

The display manager at the application framework layer invokes the content provider at the application framework layer, to obtain the second content from the displayed content storage module, and obtain the second comment from the stylus service cache module. In addition, the display manager at the application framework layer transmits a request to the display driver at the kernel layer, where the request is used to display the second content including the second comment, or display the second content including the second comment and the icon of the toolbar. Therefore, the display driver drives the GPU 105 and the display 103 to display the second content including the second comment, or display the second content including the second comment and the icon of the toolbar.

5. The electronic device 100 replays the first comment (the replaying mentioned in this application may be understood as browsing again).

In this case, if the electronic device 100 responds to an operation of replaying the first comment performed by the user, the touch control chip 104 converts an electrical signal that corresponds to the replay operation and that is detected by the sensor (namely, the touch sensor 101 and/or the pressure sensor 102) into an instruction, and transmits the instruction to the touch control chip driver at the kernel layer, where the instruction is used to instruct the application processor 106 to replay the first comment. The touch control chip driver at the kernel layer transmits the instruction to the input system at the kernel layer, and the input system at the kernel layer reports the instruction to the input manager at the application framework layer. Representation forms of the instruction may be the same or different. This is not limited in this application.

The display manager at the application framework layer invokes the content provider at the application framework layer, to obtain third content from the displayed content storage module, and obtain the first comment from the stylus service cache module. In addition, the display manager at the application framework layer transmits a request to the display driver at the kernel layer, where the request is used to display the third content including the first comment, or display the third content including the first comment and the icon of the toolbar. The third content is a part of the displayed content, and the position of the first comment in the displayed content is included in a position region in which the third content is located. In some embodiments, the third content may be the first content, or may be a part of the first content and a part of the second content. Therefore, the display driver drives the GPU 105 and the display 103 to display the third content including the first comment, or display the third content including the first comment and the icon of the toolbar.

6. The electronic device 100 saves the second comment.

After the electronic device 100 receives the second comment, if the stylus service cache module at the application framework layer stores the second comment and the correspondence between the second comment and the second content, the electronic device 100 may automatically save displayed content including the second comment, or may save the displayed content including the second comment in response to an operation of saving the second comment performed by the user. The displayed content herein may be the second content, or may be other content that partially overlaps the second content in the displayed content, or may be all content of the displayed content.

In some embodiments, the content provider at the application framework layer transmits a request to the storage driver at the kernel layer, where the request is used to save the second comment. Therefore, the storage driver drives the memory 107 to store the displayed content including the second comment.

In some other embodiments, if the user taps a save control that is configured to save the second comment and that is displayed on the display 103, the touch control chip 104 converts an electrical signal that corresponds to the tap operation and that is detected by the touch sensor 101 into an instruction, and transmits the instruction to the touch control chip driver at the kernel layer, where the instruction is used to instruct the application processor 106 to save the first comment and the second comment or save the second comment. The touch control chip driver at the kernel layer transmits the instruction to the input system at the kernel layer, and the input system at the kernel layer reports the instruction to the input manager at the application framework layer. Representation forms of the instruction may be the same or different. This is not limited in this application.

The input manager at the application framework layer invokes the content provider at the application framework layer, to transmit a request to the storage driver at the kernel layer, where the request is used to save the first comment and the second comment or save the second comment. Therefore, the storage driver drives the memory 107 to store displayed content including the first comment and the second comment, or the displayed content including the first comment and the displayed content including the second comment, or the displayed content including the second comment.

7. The electronic device 100 exits the comment mode.

The electronic device 100 may exit the comment mode at any moment after entering the comment mode. An example in which the electronic device 100 exits the comment mode after displaying the second content is used for description.

If the user taps an exit option that is used to skip displaying comment content and that is on the display 103, the touch control chip 104 converts an electrical signal that corresponds to the tap operation and that is detected by the touch sensor 101 into an instruction, and transmits the instruction to the touch control chip driver at the kernel layer, where the instruction is used to instruct the application processor 106 to skip displaying the comment content, that is, exit the comment mode of the electronic device 100. The touch control chip driver at the kernel layer transmits the instruction to the input system at the kernel layer, and the input system at the kernel layer reports the instruction to the input manager at the application framework layer. Representation forms of the instruction may be the same or different. This is not limited in this application.

The input manager at the application framework layer invokes the content provider at the application framework layer, to release all content stored in the stylus service cache module at the application framework layer, so that the electronic device 100 exits the comment mode. In this case, the electronic device 100 cannot continue to display the content corresponding to the moving track formed by the stylus 200 on the display 103. In addition, the input manager at the application framework layer invokes the display manager at the application framework layer, to transmit a request to the display driver at the kernel layer, where the request is used to display the second content not including the second comment. Therefore, the display driver may drive the GPU 105 and the display 103 to display the second content at a content layer 402. In addition, in response to the instruction, when the preset release condition is met, the stylus service cache module may release the first comment and the second comment, or release the first comment, the second comment, the correspondence between the first comment and the first content, and the correspondence between the second comment and the second content.

Figure 4A:
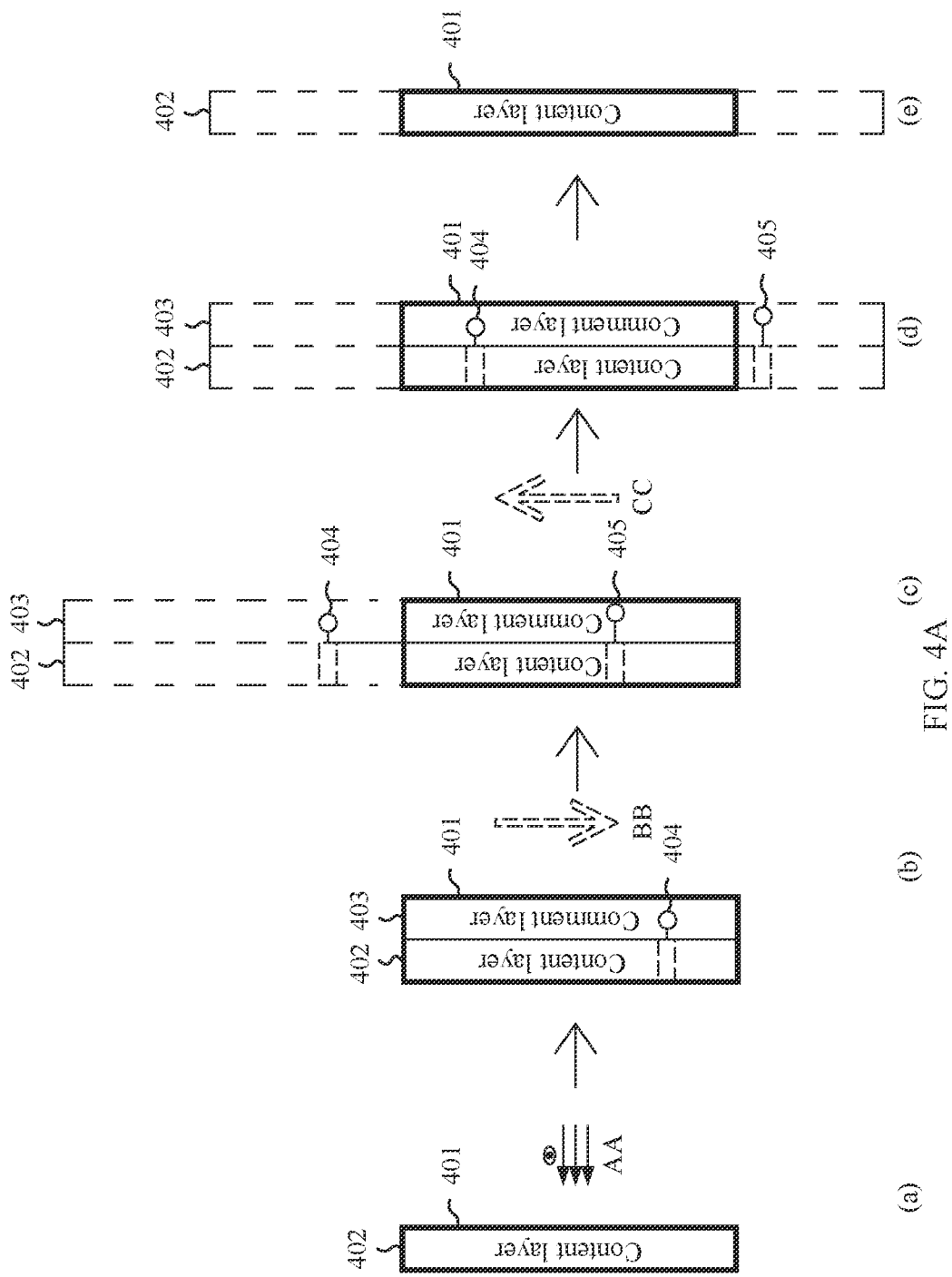
FIG. 4A and FIG. 4B are schematic diagrams of a position relationship between a content layer and a comment layer according to an embodiment of this application.
Figure 4B:
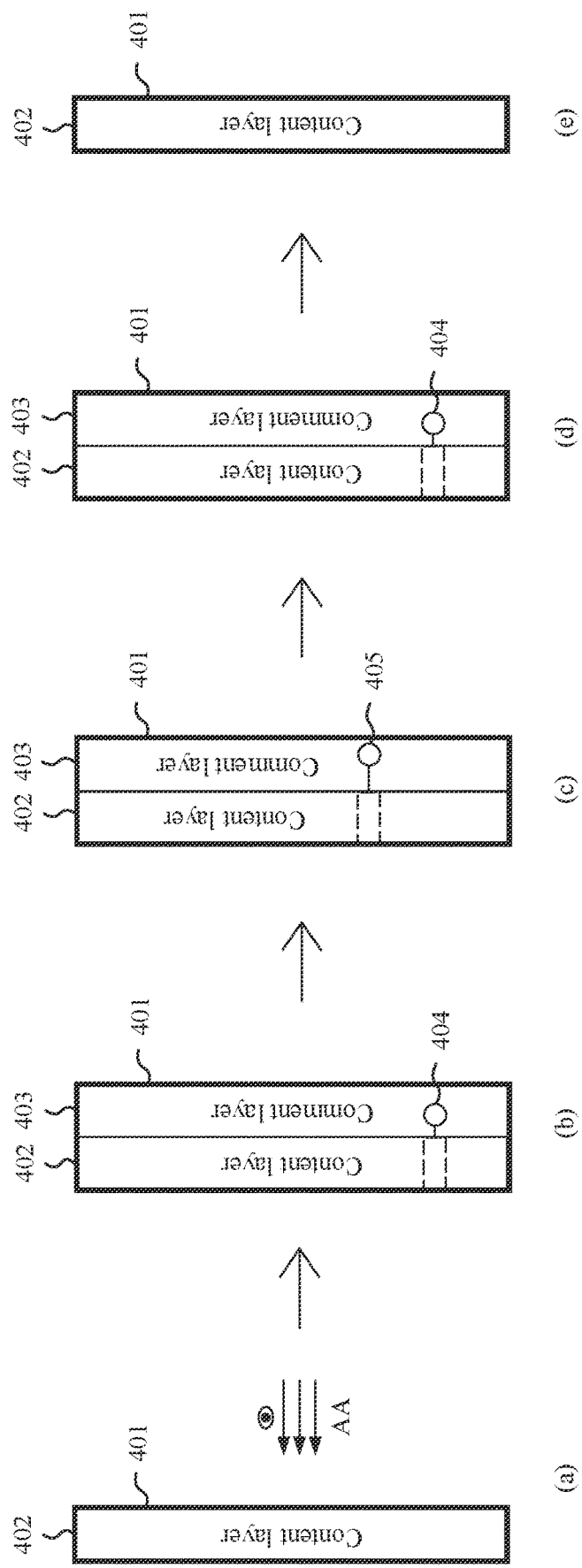

Based on the foregoing content and with reference to FIG. 4A and FIG. 4B, a position relationship between the comment layer and the content layer is described. For ease of description, in FIG. 4A, an example in which the user displays all content of the displayed content, in a manner such as sliding up and down, on the display 103 for browsing is used for illustration. In FIG. 4B, an example in which the user displays all content of the displayed content, in a manner such as page turning and dragging, on the display 103 for browsing is used for illustration. In addition, in FIG. 4A and FIG. 4B, a direction AA may be understood as follows: The user can view a display window 401 on the display along the direction AA.

As shown in (a) in FIG. 4A, the electronic device invokes the first content at the content layer 402, and displays, on the display, the first content at the content layer 402. When both the finger and the stylus touch the display of the electronic device, the electronic device determines, based on the hand touch information, the stylus touch information, and the time interval between the moment at which the hand touch information is obtained and the moment at which the stylus touch information is obtained, whether the electronic device meets the preset trigger condition, so as to determine whether the electronic device enters the comment mode.

When it is determined that the electronic device meets the preset trigger condition, as shown in (b) in FIG. 4A, the window manager at the application framework layer loads a comment layer 403 on the content layer 402, that is, the comment layer 403 covers the content layer 402, and a size of a coverage region of the comment layer 403 is the same as a size of a coverage region of the content layer 402. In addition, in this case, the view system at the application framework layer may add a toolbar to the content layer 402.

When the user inputs a first comment 404 by using the stylus, as shown in (b) in FIG. 4A, the comment layer 403 receives the first comment 404, and the stylus service cache module at the application framework layer stores the first comment 404 and a correspondence between the first comment 404 and the first content. For ease of description, in (b) in FIG. 4A, an example in which the first comment 404 is represented by a hollow circle is used for illustration, and an example in which the correspondence between the first comment 404 and the first content is represented by a dashed box, a connecting line, and a hollow circle is used for illustration. Therefore, the first content including the first comment 404 is displayed on the display of the electronic device.

In some embodiments, in this case, if the electronic device responds to an operation of saving the first comment 404 performed by the user, the electronic device stores displayed content including the first comment 404 in a saving format such as a picture format, a PDF, or a INT format in a gallery, a folder, or a note, to facilitate re-browsing and/or editing by the user.

In some embodiments, the user may continue to browse the remaining content of the displayed content. For example, the finger slides down on the display 103 along a direction BB. In this case, as shown in (c) in FIG. 4A, the content layer 402 receives the second content, the second content continues after the first content, and the comment layer 403 and the content layer 402 slide up together and both the sizes of the coverage regions thereof increase. Therefore, the electronic device invokes the second content at the content layer 402, and displays, on the display, the second content at the content layer 402.

In this case, when the user inputs a second comment 405 by using the stylus, the comment layer 403 receives the second comment 405, and the stylus service cache module at the application framework layer stores the second comment 405 and a correspondence between the second comment 405 and the second content. For ease of description, in (c) in FIG. 4A, an example in which the second comment 405 is represented by a hollow circle is used for illustration, and an example in which the correspondence between the second comment 405 and the second content is represented by a dashed box, a connecting line, and a hollow circle is used for illustration. Therefore, the second content including the second comment 405 is displayed on the display of the electronic device.

In some embodiments, the user may replay the first comment 404. For example, the finger slides up on the display 103 in a direction CC that is opposite to the direction BB. In this case, as shown in (d) in FIG. 4A, the electronic device invokes the third content at the content layer 402, and the comment layer 403 and the content layer 402 slide down together with the sizes of the coverage regions unchanged. Based on a correspondence between the first comment 404 and the third content, a position of the third content in the displayed content remains unchanged. Therefore, a position of the first comment 404 in the displayed content remains unchanged. Therefore, the third content including the first comment 404 is displayed on the display of the electronic device.

In some embodiments, in this case, if the electronic device responds to an operation of saving the second comment 405 performed by the user, the electronic device stores displayed content including the first comment 404 and the second comment 405 or including the second comment 405 in a saving format such as a picture format, a PDF, or a TXT format in a gallery, a folder, or a note, to facilitate re-browsing and/or editing by the user.

In some embodiments, after displaying the third content on the display, if the electronic device responds to an operation of not displaying the comment content performed by the user, as shown in (e) FIG. 4A, the electronic device deletes all stored content in storage space corresponding to the comment layer 403, and the size of the coverage region and the display position of the content layer 402 remain unchanged. Therefore, the electronic device exits the comment mode, and the user browses the third content at the content layer 402 from the display window 401 of the display along the direction AA.

As shown in (a) in FIG. 4B, the electronic device invokes the first content at the content layer 402, and displays, on the display, the first content at the content layer 402. When both the finger and the stylus touch the display of the electronic device, the electronic device determines, based on the hand touch information, the stylus touch information, and the time interval between the moment at which the hand touch information is obtained and the moment at which the stylus touch information is obtained, whether the electronic device meets the preset trigger condition, so as to determine whether the electronic device enters the comment mode.

When it is determined that the electronic device meets the preset trigger condition, as shown in (b) in FIG. 4B, the window manager at the application framework layer loads a comment layer 403 on the content layer 402, that is, the comment layer 403 covers the content layer 402, and a size of a coverage region of the comment layer 403 is the same as a size of a coverage region of the content layer 402. In addition, in this case, the view system at the application framework layer may add a toolbar to the content layer 402.

When the user inputs a first comment 404 by using the stylus, as shown in (b) in FIG. 4B, the comment layer 403 receives the first comment 404, and the stylus service cache module at the application framework layer stores the first comment 404 and a correspondence between the first comment 404 and the first content. Fax ease of description, in (b) in FIG. 4B, an example in which the first comment 404 is represented by a hollow circle is used for illustration, and an example in which the correspondence between the first comment 404 and the first content is represented by a dashed box, a connecting line, and a hollow circle is used for illustration. Therefore, the first content including the first comment 404 is displayed on the display of the electronic device.

In some embodiments, in this case, if the electronic device responds to an operation of saving the first comment 404 performed by the user, the electronic device stores displayed content including the first comment 404 in a saving format such as a picture format, a PDF, or a TXT format in a gallery, a folder, or a note, to facilitate re-browsing and/or editing by the user.

In some embodiments, the user may continue to browse the remaining content of the displayed content. For example, the finger taps a next-page operation button or a backward-dragging fast-forward operation button on the display of the electronic device. In this case, as shown in (c) in FIG. 4B, the content layer 402 receives the second content, the second content continues after the first content, and the sizes of the coverage regions of the comment layer 403 and the content layer 402 remain unchanged. Therefore, the electronic device invokes the second content at the content layer 402, and displays, on the display, the second content at the content layer 402.

In this case, when the user inputs a second comment 405 by using the stylus, the comment layer 403 receives the second comment 405, and the stylus service cache module at the application framework layer stores the second comment 405 and a correspondence between the second comment 405 and the second content. For ease of description, in (c) in FIG. 4A, an example in which the second comment 405 is represented by a hollow circle is used for illustration, and an example in which the correspondence between the second comment 405 and the second content is represented by a dashed box, a connecting line, and a hollow circle is used for illustration. Therefore, the second content including the second comment 405 is displayed on the display of the electronic device.

In some embodiments, the user may replay the first comment 404. For example, the finger taps a previous-page operation button or a forward-dragging fast-forward button on the display 103. In this case, as shown in (d) in FIG. 4A, the electronic device may invoke the third content (namely, the first content herein) at the content layer 402, and the comment layer 403 and the content layer 402 slide down together with the sizes of the coverage regions unchanged. Based on the correspondence between the first comment 404 and the first content, a position of the first content in the displayed content remains unchanged. Therefore, a position of the first comment 404 in the displayed content remains unchanged. Therefore, the first content including the first comment 404 is displayed on the display of the electronic device.

In some embodiments, in this case, if the electronic device responds to an operation of saving the second comment 405 performed by the user, the electronic device stores displayed content including the first comment 404 and the second comment 405 or including the second comment 405 in a saving format such as a picture format, a PDF, or a TXT format in a gallery, a folder, or a note, to facilitate re-browsing and/or editing by the user.

In some embodiments, after displaying the first content on the display, if the electronic device responds to an operation of not displaying the comment content performed by the user, as shown in (e) in FIG. 4A, the electronic device deletes all stored content in storage space corresponding to the comment layer 403, and the size of the coverage region and the display position of the content layer 402 remain unchanged. Therefore, the electronic device exits the comment mode, so that the user browses the first content at the content layer 402 from the display window 401 of the display along the direction AA.

Figure 5A:
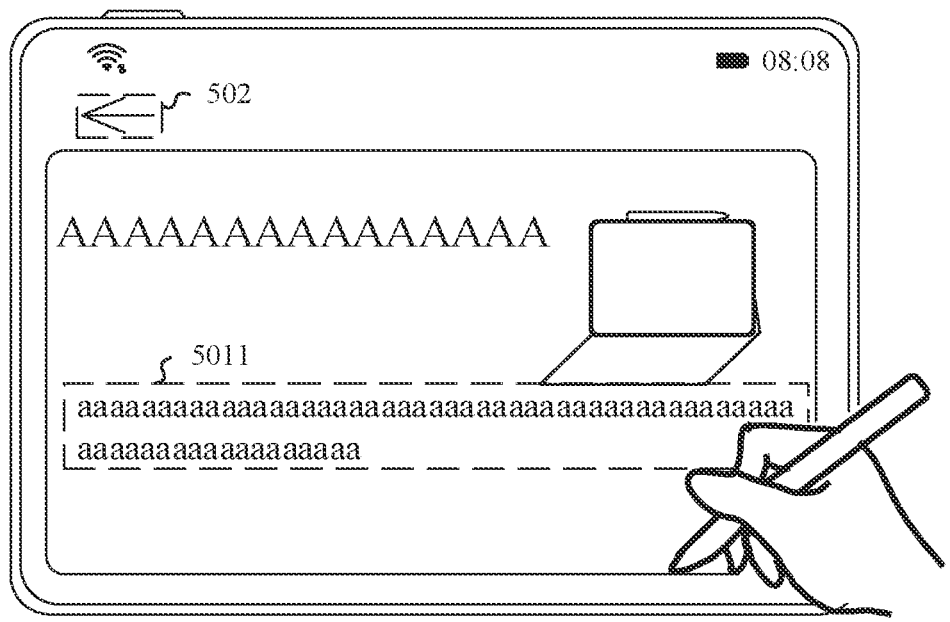
FIG. 5A to FIG. 5N are schematic diagrams of a human-machine interaction interface according to an embodiment of this application.
Figure 5B:
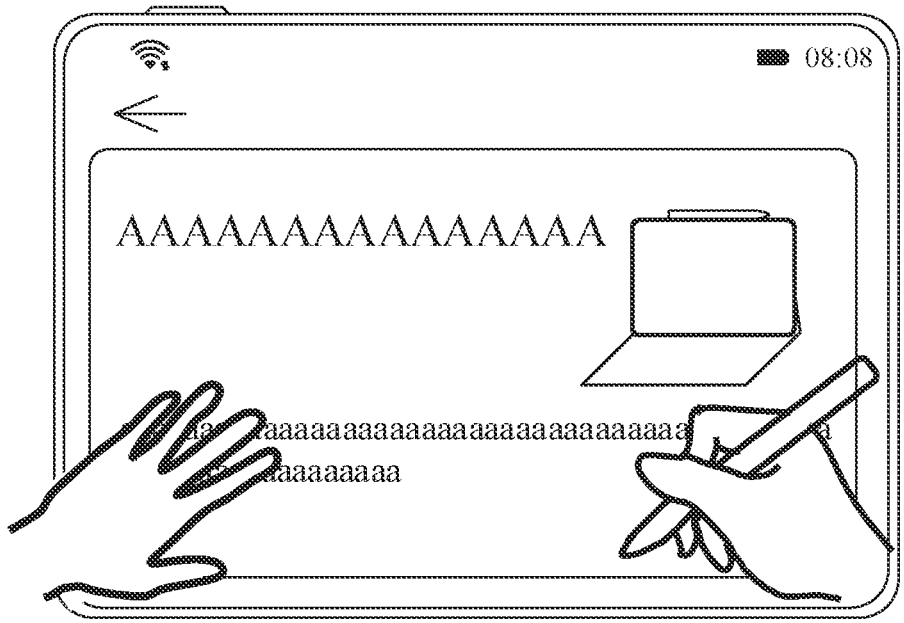
Figure 5C:
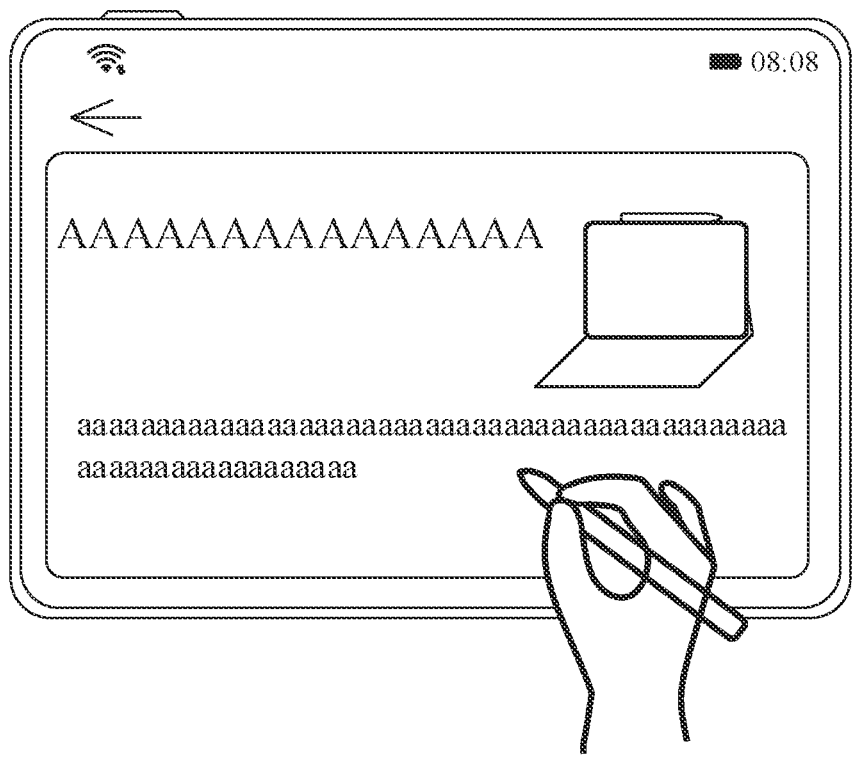
Figure 5D:
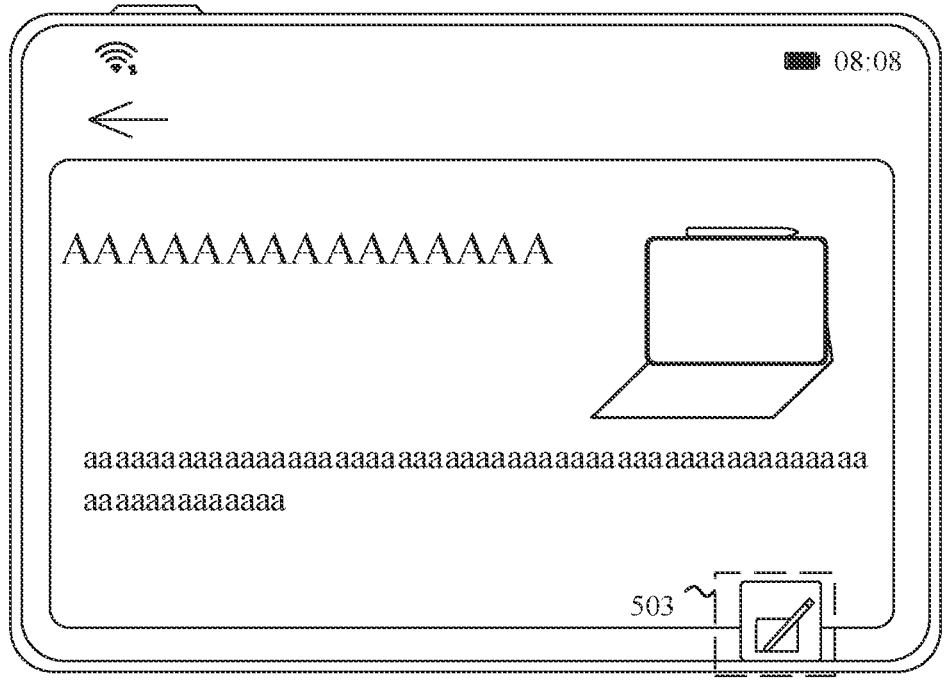
Figure 5E:
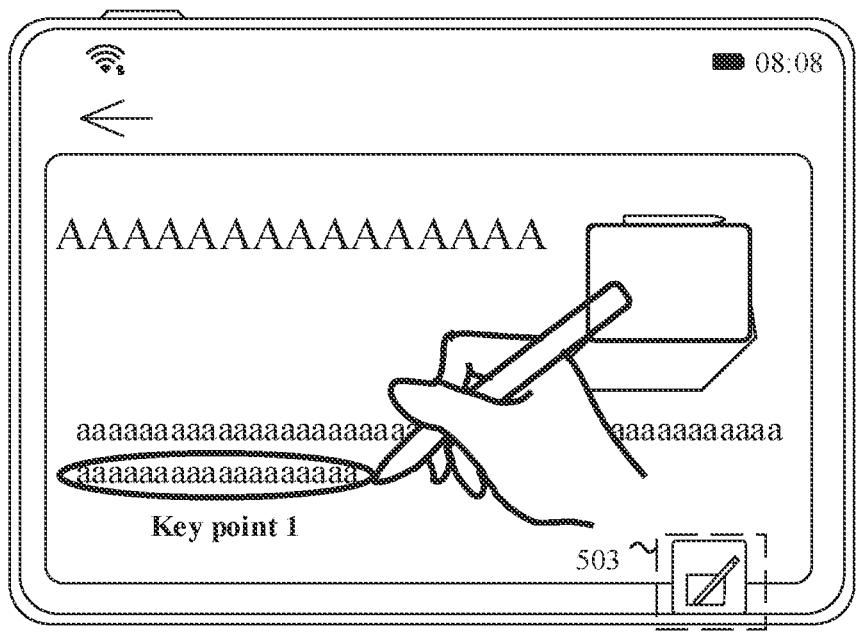
Figure 5F:
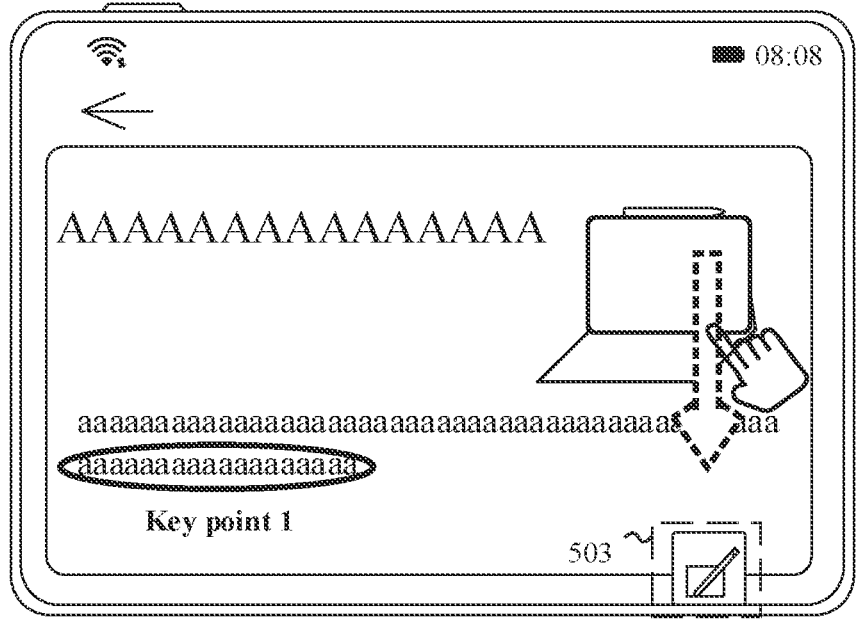
Figure 5G:
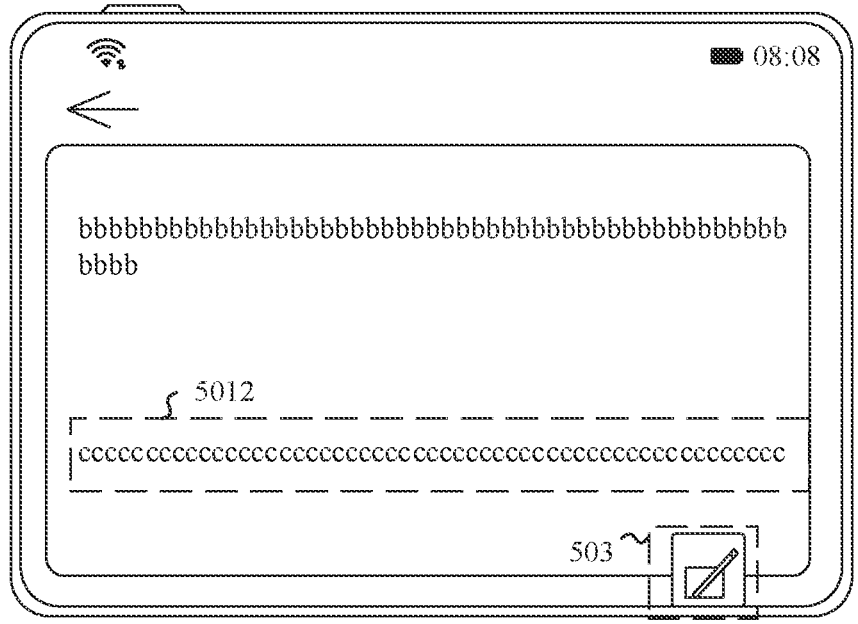
Figure 5H:
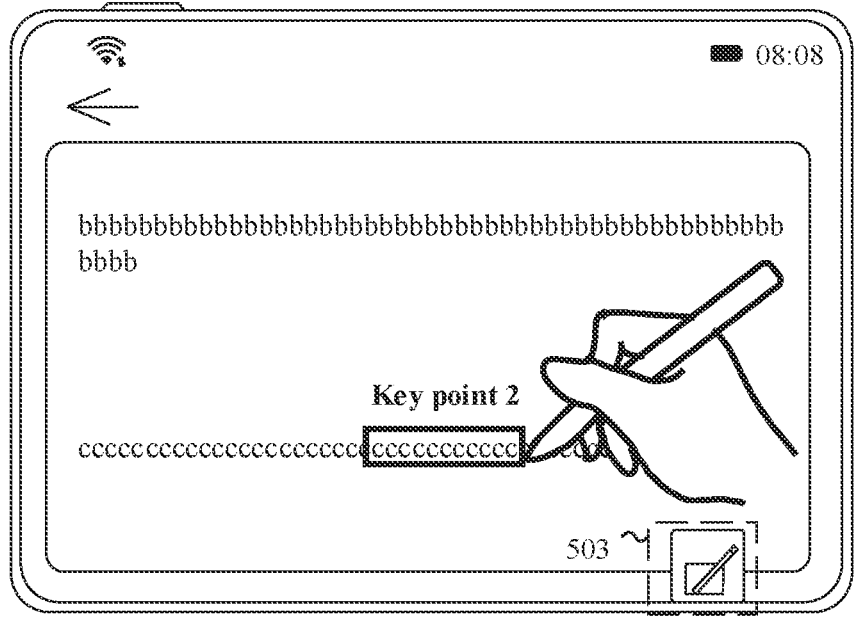
Figure 5I:
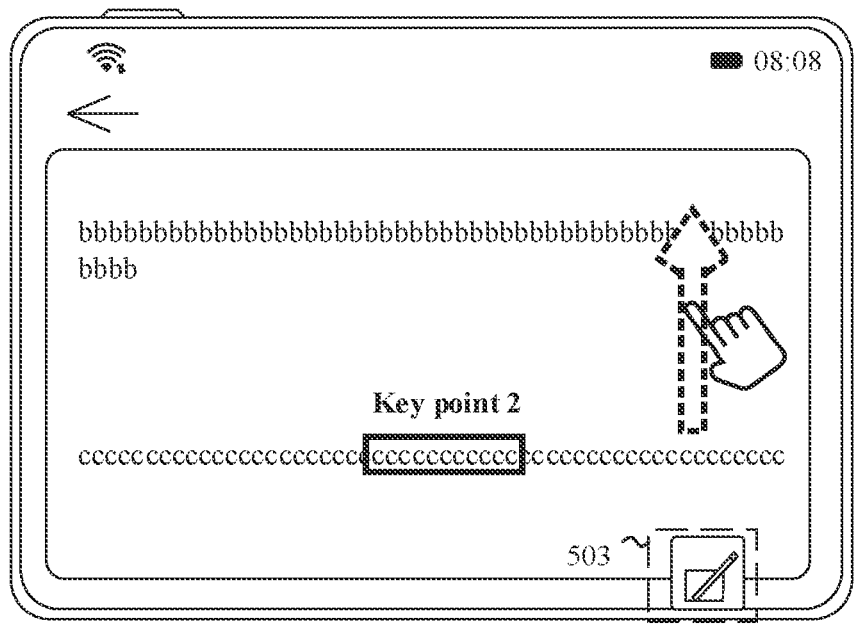
Figure 5J:
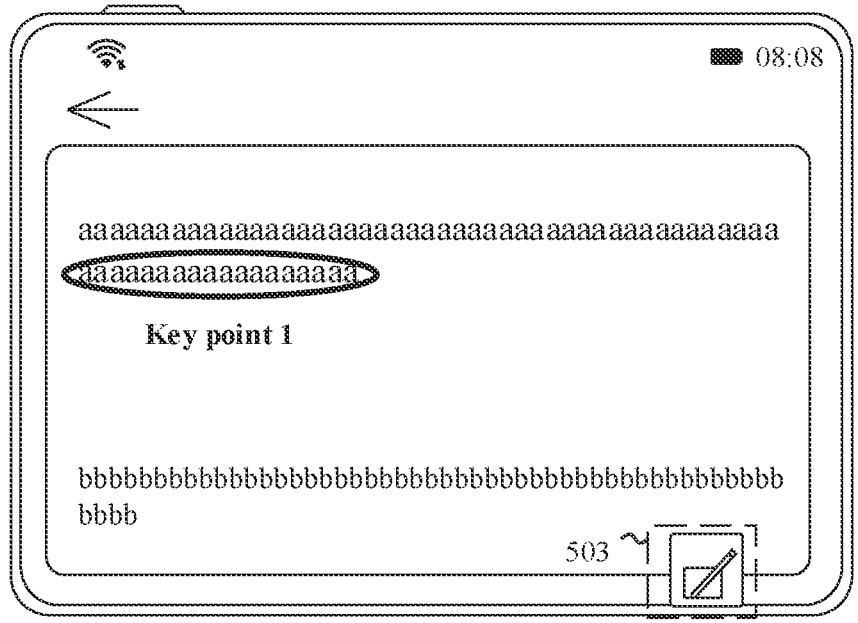
Figure 5K:
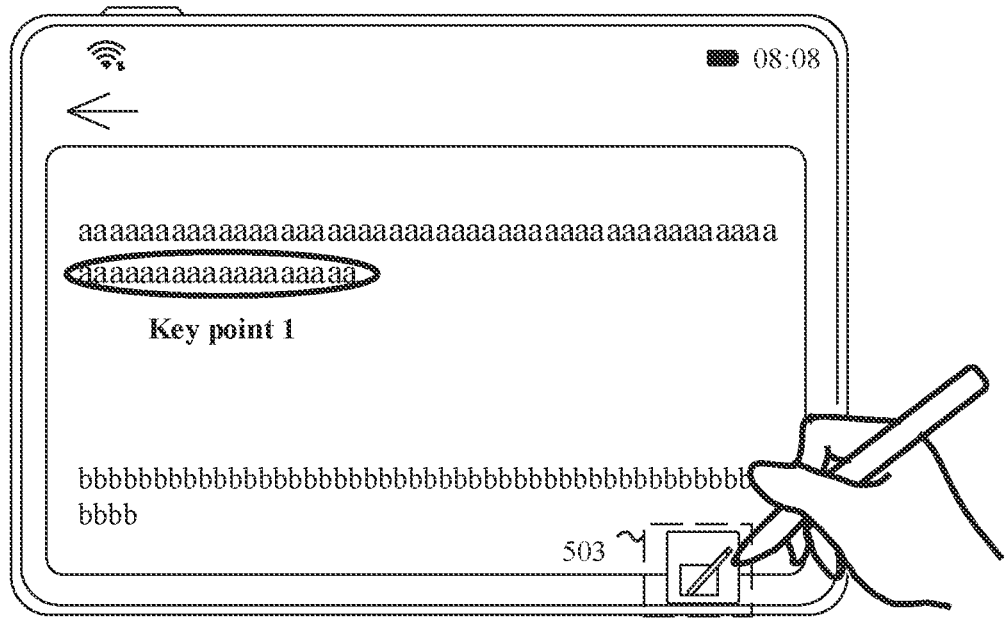
Figure 5L:
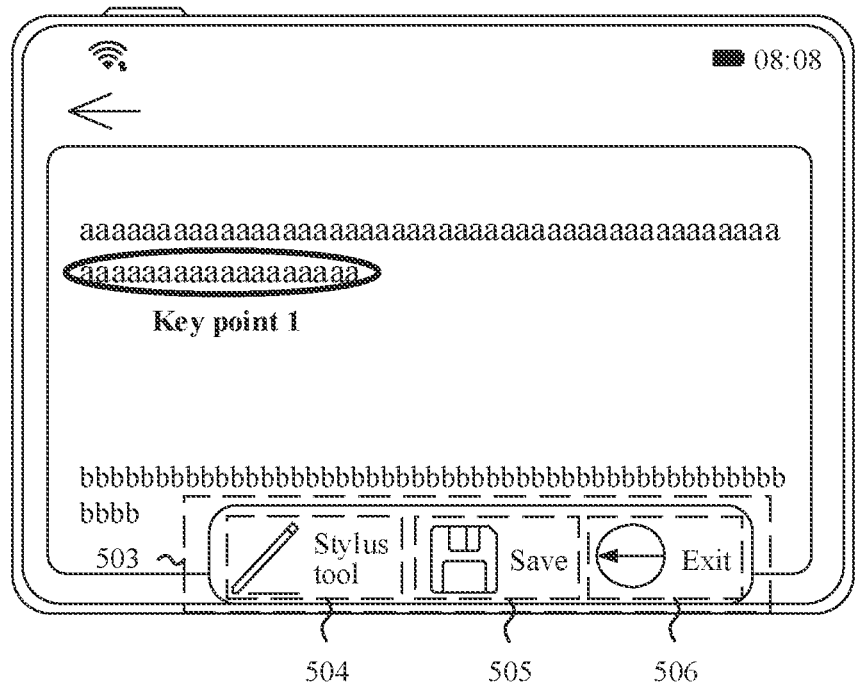
Figure 5M:
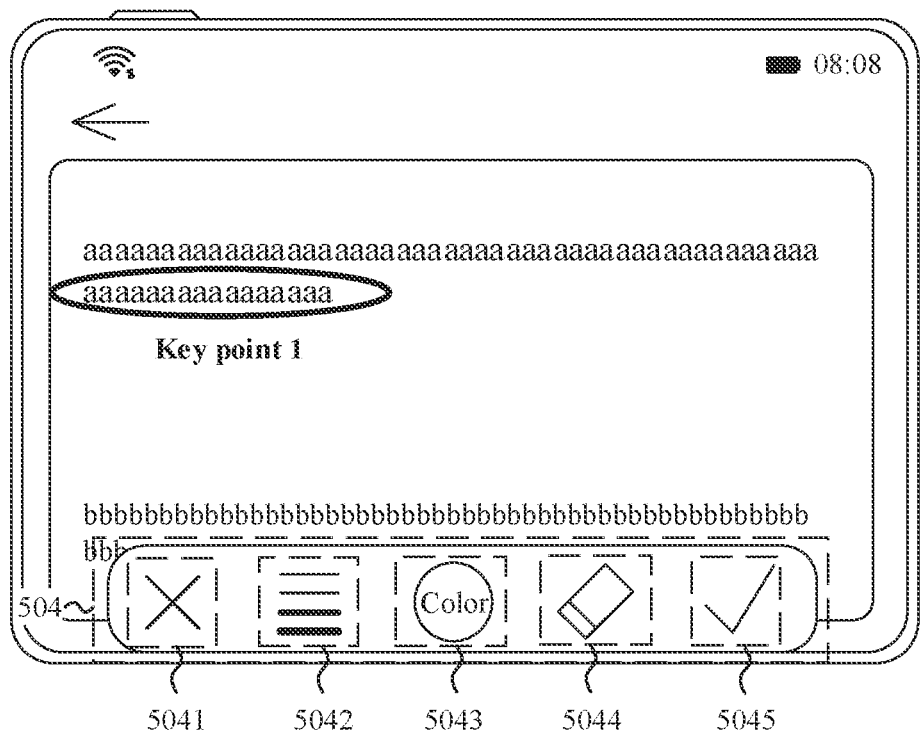
Figure 5N:
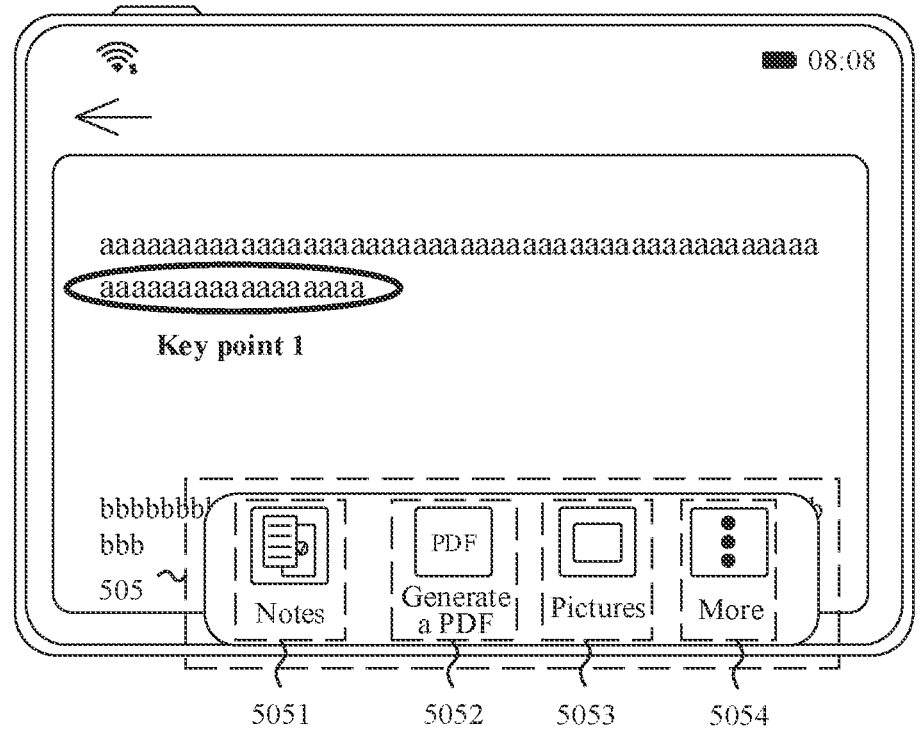

Based on the foregoing descriptions and with reference to FIG. 5A to FIG. 5N, a specific implementation process in which the electronic device completes the comment function is described. For ease of description, in FIG. 5A to FIG. 5N, an example in which the electronic device is a tablet computer, the tablet computer is in a landscape state, and displayed content is a web page is used for illustration, FIG. 5A to FIG. 5N are schematic diagrams of a human-machine interaction interface according to an embodiment of this application.

The user browses the web page by using the tablet computer. A display of the tablet computer displays an interface shown in FIG. 5A, and the interface includes at least first content 5011 and an exit operation button 502. The first content 5011 may be partial content of the web page, or may be all content of the web page. The exit operation button 502 is used to exit the interface on which the browsed web page is located.

When the user wants to perform a comment operation on the interface shown in FIG. 5A, a finger of one hand of the user touches the display, and at the same time, the other hand of the user touches the display by using a stylus, as shown in FIG. 5B. Alternatively, a hand of the user touches the display by using a stylus, and at the same time, a finger of the hand touches the display, as shown in FIG. 5C. It should be noted that, in this application, the electronic device may be set to enter the comment mode in response to the trigger operation shown in FIG. 5B, or the electronic device may be set to enter the comment mode in response to the trigger operation shown in FIG. 5C, or the electronic device may be set to enter the comment mode in response to either the trigger operation shown in FIG. 5B or the trigger operation shown in FIG. 5C. In addition, in addition to triggering the electronic device to enter the comment mode, the trigger operation shown in FIG. SB or FIG. 5C may further trigger the electronic device to implement a function such as screenshot or menu switching or invoke an application such as recording. In this application, the trigger operation shown in FIG. 5B or FIG. 5C is not limited to triggering the electronic device to enter the comment mode.

When the trigger operation meets a preset condition for the tablet computer to enter the comment mode, the tablet computer enters the comment mode, and an interface shown in FIG. 5D is displayed on the display of the tablet computer. A toolbar 503 is newly added to the interface, to remind the user that a comment operation may be performed on the display, that is, the electronic device 100 enters the comment mode.

In this way, the user may add comment content to one or more positions on the web page by using the stylus. A specific implementation of the comment content is not limited in this application. For ease of description, in this application, an example in which the user adds first comment and second comment to two positions on the web page is used for illustration.

The user uses the stylus 200 to perform a comment operation on an interface corresponding to the first content 5011 displayed on the display. The display of the tablet computer changes from the interface shown in FIG. 5D to an interface shown in FIG. 5E, and the first comment is newly added to the interface shown in FIG. 5E. For the first comment, refer to the foregoing description. Details are not described herein again. For example, in FIG. 5E, the first comment may include an elliptical pattern and a text "key point 1" that are formed by the user by selecting content.

As shown in FIG. 5F, the user may slide down on the display by using a finger, and the display of the tablet computer changes from an interface shown in FIG. 5F to an interface shown in FIG. 5G. The interface shown in FIG. 5G includes at least second content 5012, and the second content 5012 is partial content of the web page. It should be noted that content at a corresponding position on the web page may be displayed, based on a distance corresponding to a sliding operation performed by the user, on the interface displayed on the display of the electronic device 100. Therefore, the second content 5012 may partially overlap or completely not overlap the first content 5011. For ease of description, the second content 5012 on the interface shown in FIG. 5G completely does not overlap the first content 5011. In addition, the second content 5012 and the first content 5011 may be continuous or spaced in a position relationship. This is not limited in this application either.

The user uses the stylus 200 to perform a comment operation on an interface corresponding to the second content 5012 displayed on the display. The display of the tablet computer changes from the interface shown in FIG. 5G to an interface shown in FIG. 5H, and the second comment is newly added to the interface shown in FIG. 5H. For the second comment, refer to the foregoing description. Details are not described herein again. For example, in FIG. 5H, the second comment may include a square pattern and a text "key point 2" that are formed by the user by selecting content.

As shown in FIG. 5I, the user may slide up on the display by using a finger, and the display of the tablet computer changes from an interface shown in FIG. 5I to an interface shown in FIG. 5J. The interface shown in FIG. 5J further includes the first comment. In this way, it is convenient for the user to replay the first comment, so that the user can browse and edit the first comment.

In conclusion, the electronic device 100 may receive and display, in response to the touch of the finger and the touch of the stylus with a time interval within the preset duration range, the content corresponding to the moving track formed by the stylus 200 on the display, namely, the comment content, thereby implementing the comment function of the electronic device 100. In addition, the electronic device 100 may continue to present other content of the displayed content to the user on the display in response to an operation of continuing browsing the displayed content performed by the finger, so that display of the comment content and display of the displayed content do not affect each other, thereby improving comment experience of the user. In addition, the electronic device 100 may further display, on the display in response to an operation of replaying the comment content performed by the finger, displayed content including the comment content, so that the user can replay and edit the existing comment content at any time. In addition, the electronic device 100 may further save, in response to an operation of saving the comment content performed by using the stylus, the displayed content including the comment content.

At any moment after the electronic device 100 enters the comment mode, the electronic device 100 may provide the user with a function of editing attribute parameters such as a color and a thickness of the comment content, to enrich patterns of the comment content, thereby meeting various comment requirements of the user. In addition, the electronic device 100 may fix the attribute parameters of the comment content, for example, fix both the color and the thickness of the comment content, thereby improving a processing rate of the electronic device 100.

The following uses an example in which the electronic device 100 displays an interface shown in FIG. 5K to describe a specific implementation process in which the electronic device 100 provides, by using the toolbar 503, the user with the function of editing the attribute parameters of the comment content.

The user taps, by using the stylus 200, the toolbar 503 shown in FIG. 5K, and the display of the tablet computer displays an interface shown in FIG. 5L. The interface is used to display a specific function of the toolbar 503. For example, in FIG. 5L, the interface includes a stylus tool control 504, a save control 505, and an exit control 506. The stylus tool control 504 is configured to edit an attribute parameter of the stylus 200, the save control 505 is configured to save the comment content, and the exit control 506 is configured to skip displaying the comment content, that is, exit the comment mode of the electronic device. Icons, positions, layouts, and included option types of the stylus tool control 504, the save control 505, and the exit control 506 are not limited in this application.

The user taps, by using the stylus 200, the stylus tool control 504 shown in FIG. 5L, and the display of the tablet computer displays an interface shown in FIG. 5M. The interface is used to display a specific implementation of the stylus tool control 504. For example, in FIG. 5M, the interface includes an exit option 5041, a line thickness option 5042, a line color option 5043, an eraser option 5044, a completion option 5045, and the like. These options are used to edit the comment content in the comment content adding process this time. The exit option 5041 is used to exit an interface of the stylus tool control 504, the line thickness option 5042 is used to provide selections of the thickness of the comment content, the line color option 5043 is used to provide selections of the color of the comment content, the eraser option 5044 is used to erase the comment content, and the completion option 5045 is used to complete editing of the comment content. It should be noted that this application is not limited to the foregoing editing options.

In this way, the electronic device 100 may provide various options for the user to edit the attribute parameters of the comment content, so that the comment content has rich patterns.

After the user adds the comment content, the electronic device 100 may further store the comment content. Generally, the electronic device 100 may use a picture format, a PDF, a TXT format, or the like to save the comment content and the displayed content in a gallery, a folder, or a note, so that the user can browse and/or edit the displayed content including the comment content. In some embodiments, the comment content and the displayed content may be stored separately, or may be stored together, and a specific manner may be set with reference to impact factors such as the saving format.

The following uses an example in which the electronic device 100 displays an interface shown in FIG. 5J to describe a specific implementation process in which the electronic device 100 provides, by using the toolbar 503, the user with a function of saving the comment content.

The user taps, by using the stylus 200, the toolbar 503 shown in FIG. 5K, and the display of the tablet computer displays the interface shown in FIG. 5L. The interface is used to display the specific function of the toolbar 503. For example, in FIG. 5L, the interface includes the stylus tool control 504, the save control 505, and the exit control 506.

The user taps, by using the stylus 200, the save control 505 shown in FIG. 5L, and the display of the tablet computer displays an interface shown in FIG. 5N. The interface is used to display a specific implementation of the save control 505. For example, in FIG. 5N, the interface includes a note option 5051, a PDF generation option 5052, a picture option 5053, a more option 5054 (where three solid points are used as an example in FIG. 5N for illustration), and the like. These options are used to save the comment content in a process after the electronic device 100 enters the comment mode and before the user taps the save control 505. The note option 5051 is used to store the displayed content including the comment content as a note format, the PDF generation option 5052 is used to store the displayed content including the comment content as the PDF format, and the picture option 5053 is used to store the displayed content including the comment content as the picture format. It should be noted that this application is not limited to the foregoing saving formats.

A policy for saving the comment content and the displayed content by the electronic device 100 is not limited in this application.

In some embodiments, the electronic device 100 saves all of the comment content and all of the displayed content. The picture format is used as an example. The electronic device 100 may save a picture shown in FIG. 6A in a gallery or a note.

In some other embodiments, the electronic device 100 saves all of the comment content and a part of the displayed content.

For example, the electronic device 100 divides the displayed content into one or more parts based on positions that correspond to the comment content and that are in the displayed content, and saves the one or more parts together with the corresponding comment content.

The picture format is used as an example. The electronic device 100 may save two pictures shown in FIG. 6B and FIG. 6C in the gallery or the note. To be specific, the electronic device 100 saves first captured content and the first comment together by using the picture shown in FIG. 6B, and saves second captured content and the second comment together by using the picture shown in FIG. 6C.

The first captured content is content that is within a first preset range and that is captured from the displayed content starting from the position of the first comment in the displayed content. The second captured content is content that is within a second preset range and that is captured from the displayed content starting from the position of the second comment in the displayed content. The first preset range may be the same as or different from the second preset range. Specific sizes of the first preset range and the second preset range are not limited in this application.

Alternatively, the picture format is used as an example. The electronic device 100 may save a picture shown in FIG. 6D. To be specific, the electronic device 100 captures content within a third preset range from the position of the first comment in the displayed content to the position of the second comment in the displayed content. For example, the electronic device 100 saves the picture shown in FIG. 6D. A specific size of the third preset range is not limited in this application.

It should be noted that, this application is not limited to the saving policies of the pictures shown in FIG. 6A to FIG. 6D, and the saving policy may be specifically set based on parameters such as a size of the display, a state of the display, and an actual empirical value. In addition, the electronic device 100 may further perform processing such as cropping and rendering on the saved picture.

In conclusion, the electronic device 100 may save all or a part of the comment content and the displayed content based on an intention of the user, so that the user can replay and/or edit the comment content and the displayed content on the electronic device 100.

Figure 6C:
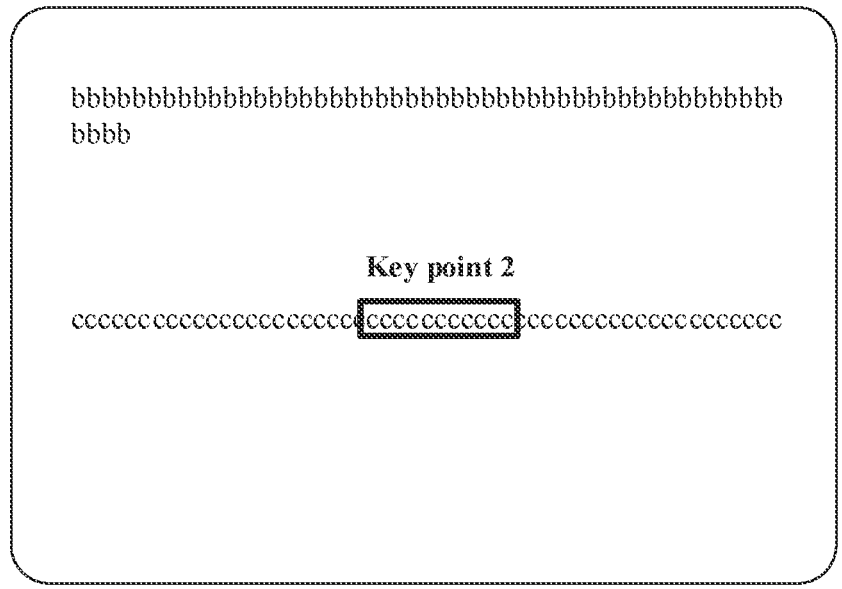
Figure 6D:
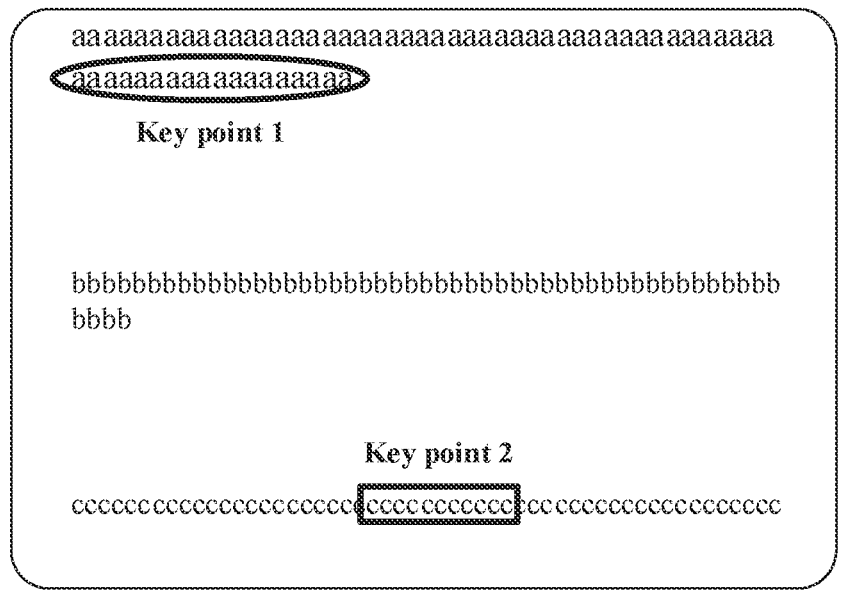

The following uses an example in which the electronic device 100 saves the two pictures shown in FIG. 6B and FIG. 6C and the electronic device 100 is a tablet computer, to describe a specific implementation process in which the user browses the comment content in the gallery of the electronic device 100.

Figure 7A:
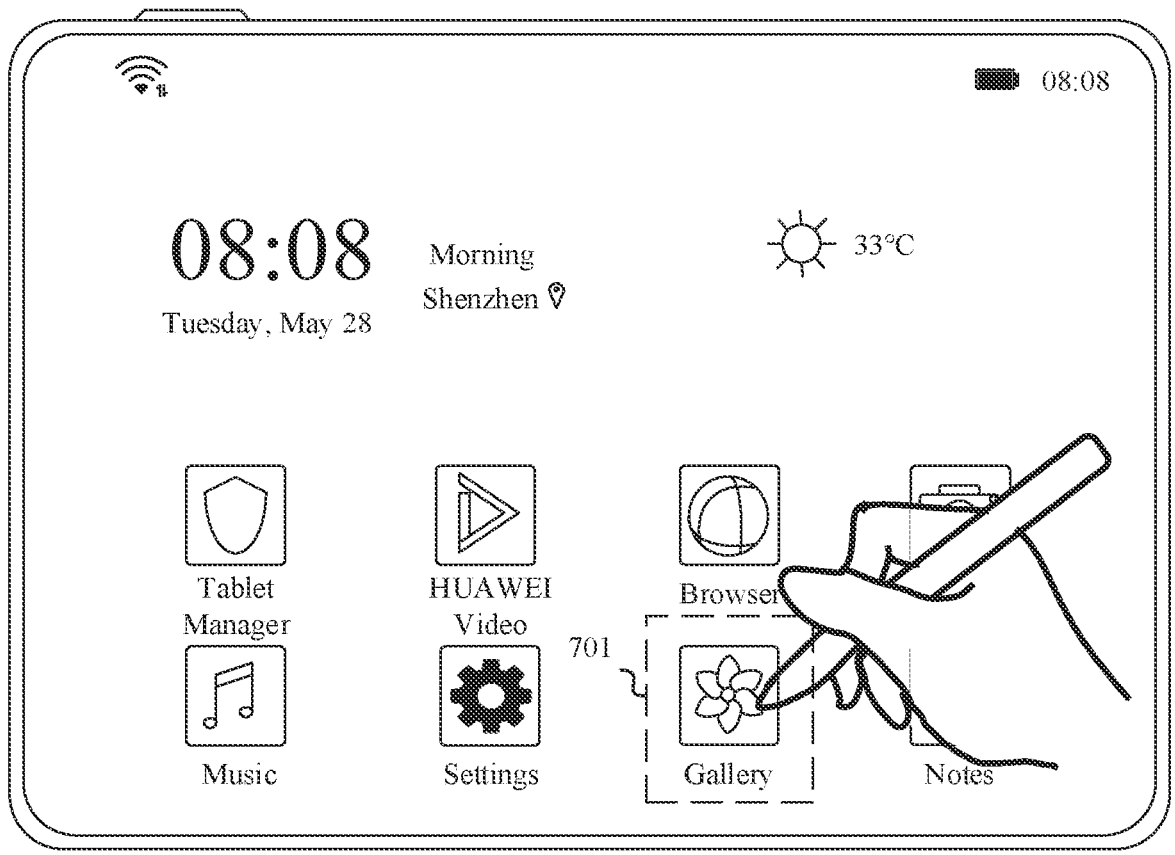
FIG. 7A to FIG. 7C are schematic diagrams of a human-machine interaction interface according to an embodiment of this application.
Figure 7B:
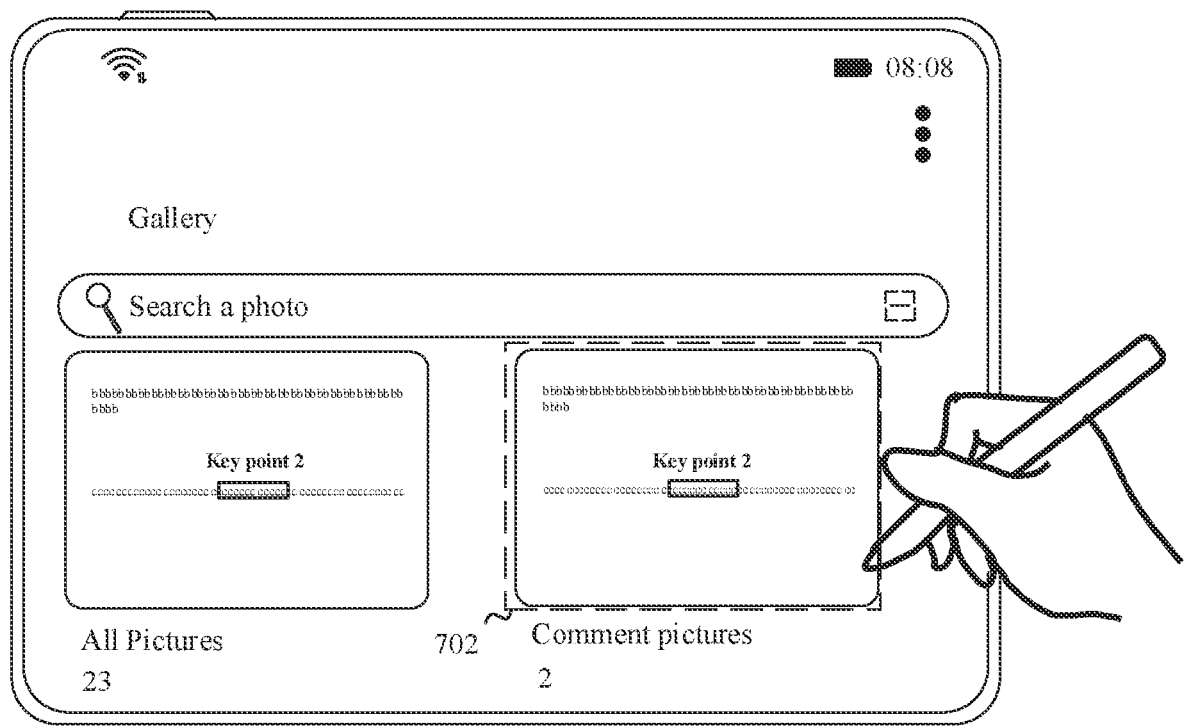

As shown in FIG. 7A, the user taps an icon of a gallery app 701 on a display of the tablet computer, and the display of the tablet computer displays an interface of the gallery app 701 shown in FIG. 7B. For example, in FIG. 7B, the interface includes a photo search box, an all-pictures option, and a comment picture option 702. The photo search box is used to search for a picture in the gallery app 701. The all-pictures option is used to store all pictures of the tablet computer. The comment picture option 702 is used to store a picture saved by the tablet computer in the comment mode.

Figure 7C:
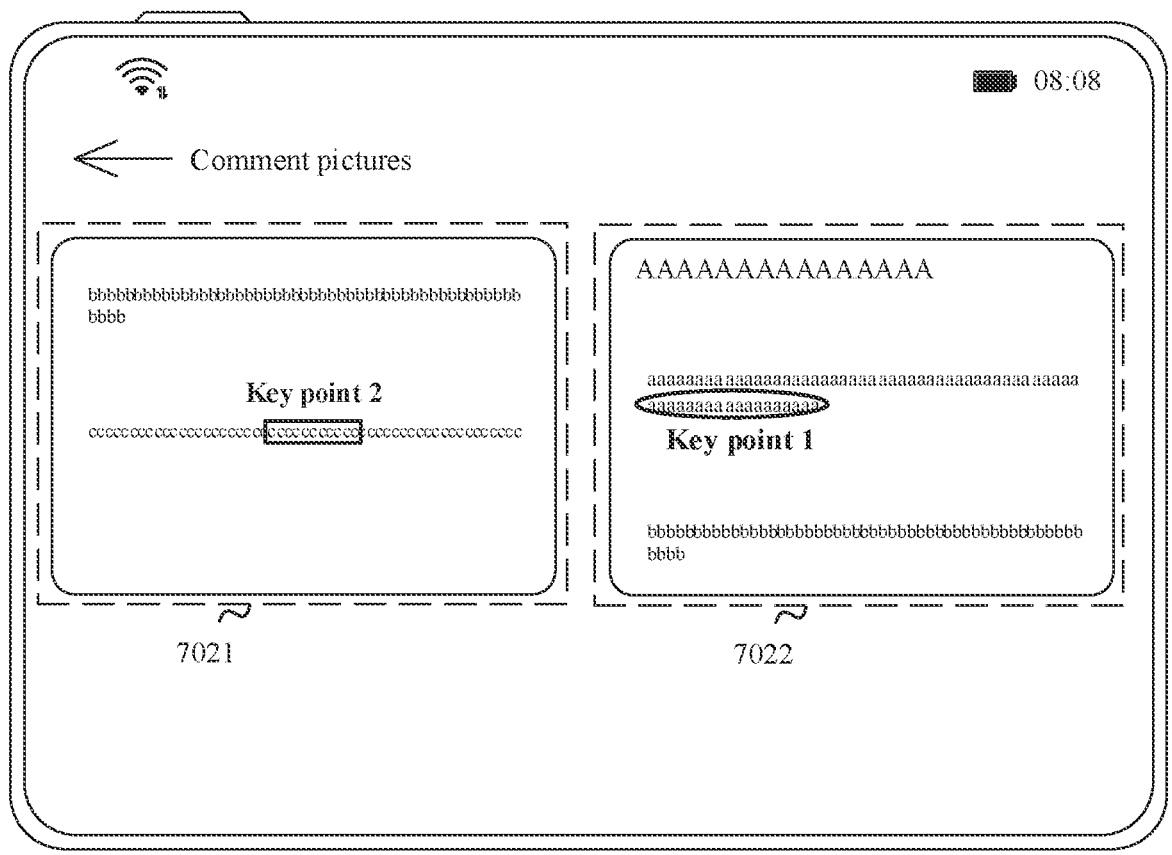

As shown in FIG. 7B, the user may tap the comment picture option 702 by using the stylus 200, and the display of the tablet computer displays an interface of the comment picture option 702 shown in FIG. 7C. The interface is used to display a picture included in the comment picture option 702. For example, in FIG. 7C, the interface includes a picture 7021 and a picture 7022. The picture 7021 is a picture including the first comment, and the picture 7022 is a picture including the second comment.

In this way, the user may browse the picture including the first comment and the picture including the second comment. In addition, the interface may further include options (not shown in FIG. 7C) of functions such as sharing, adding to favorites, editing (for example, cropping a picture, adding a filter, and re-adding a line), and deleting, so that the user can implement a corresponding function for each picture.

The following uses an example in which the electronic device 100 saves the two pictures shown in FIG. 6B and FIG. 6C and the electronic device 100 is a tablet computer, to describe a specific implementation process in which the user browses and edits the comment content in the note of the electronic device 100.

Figure 8A:
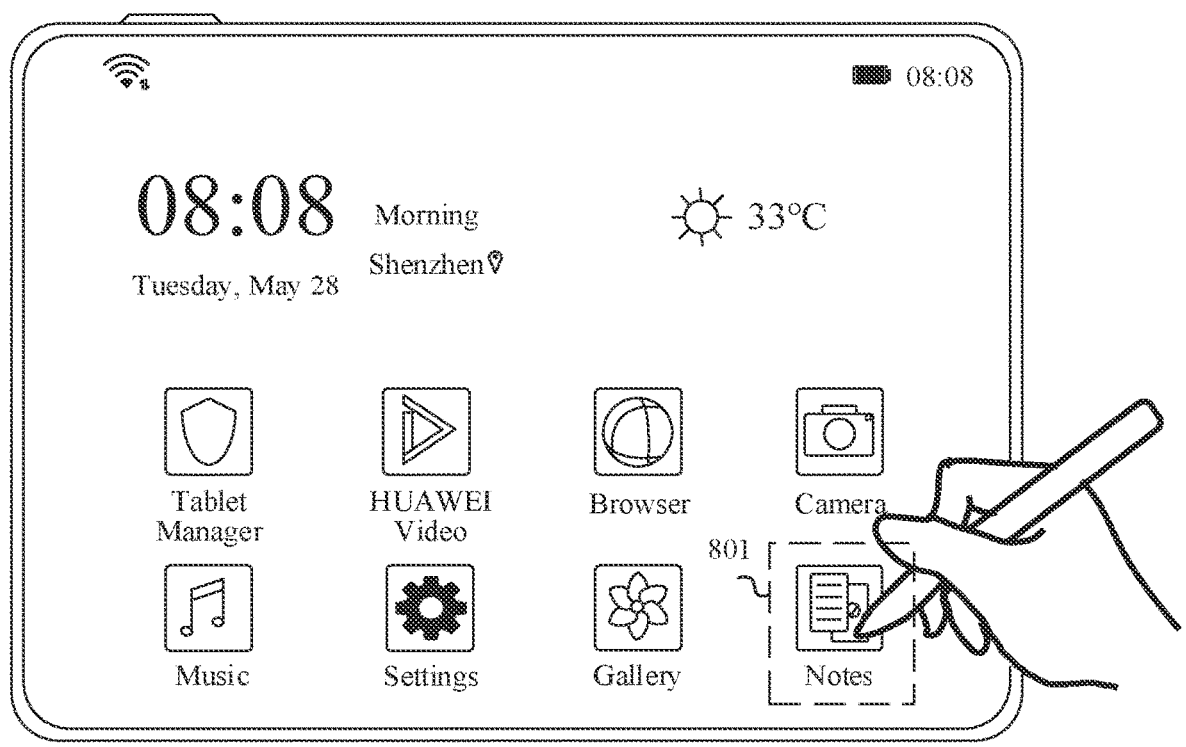
FIG. 8A to FIG. 8E are schematic diagrams of a human-machine interaction interface according to an embodiment of this application.
Figure 8B:
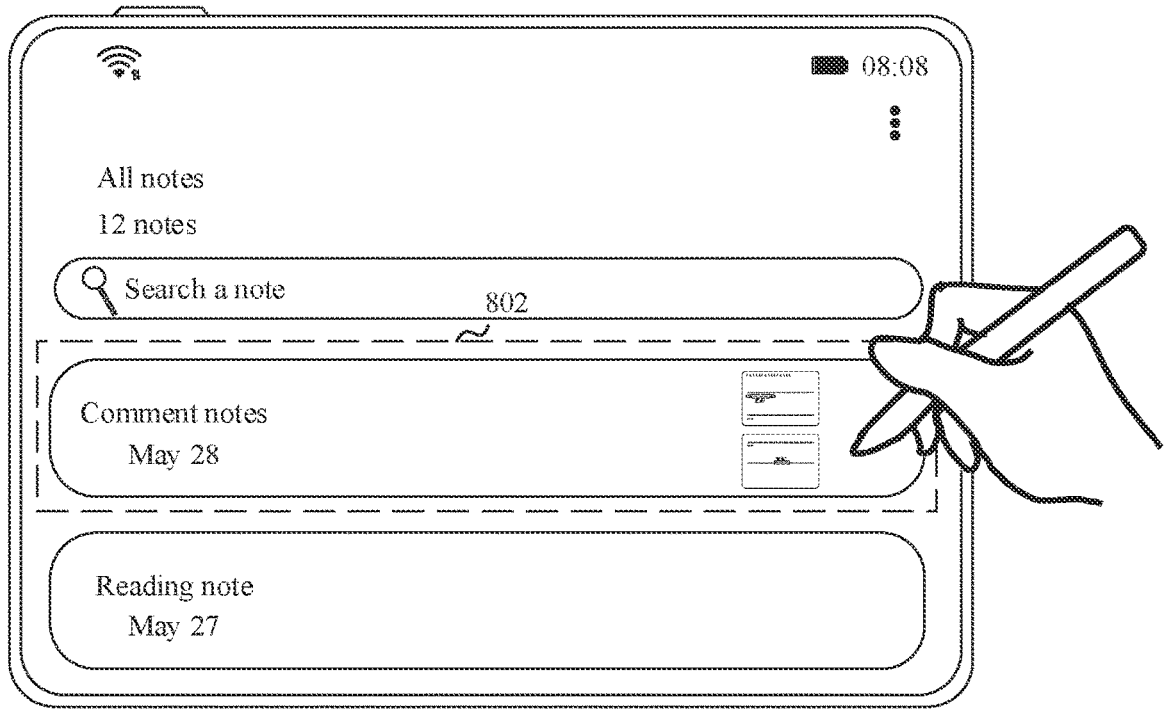

As shown in FIG. 8A, the user taps an icon of a notes app 801 on a display of the tablet computer, and the display of the tablet computer displays an interface of the notes app 801 shown in FIG. 8B. The interface is used to display the interface of the notes app 801. For example, in FIG. 8B, the interface includes a note search box, a comment note option 802, and a reading note option. The note search box is used to search for a note in the notes app 801. The comment note option 802 is a note that stores a picture saved by the tablet computer in the comment mode. The reading note option is a reading note of the user.

Figure 8C:
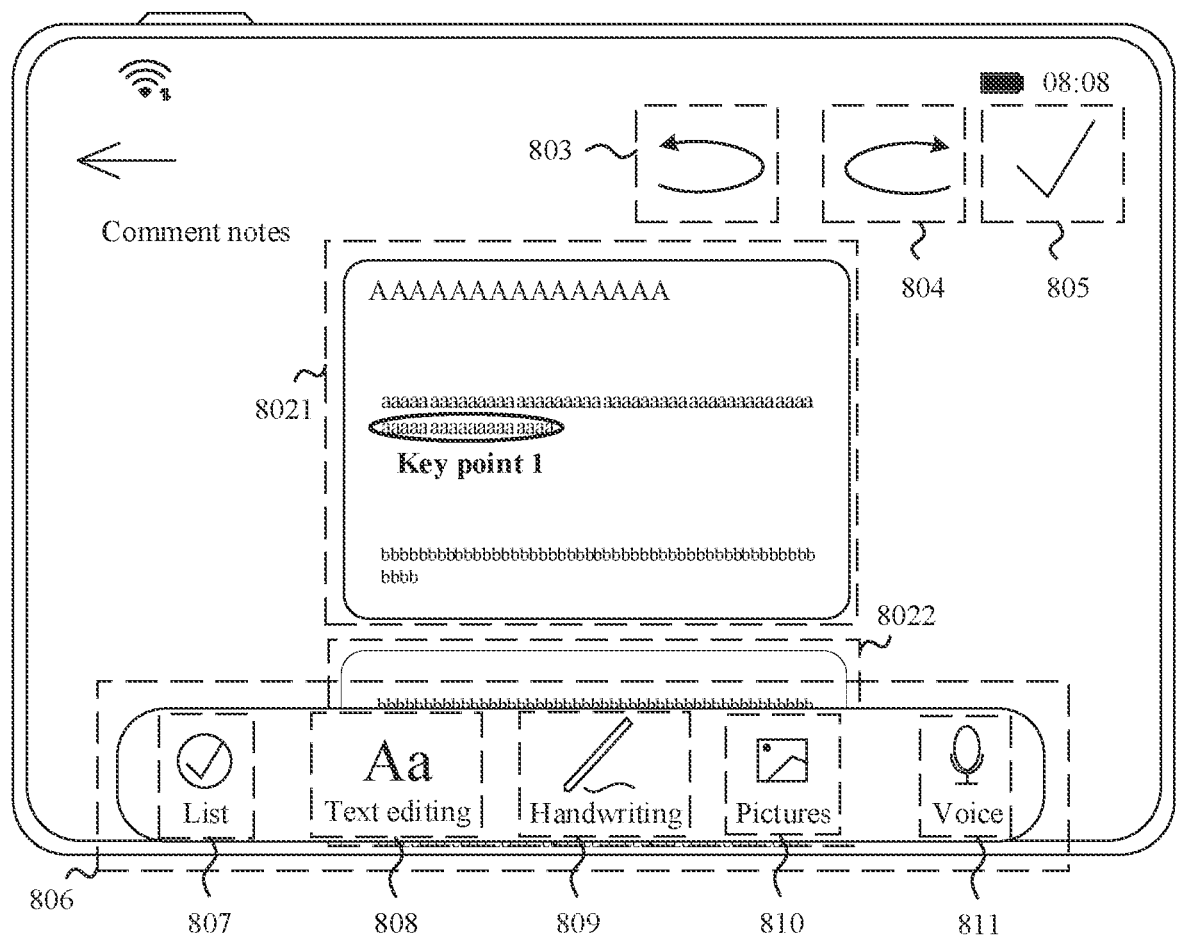

As shown in FIG. 8B, the user may tap the comment note option 802 by using the stylus 200, and the display of the tablet computer displays an interface of the comment note option 802 shown in FIG. 8C. The interface is used to display a picture included in the comment note option 802. For example, in FIG. 8B, the interface includes a picture 8021 and a picture 8022. The picture 8021 is a picture including the first comment, and the picture 8022 is a picture including the second comment. In this way, the user may browse, in a picture note, the picture including the first comment and the picture including the second comment.

In addition, the interface further includes an undo typing operation button 803, a repeat typing operation button 804, an editing completion operation button 805, and an editing tool control 806. The editing tool control 806 includes a list option 807, a text editing option 808, a handwriting operation option 809, a picture option 810, and a voice option 811. The list option 807 is used to add a list, and the text editing option 808 is used to modify attribute parameters such as a color and a thickness of a font. The handwriting option 809 is used to edit the comment content (for example, add, modify, and delete the comment content). The picture option 810 is used to add a picture, a video, a scanned file, and the like. The voice option 811 is used to add a voice.

Figure 8D:
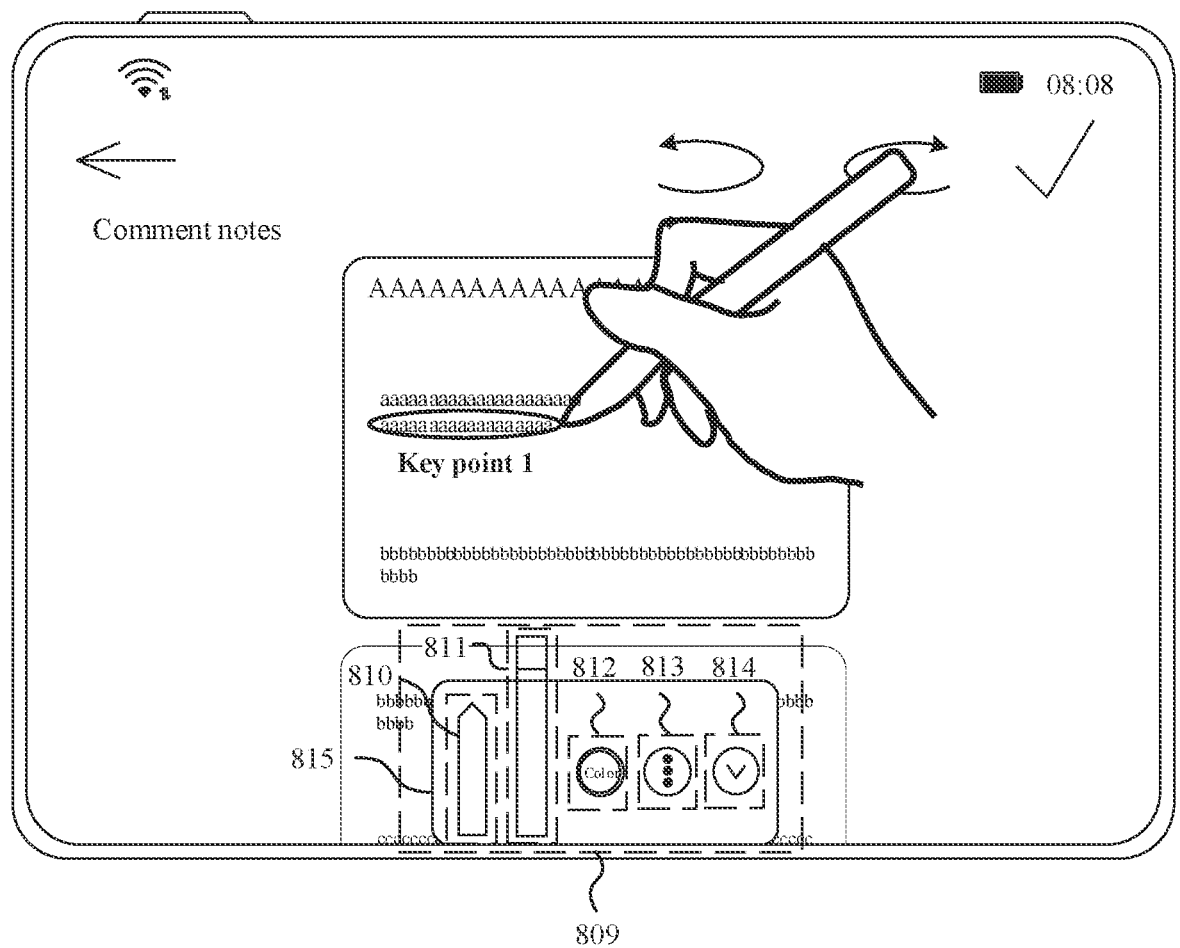

The user taps the handwriting option 809 on the display of the tablet computer, and the display of the tablet computer displays an interface shown in FIG. 8D. The interface is used to display an interface of the handwriting option 809. For example, in FIG. 8D, the interface includes a pen operation button 810, an eraser operation button 811, a color operation button 812, a more operation button 813 (where three solid points are used as an example in FIG. 8D for illustration), a hidden operation button 814, and a rounded rectangular box 815. The pen operation button 810 is used to indicate that the user may perform a comment operation on the display when an icon of the pen operation button 810 exceeds the rounded rectangular box 815. The eraser operation button 811 is used to indicate that the user may perform a delete operation on the existing comment content on the display when an icon of the eraser operation button 811 exceeds the rounded rectangular box 815. The color operation button 812 is used to indicate that the user may select a color of the comment content when an icon of the color operation button 812 is tapped. The more operation button 813 is configured to provide other functions.

Figure 8E:
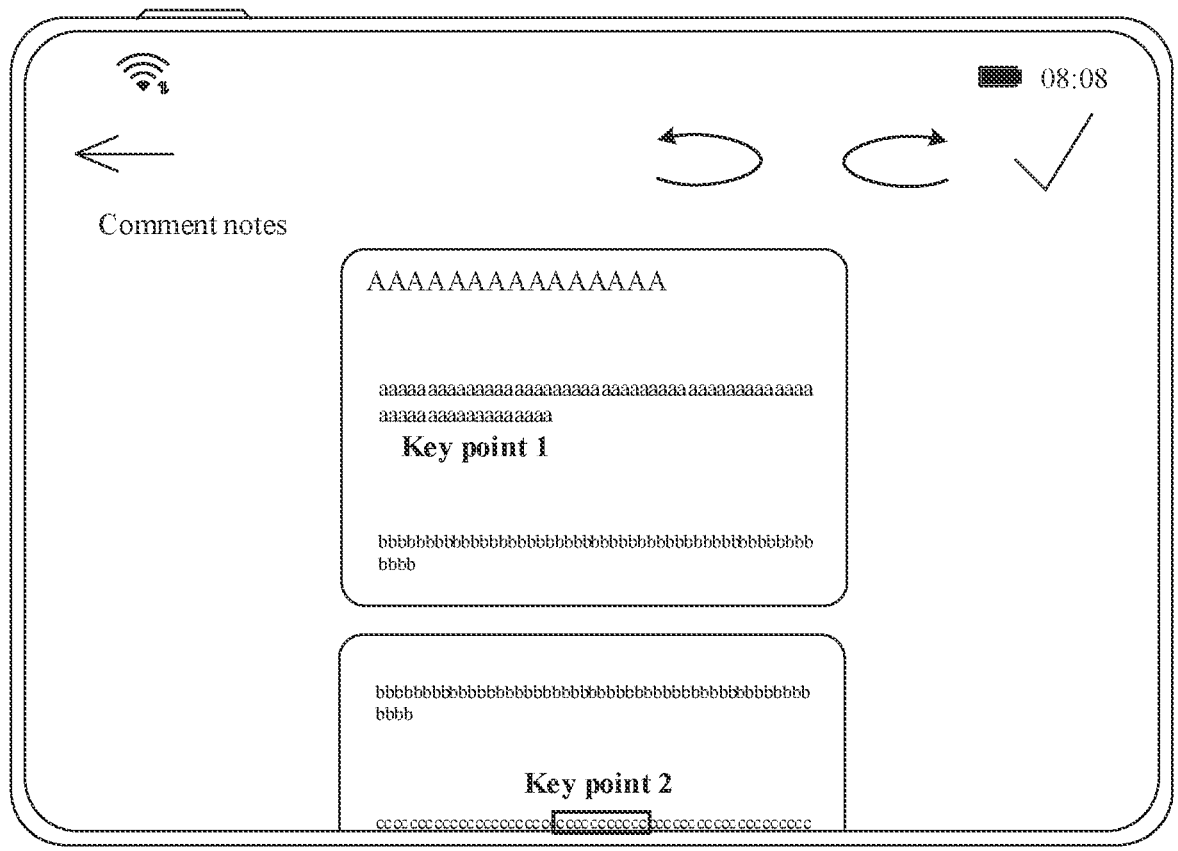

The user taps the eraser operation button 811, and the icon of the eraser operation button 811 exceeds the rounded rectangular box 815, as shown in FIG. 8D. In this way, the user may erase, by using the stylus 200, an elliptical pattern formed by content circled by the user in the first comment, and the display of the tablet computer changes from an interface shown in FIG. 8D to an interface shown in FIG. 8E. In this way, the user may tap the editing completion operation button 805 to implement a process of editing the comment content.

It should be noted that, in addition to deleting a part of the comment content, the user may also add new comment content, or change an attribute parameter of the existing comment content.

In this way, the user may re-edit the picture including the first comment and the picture including the second comment in the picture note.

When the user wants the display not to display the comment content, that is, the user wants to exit the comment mode, the user may exit the comment mode at any moment when the comment mode is entered. In some embodiments, the electronic device 100 may display currently displayed content on the display of the electronic device 100 in response to an operation of tapping, by the user by using the stylus 200, the exit control 506 in the toolbar 503 in FIG. 5L, and no longer display the comment content.

For example, the display of the electronic device 100 displays the interface shown in FIG. 5E, and the user taps the exit control 506 by using the stylus 200. In this case, the display of the electronic device 100 displays the interface shown in FIG. 5A, FIG. 5B, or FIG. 5C. The interface includes the first content 5011 on the interface shown in FIG.

5E, and the interface does not include the icon of the toolbar 503. In addition, the interface usually does not include the first comment.

For another example, the display of the electronic device 100 displays the interface shown in FIG. 5H, and the user taps the exit control 506 by using the stylus 200. In this case, the display of the electronic device 100 displays the interface shown in FIG. 5H, and the interface does not include the icon of the toolbar 503. In addition, the interface usually does not include the second comment.

For another example, the display of the electronic device 100 displays the interface shown in FIG. 5J, and the user taps the exit control 506 by using the stylus 200. In this case, the display of the electronic device 100 displays the interface shown in FIG. 5J, and the interface does not include the icon of the toolbar 503. In addition, the interface usually does not include the first comment.

Figure 9A:
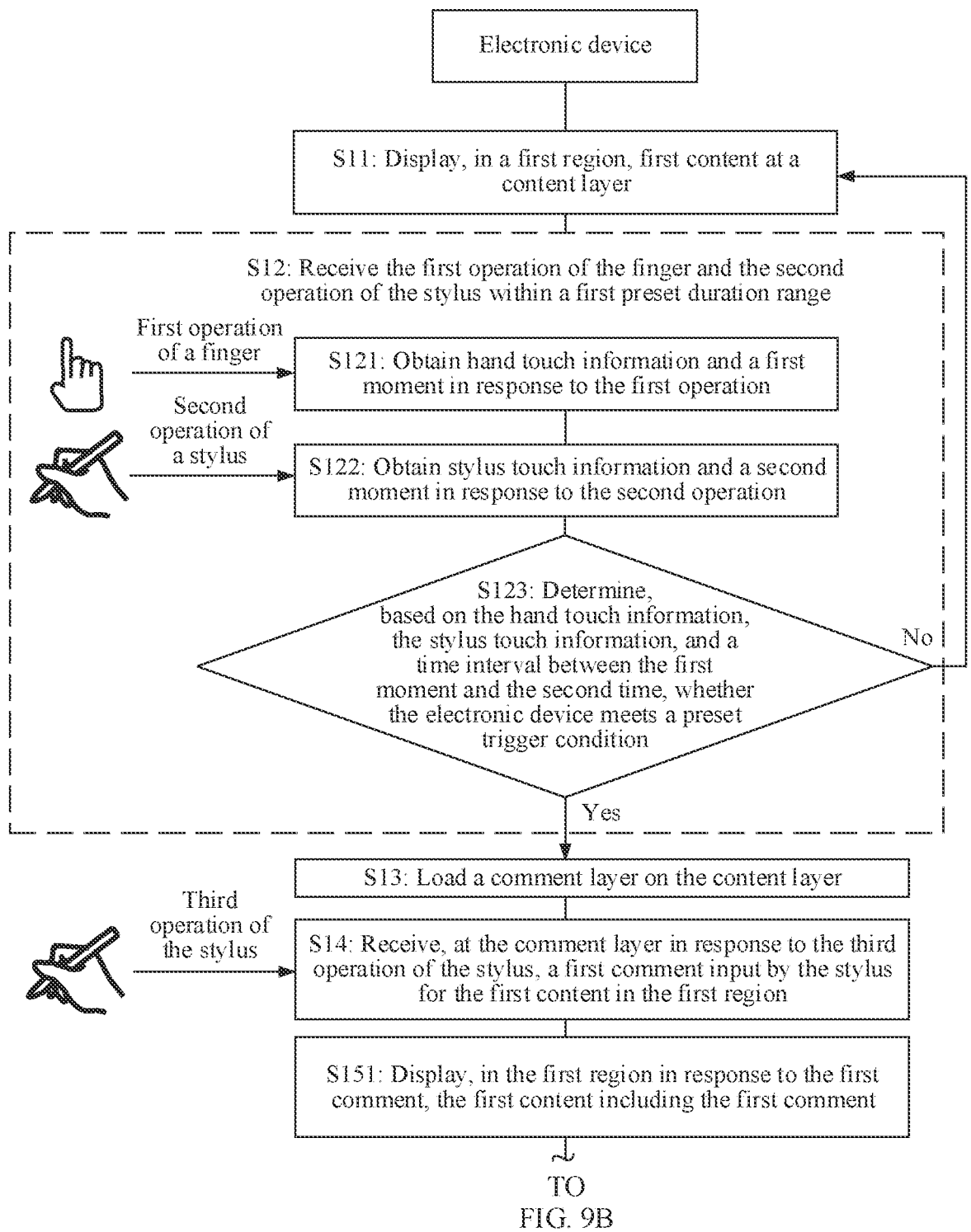
FIG. 9A and FIG. 9B are a schematic flowchart of a comment adding method according to an embodiment of this application.
Figure 9B:
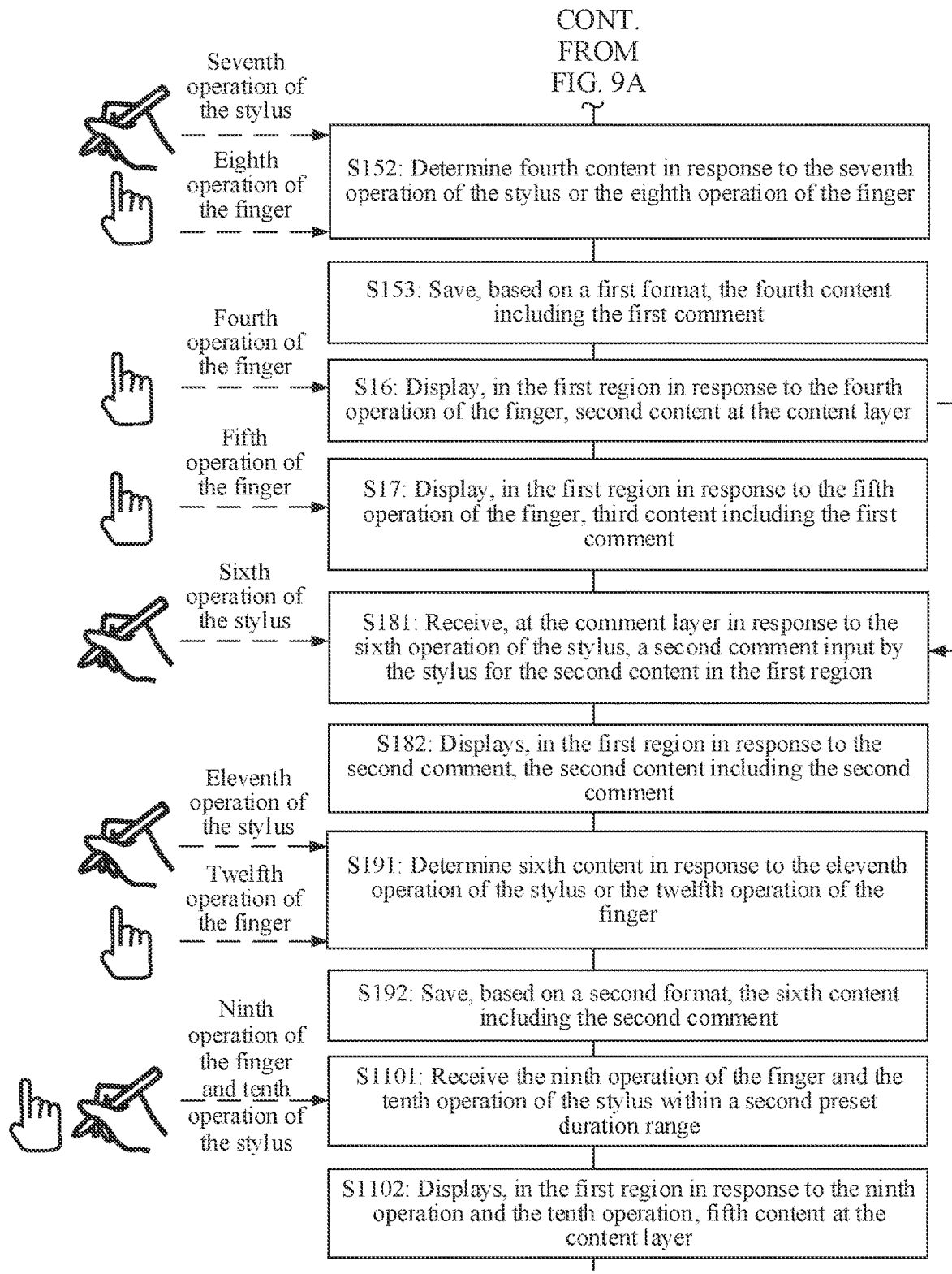

Based on the foregoing descriptions and with reference to FIG. 9A and FIG. 9B, the comment adding method provided in this application is described in detail.

FIG. 9A and FIG. 9B are a schematic flowchart of the comment adding method according to an embodiment of this application. As shown in FIG. 9A and FIG. 9B, the comment adding method in this application may include the following steps.

S11: An electronic device displays, in a first region, first content at a content layer.

It may be understood that a display may include a display region and a non-display region, or the entire display may be a display region. The first region is any region that can be displayed on the display. To be specific, the first region may be any part of the display region, or may be the entire display region. This is not limited in this application. In this way, the electronic device may display the first content at the content layer in a part or all of the display region of the display.

The content layer is configured to store content that can be displayed on the display of the electronic device. For specific implementations of the content layer and the first content and a specific implementation of displaying the first content by the electronic device, refer to the foregoing descriptions. Details are not described herein again.

S12: The electronic device receives a first operation of a finger and a second operation of a stylus within a first preset duration range.

For the first preset duration range, refer to the foregoing description of the preset duration range. Details are not described herein again.

The first operation and the second operation may include but are not limited to operations such as tapping, double tapping, touching and holding, and sliding. For example, the first operation of the finger may be pressing the display by fingers whose quantity is greater than or equal to a preset quantity. The second operation of the stylus may be that touch pressure of the stylus is greater than or equal to preset pressure, and touch duration of the stylus is greater than or equal to preset duration. In addition, a hand of the finger performing the first operation and a hand using the stylus may be a same hand of a user, or may be different hands of the user. This is not limited in this application.

In a feasible implementation of step S12, a specific implementation process in which the electronic device receives the first operation of the finger and the second operation of the stylus within the first preset duration range may include steps S121 to S123.

S121: The electronic device obtains hand touch information and a first moment in response to the first operation of the finger. The first moment is a moment at which the electronic device obtains the hand touch information.

S122: The electronic device obtains stylus touch information and a second moment in response to the second operation of the stylus. The second moment is a moment at which the electronic device obtains the stylus touch information.

The electronic device may detect, by using a touch sensor and a pressure sensor, a signal generated when the finger touches the display and a signal generated when the stylus touches the display.

A touch control chip of the electronic device processes the received signal generated when the finger touches the display and the received signal generated when the stylus touches the display into the hand touch information and the stylus touch information, obtains a first moment and a second moment, and calculates a time interval between the first moment and the second time.

It should be noted that this application is not limited to the foregoing implementations. In addition, the touch control chip of the electronic device may alternatively transmit, to an application processor of the electronic device, the signal generated when the finger touches the display and the signal generated when the stylus touches the display. Then, the application processor processes the signal generated when the finger touches the display and the signal generated when the stylus touches the display into the hand touch information and the stylus touch information, and obtains the time interval between the first moment and the second moment.

For specific implementations of the hand touch information and the stylus touch information, refer to the foregoing descriptions. For the first moment, refer to the description of the moment at which the hand touch information is obtained. For the second moment, refer to the description of the moment at which the stylus touch information is obtained. Details are not described herein again. In addition, for a specific implementation process in which the electronic device obtains the hand touch information and the first moment and a specific implementation process in which the electronic device obtains the stylus touch information and the second moment, refer to the foregoing descriptions, and details are not described herein again.

It should be noted that a sequence of steps S121 and S122 is not limited in this application.

S123: The electronic device determines, based on the hand touch information, the stylus touch information, and the time interval between the first moment and the second time, whether the electronic device meets a preset trigger condition, to determine whether the electronic device enters a comment mode.

The touch control chip of the electronic device may determine, based on the hand touch information, the stylus touch information, and the time interval between the first moment and the second moment, whether the electronic device meets the preset trigger condition, that is, determine whether the electronic device enters the comment mode.

For a specific implementation of the time interval between the first moment and the second time, refer to the description of the time interval between the moment at which the hand touch information is obtained and the moment at which the stylus touch information is obtained. For details of the preset trigger condition, refer to the foregoing description. For a specific implementation process in which the electronic device determines whether the preset trigger condition is met, refer to the description shown in the embodiment in FIG. 2B. Details are not described herein again.

If the preset trigger condition is met, step S13 is performed. If the preset trigger condition is not met, step S11 is performed. To be specific, when the electronic device determines that the electronic device cannot enter the comment mode, the first content continues to be displayed on the display of the electronic device, and content corresponding to a moving track formed by the stylus on the display cannot be displayed.

S13: The electronic device loads a comment layer on the content layer. The comment layer is configured to receive the content corresponding to the moving track formed by the stylus on the display.

When determining that the electronic device meets the preset trigger condition, the touch control chip of the electronic device may send a first instruction to the application processor, where the first instruction is used to notify the application processor. After receiving the first instruction, the application processor may load a comment layer on the content layer by invoking a window manager. For a specific implementation of the comment layer, refer to the foregoing description. For the electronic device loading the comment layer on the content layer, refer to the foregoing description. Details are not described herein again.

In addition, the application processor may further configure a toolbar on displayed content in a floating manner by invoking a view system. The application processor sends an instruction used to form the toolbar to a GPU, and the GPU processes data used to form an icon of the toolbar into data used to display the icon of the toolbar, and sends the data used to display the icon of the toolbar to the display, so that the display can display the icon of the toolbar. Therefore, it is convenient for a user to learn in time that the electronic device enters the comment mode and process comment content by using each function in the toolbar.

In this way, regardless of any content displayed on the electronic device, the electronic device may receive and display the comment content in response to a touch of the finger and a touch of the stylus, where a time interval between the two touches is within a first preset duration range, to implement a comment function of the electronic device, without any requirement on the displayed content, without considering whether an application corresponding to the displayed content supports the comment function, and without adding an adapted interface to the application to receive the comment content, thereby enriching use scenarios corresponding to the comment function of the electronic device, and improving user experience.

In a possible design, that the electronic device loads the comment layer on the content layer in response to the first operation and the second operation includes: The electronic device loads the comment layer on the content layer when any one of the following conditions is met: a quantity of fingers is greater than or equal to a preset quantity, the touch pressure of the stylus is greater than or equal to the preset pressure, and the touch duration of the stylus is greater than or equal to the preset duration; a distance between a touch position of the finger and a touch position of the stylus is less than or equal to a first preset distance; a quantity of fingers is greater than or equal to a preset quantity, the touch pressure of the stylus is greater than or equal to the preset pressure, the touch duration of the stylus is greater than or equal to the preset duration, and a distance between a touch position of the finger and a touch position of the stylus is less than or equal to a first preset distance; or a quantity of fingers is greater than or equal to a preset quantity, the touch pressure of the stylus is greater than or equal to the preset pressure, the touch duration of the stylus is greater than or equal to the preset duration, and a distance between different fingers is less than or equal to a second preset distance. In this way, through cooperation between the finger and the stylus, not only the comment function of the electronic device is accurately triggered, but also a problem that the comment function of the electronic device is triggered due to an accidental touch operation of the user can be avoided, thereby improving user experience.

S14: The electronic device receives, at the comment layer in response to a third operation of the stylus, a first comment input by the stylus for the first content in the first region.

The third operation may be understood as an operation corresponding to the moving track formed by the user on the display by using the stylus, for example, content such as a handwritten text, a letter, a pattern, a symbol, and a line.

S151: The electronic device displays, in the first region in response to the first comment, the first content including the first comment, where a display position of the first content in the first region remains unchanged.

The touch sensor of the electronic device detects the signal generated when the user touches the display by using the stylus, and sends, to the touch control chip, the signal generated when the stylus touches the display. The touch control chip determines, based on the signal generated when the stylus touches the display, the moving track formed by the stylus on the display, and sends the moving track formed by the stylus on the display to the application processor.

The application processor recognizes the moving track formed by the stylus on the display to obtain the first comment and a correspondence between the first comment and the first content (for example, represented by using a position of the first comment on the first content), transmits the first comment to the comment layer, and stores the first comment and the correspondence between the first comment and the first content in a stylus service cache module, so that the electronic device can display displayed content including the first comment to the user.

Because the comment layer covers the content layer, the electronic device may display, in the first region through the GPU and the display of the electronic device, the first content including the first comment, and the position of the first content in the first region remains unchanged. That the position remains unchanged herein may be understood as that a position, in the first region, that corresponds to any content in the first content does not change. For example, a pattern formed by the first content is not zoomed out or zoomed in, and a display position of the first content in the first region in step S151 is consistent with that in the entire process of steps S11 to S14.

For specific implementations of the first comment, the correspondence between the first comment and the first content, and the stylus service cache module, refer to the foregoing descriptions. Details are not described herein again. It should be noted that, for an implementation process of step S151, refer to the foregoing example description of the interface shown in FIG. 5E.

After step S151, the user may further save the first comment displayed on the electronic device. For a specific implementation process, refer to steps S152 and S153. The comment layer is further configured to store the correspondence between the first comment and the first content, and the content layer is further configured to store a correspondence between the first content and content at the content layer.

S152: The electronic device determines fourth content in response to a seventh operation of the stylus or an eighth operation of the finger based on the correspondence between the first comment and the first content and the correspondence between the first content and the content at the content layer, where the fourth content at least partially overlaps the first content.

The seventh operation and the eighth operation may include but are not limited to operations such as tapping, double tapping, touching and holding, and sliding. Fax example, the seventh operation may be tapping, by the stylus, a control that is on the display and that is configured to save the first comment. The eighth operation may be an operation of tapping, by the finger, the control that is on the display and that is configured to save the first comment, or pressing, by the finger, a space region other than the control on the display, or the like.

S153: The electronic device saves, based on a first format, the fourth content including the first comment, where the first format is related to the seventh operation or the eighth operation.

After the electronic device receives the first comment, when the user wants to save the first comment, the electronic device responds to an operation that is performed by the user by using the stylus or the finger and that is used to save the first comment. For example, the user may tap a save control in the toolbar. In this case, the application processor obtains the first comment and the correspondence between the first comment and the first content from a memory of the electronic device, obtains a position of the first comment in the displayed content based on the correspondence between the first comment and the first content and a position of the first content in the displayed content, and determines, based on the position of the first comment in the displayed content, content that is in the displayed content and that is jointly saved with the first comment, namely, the fourth content.

Therefore, based on an intention of the user, the electronic device uses a picture format, a PDF, a TXT format, or the like to save the first comment and the content that is in the displayed content and that is jointly saved with the first comment, for example, in a folder, a gallery, or a note of the electronic device, so that the user can find the first comment from the folder, the gallery, or the note for browsing and editing. For a saving format and a saving policy of the first comment and the content that is in the displayed content and that is jointly saved with the first comment, refer to the foregoing descriptions, and details are not described herein again.

In this way, based on an intention of the user, the electronic device may use any one of the foregoing saving formats to save the displayed content including the comment content in a folder, a gallery, or a note, so that the user can browse and/or edit the first comment again in the folder, the gallery, or the note.

That the first format is related to the seventh operation or the eighth operation may be understood as follows: When receiving the seventh operation or the eighth operation, the electronic device may save the first comment and the fourth content in a default saving manner. Alternatively, the electronic device saves the first comment and the fourth content based on a saving manner corresponding to the seventh operation or the eighth operation.

It should be noted that steps S152 and S153 are optional steps.

SIC: The electronic device displays, in the first region in response to a fourth operation of the finger, second content at the content layer, where the second content and the first content are continuous, and the first comment is not displayed in the first region.

When the user continues to browse the remaining content of the displayed content, the electronic device displays, on the display, the second content at the content layer in response to the fourth operation that is performed by the finger and that is used to indicate continuing to browse the displayed content, for example, a sliding operation performed by the finger along a first direction on the display, a tap operation performed by the finger on a next-page operation button, or a drag operation performed by the finger on a backward-dragging fast-forward operation button.

The fourth operation may include but is not limited to operations such as tapping, double tapping, touching and holding, and sliding. The fourth operation is used to indicate continuing to browse content related to the first content. A specific implementation of the fourth operation is not limited in this application. In addition, for a specific implementation of the second content, refer to the foregoing description. It may be understood that the first content is related to the second content. In some embodiments, the first content and the second content are continuous, for example, the first content and the second content partially overlap; or positions of the first content and the second content are adjacent, and there is no content overlapping. In some other embodiments, positions of the first content and the second content are not adjacent, and there is no content overlapping. The third content and the first content may fully overlap, or may partially overlap, provided that the first comment is displayed when the third content is displayed on the display.

A specific direction of the first direction is not limited in this application, and may be a length direction or a width direction of the electronic device. It should be noted that, for an implementation process of step S16, refer to the foregoing description of the example in which the interface shown in FIG. 5F is changed to the interface shown in FIG. 5G.

S17: The electronic device displays, in the first region in response to a fifth operation of the finger, third content including the first comment, where the third content is content at the content layer, and the third content at least partially overlaps the first content.

When the user wants to replay and/or re-edit the first comment, the electronic device displays, on the display, the third content at the content layer and the first comment at the comment layer in response to the fifth operation performed by the finger for replaying the first comment, for example, a sliding operation performed by the finger along a second direction on the display, a tap operation performed by the finger on a previous-page operation button, or a drag operation performed by the finger on a forward-dragging fast-forward operation button. In this way, it is convenient for the user to replay and/or re-edit the first comment.

The fifth operation may include but is not limited to operations such as tapping, double tapping, touching and holding, and sliding. The fifth operation is used to indicate obtaining the first comment. A specific implementation of the fifth operation is not limited in this application.

For example, when the fourth operation is the sliding operation performed by the finger along the first direction on the display, the fifth operation is the sliding operation performed by the finger along the second direction on the display. Specific directions of the first direction and the second direction are not limited in this application, and the first direction and the second direction are opposite directions.

For another example, when the fourth operation is the tap operation performed by the finger on the next-page operation button, the fifth operation is the tap operation performed by the finger on the previous-page operation button. Alternatively, when the fourth operation is the tap operation performed by the finger on the previous-page operation button, the fifth operation is the tap operation performed by the finger on the next-page operation button. The tap operation may be N taps, where N is a positive integer.

For another example, when the fourth operation is the drag operation performed by the finger on the backward-dragging fast-forward operation button, the fifth operation is the drag operation performed by the finger on the forward-dragging fast-forward operation button. Alternatively, when the fourth operation is the drag operation performed by the finger on the forward-dragging fast-forward operation button, the fifth operation is the drag operation performed by the finger on the backward-dragging fast-forward operation button.

For a specific implementation of the second content, refer to the foregoing description. Details are not described herein again.

It should be noted that step S17 is an optional step. For an implementation process of step S17, refer to the foregoing description of the example in which the interface shown in FIG. 5I is changed to the interface shown in FIG. 5J.

In this application, the electronic device may display the content (for example, the second content) related to the first content in response to an operation of the finger, so that the user can continue to browse the content related to the first content. In this way, when the electronic device implements a task procedure of the comment function, a task procedure corresponding to the content currently displayed on the electronic device is not interrupted. In addition, in response to the operation of the finger, the electronic device may further display, from the content related to the first content, the third content including the first comment, so that the user can continue to browse and/or edit the first comment. In this way, when the electronic device implements a task procedure corresponding to content displaying, the task procedure of implementing the comment function by the electronic device is not interrupted. In this way, not only the electronic device can implement the task procedure corresponding to content displaying and the task procedure for implementing the comment function at the same time, but also the two task procedures do not affect each other, so that the content can be continuously displayed and the comment can be replayed and/or re-edited, thereby helping improve user experience.

In some embodiments, the comment layer is further configured to store the correspondence between the first comment and the first content, and the content layer is further configured to store a correspondence between the third content and the first content. Specifically, the electronic device may determine, based on h correspondence between the first comment and the first content and the correspondence between the third content and the first content, a first position of the first comment in the third content, display the third content in the first region, and display the first comment at the first position in the third content. In this way, the electronic device determines, in a timely and accurate manner based on a position change corresponding to the operation of the finger, the third content that needs to be displayed on the display, and can accurately determine the position of the first comment in the third content based on a binding between the first comment and the first content and a correspondence between the first content and the second content, so that the user can replay the first comment.

A specific implementation of content displayed in the first region is not limited in this application. In some embodiments, a type of the content displayed in the first region includes any one of a video, a web page, a picture, a document, or an interface. In this way, the electronic device can implement the comment function without being limited to the type of the content displayed in the first region. In addition, the electronic device is also limited to an application corresponding to the content displayed in the first region, and the electronic device can implement the comment function regardless of whether the application supports the comment function.

When the type of the content displayed in the first region is the web page, the correspondence between the first comment and the first content is a position of the first content on a web page on which the first content is located, or a position relationship between the first content and content other than the first content on the web page on which the first content is located. In this way, the electronic device may hind the first comment to the first content in a plurality of implementations, so that the user can replay the first comment.

After step S16, the user may further continue to comment the displayed content on the electronic device. For a specific implementation process, refer to steps S181 and S182.

S181: The electronic device receives, at the comment layer in response to a sixth operation of the stylus, a second comment input by the stylus for the second content in the first region.

S182: The electronic device displays, in the first region in response to the second comment, the second content including the second comment, where a display position of the second content in the first region remains unchanged.

The sixth operation may be understood as an operation corresponding to the moving track formed by the user on the display by using the stylus, for example, content such as a handwritten text, a letter, a pattern, a symbol, and a line. In addition, the sixth operation may be the same as or different from the third operation. This is not limited in this application. In addition, for specific implementations of the second comment and a correspondence between the second comment and the second content, refer to the foregoing descriptions. Details are not described herein again.

After the electronic device displays, in the first region, the second content at the content layer, the touch sensor of the electronic device detects a signal generated when the user touches the display by using the stylus, and sends the signal generated when the stylus touches the display to the touch control chip. The touch control chip determines, based on the signal generated when the stylus touches the display, a moving track formed by the stylus on the display, and sends the moving track formed by the stylus on the display to the application processor.

The application processor recognizes the moving track formed by the stylus on the display to obtain the second comment and the correspondence between the second comment and the second content (for example, represented by using a position of the second comment on the second content), transmits the second comment to the comment layer, and stores the second comment or the second comment and the correspondence between the second comment and the second content in the stylus service cache module, so that the electronic device can display displayed content including the second comment to the user. Because the comment layer covers the content layer, the electronic device may display, in the first region through the GPU and the display of the electronic device, the second content including the second comment, and the position of the second content in the first region remains unchanged. That the position remains unchanged herein may be understood as that a position, in the first region, that corresponds to any content in the second content does not change. For example, a pattern formed by the second content is not zoomed out or zoomed in, and a display position of the second content in the first region in steps S181 and S182 is consistent with that in step S16.

It should be noted that steps S181 and S182 are optional steps. For an implementation process of steps S181 and S182, refer to the foregoing description of the example in which the interface shown in FIG. 5G is changed to the interface shown in FIG. 5H.

In conclusion, on a basis that the comment layer is loaded on the content layer, the electronic device continues to receive a comment at the comment layer, to implement a function of adding a comment to the displayed content, thereby helping meet a user requirement of adding a plurality of comments.

After step S182, the user may further save the second comment displayed on the electronic device. For a specific implementation process, refer to steps S191 and S192. The comment layer is further configured to store the correspondence between the second comment and the second content, and the content layer is further configured to store a correspondence between the second content and content at the content layer.

The electronic device determines sixth content in response to an eleventh operation of the stylus or a twelfth operation of the finger based on the correspondence between the second comment and the second content and the correspondence between the second content and the content at the content layer, where the sixth content at least partially overlaps the second content.

The eleventh operation and the twelfth operation may include but are not limited to operations such as tapping, double tapping, touching and holding, and sliding. For example, the eleventh operation may be tapping, by the stylus, a control that is on the display and that is configured to save the second comment. The twelfth operation may be an operation of tapping, by the finger, the control that is on the display and that is configured to save the second comment, or pressing, by the finger, a space region other than the control on the display, or the like.

S192: The electronic device saves, based on a second format, the sixth content including the second comment, where the second format is related to the eleventh operation or the twelfth operation.

After the electronic device receives the second comment, in response to an operation of saving the second comment performed by the user by using the stylus, the electronic device saves displayed content including the second comment, or saves displayed content including the first comment and the second comment, or separately saves displayed content including the first comment and displayed content including the second comment.

When the user wants to save the second comment, the electronic device responds to the operation of saving the second comment performed by the user by using the stylus. For example, the user may tap the save control in the toolbar. In this case, the application processor obtains the second comment and the correspondence between the second comment and the second content, or the first comment, the correspondence between the first comment and the first content, the second comment, and the correspondence between the second comment and the second content from the memory.

In some embodiments, the application processor obtains a position of the second comment in the displayed content based on the correspondence between the second comment and the second content and a position of the second content in the displayed content, and determines, based on the position of the second comment in the displayed content, content that is in the displayed content and that is jointly saved with the second comment, namely, the sixth content.

Therefore, based on an intention of the user, the electronic device uses the second format such as a picture format, a PDF, or a TXT format to save the second comment and the content that is in the displayed content and that is jointly saved with the second comment, for example, in a folder, a gallery, or a note of the electronic device, so that the user can find the second comment from the folder, the gallery, or the note for browsing and editing. For a saving format and a saving policy of the second comment and the content that is in the displayed content and that is jointly saved with the second comment, refer to the foregoing descriptions, and details are not described herein again.

In some other embodiments, the application processor may alternatively determine, based on the correspondence between the second comment and the second content and a position of the second content in the displayed content, content that is in the displayed content and that is jointly saved with the second comment, and determine, based on the correspondence between the first comment and the first content and a position of the first content in the displayed content, content that is in the displayed content and that is jointly saved with the first comment.

Therefore, based on an intention of the user, the electronic device uses the second format such as a picture format, a PDF, or a TXT format to separately save the second comment and the content that is in the displayed content and that is jointly saved with the second comment and the first comment and the content that is in the displayed content and that is jointly saved with the first comment, for example, in a folder, a gallery, or a note of the electronic device, so that the user can find the second comment and the first comment from the folder, the gallery, or the note for browsing and editing.

In some other embodiments, the application processor may alternatively determine, based on the correspondence between the second comment and the second content, a position of the second content in the displayed content, the correspondence between the first comment and the first content, and a position of the first content in the displayed content, content that is in the displayed content and that is jointly saved with the first comment and the second comment.

Therefore, based on an intention of the user, the electronic device uses the second format such as a picture format, a PDF, or a TXT format to separately save the first comment, the second comment, and the content that is in the displayed content and that is jointly saved with the first comment and the second comment, for example, in a folder, a gallery, or a note of the electronic device, so that the user can find the second comment and the first comment from the folder, the gallery, or the note for browsing and editing.

In this way, based on an intention of the user, the electronic device may use any one of the foregoing saving formats to save the displayed content including the comment content in a folder, a gallery, or a note, so that the user can browse and/or edit the first comment again in the folder, the gallery, or the note.

That the second format is related to the eleventh operation or the twelfth operation may be understood as follows: When receiving the eleventh operation or the twelfth operation, the electronic device may save the second comment and the sixth content in a default saving mariner. Alternatively, the electronic device saves the second comment and the sixth content based on a saving manner corresponding to the eleventh operation or the twelfth operation.

It should be noted that steps S191 and S192 are optional steps. For an implementation process of steps S191 and S192, refer to the foregoing example descriptions of the embodiments shown in FIG. 5K, FIG. 5L, and FIG. 5N.

S1101: The electronic device receives a ninth operation of the finger and a tenth operation of the stylus within a second preset duration range.

S1102: The electronic device displays, in the first region in response to the ninth operation and the tenth operation, fifth content at the content layer, where the fifth content is content displayed before the electronic device responds to the ninth operation and the tenth operation.

A specific size of the second preset duration range is not limited in this application. The second preset duration range may be the same as or different from the first preset duration range. The ninth operation and the tenth operation may include but are not limited to operations such as tapping, double tapping, touching and holding, and sliding. For example, the ninth operation of the finger may be pressing the display by fingers whose quantity is greater than or equal to the preset quantity. The tenth operation of the stylus may be that the touch pressure of the stylus is greater than or equal to the preset pressure, and the touch duration of the stylus is greater than or equal to the preset duration. In addition, a hand of the finger performing the ninth operation and the hand using the stylus may be a same hand of the user, or may be different hands of the user. This is not limited in this application.

It should be noted that, this application is not limited to provide the comment function of the electronic device for the user in the foregoing implementations. For example, the user may tap, by using the finger, a control that is on the display and that is used to implement the foregoing process.

In this application, at any comment when the electronic device enters the comment mode, the electronic device no longer displays, in response to an operation of the user, the content (namely, the comment content) corresponding to the moving track formed by the stylus on the display. For example, the electronic device cannot receive the moving track formed by the user on the display by using the stylus, or does not display the content corresponding to the recognized moving track formed by the stylus on the display. In addition, the fifth content at the content layer may be displayed on the display of the electronic device.

In some embodiments, the electronic device deletes content from the comment layer when a preset release condition is met. In this way, storage space corresponding to the comment layer is moved for other use, thereby helping reduce storage space of the electronic device and improve a processing rate of the electronic device. For a specific implementation of the release condition, refer to the foregoing description. Details are not described herein again.

The fifth content may be understood as content displayed on the electronic device before the electronic device responds to an operation of not displaying the comment content performed by the user, and may be the first content, the second content, the third content, or other content in the displayed content. This is not limited in this application.

It should be noted that, for an implementation process of steps S1101 and S1102, refer to the foregoing example descriptions.

For example, this application provides an electronic device.

Figure 10:
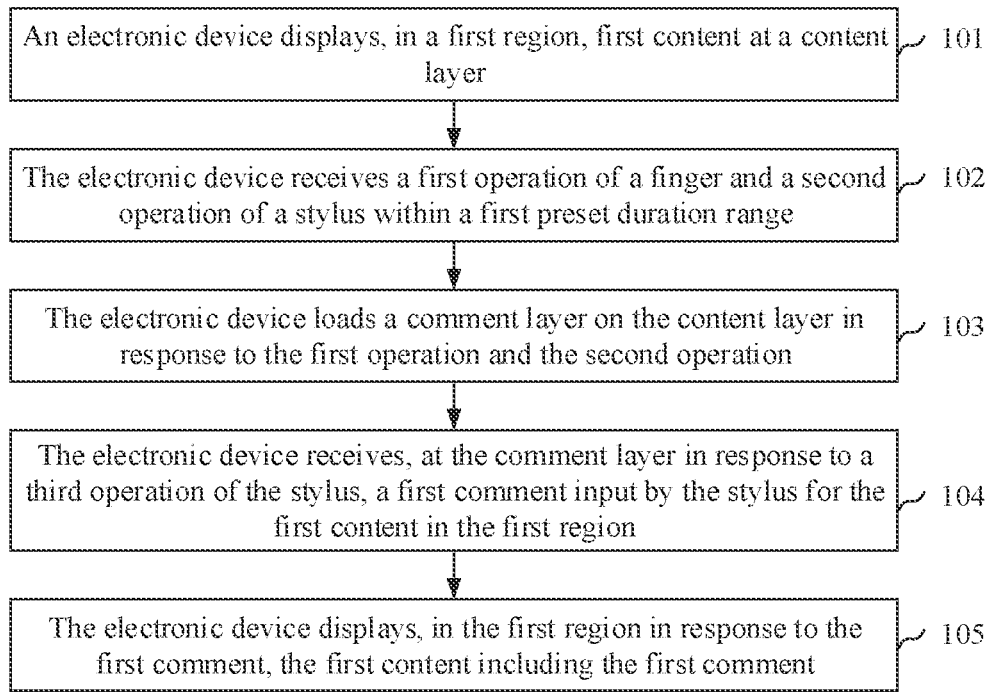
FIG. 10 is a schematic flowchart of a comment adding method according to an embodiment of phis application.

FIG. 10 is a schematic flowchart of the comment adding method according to an embodiment of this application. As shown in FIG. 10, the comment adding method in this application may include the following steps.

S101: The electronic device displays, in a first region, first content at a content layer, where the content layer is configured to store content that can be displayed on a display of the electronic device, and the first region is any region that can be displayed on the display.

For step S101, refer to the description of step S11 in the embodiment shown in FIG. 9A. Details are not described herein again.

S102: The electronic device receives a first operation of a finger and a second operation of a stylus within a first preset duration range.

For step S102, refer to the descriptions of steps S12 and S121 to S123 in the embodiment shown in FIG. 9A. Details are not described herein again.

S103: The electronic device loads a comment layer on the content layer in response to the first operation and the second operation, where the comment layer is configured to receive content corresponding to a moving track formed by the stylus on the display.

For step S103, refer to the description of step S13 in the embodiment shown in FIG. 9A. Details are not described herein again.

S104: The electronic device receives, at the comment layer in response to a third operation of the stylus, a first comment input by the stylus for the first content in the first region.

For step S104, refer to the description of step S14 in the embodiment shown in FIG. 9A. Details are not described herein again.

S105: The electronic device displays, in the first region in response to the first comment, the first content including the first comment, where a display position of the first content in the first region remains unchanged.

For step S105, refer to the description of step S151 in the embodiment shown in FIG. 9A. Details are not described herein again.

In some embodiments, the method further includes: The electronic device displays, in the first region in response to a fourth operation of the finger, second content at the content layer, where the second content and the first content are continuous, and the first comment is not displayed in the first region. The electronic device displays, in the first region in response to a fifth operation of the finger, third content including the first comment, where the third content is content at the content layer, and the third content at least partially overlaps the first content.

In some embodiments, the comment layer is further configured to store a correspondence between the first comment and the first content, and the content layer is further configured to store a correspondence between the third content and the first content. That the electronic device displays, in the first region, third content including the first comment includes: The electronic device determines a first position of the first comment in the third content based on the correspondence between the first comment and the first content and the correspondence between the third content and the first content, display the third content in the first region, and display the first comment at the first position in the third content.

In some embodiments, a type of content displayed in the first region includes any one of a video, a web page, a picture, a document, or an interface.

In some embodiments, when the type of the content displayed in the first region is the web page, the correspondence between the first comment and the first content is a position of the first content on a web page on which the first content is located, or a position relationship between the first content and content other than the first content on the web page on which the first content is located.

For the foregoing process, refer to the descriptions of steps S16 and S17 in the embodiment shown in FIG. 9B. Details are not described herein again.

In some embodiments, after the electronic device displays, in the first region, the second content at the content layer, the method further includes: The electronic device receives, at the comment layer in response to a sixth operation of the stylus, a second comment input by the stylus for the second content in the first region. The electronic device displays, in the first region in response to the second comment, the second content including the second comment, where a display position of the second content in the first region remains unchanged.

For the foregoing process, refer to the descriptions of steps S181 and S182 in the embodiment shown in FIG. 9B. Details are not described herein again.

In some embodiments, the method includes: The electronic device loads the comment layer on the content layer when a preset trigger condition is met. The preset trigger condition includes any one of the following: a quantity of fingers is greater than or equal to a preset quantity, touch pressure of the stylus is greater than or equal to preset pressure, and touch duration of the stylus is greater than or equal to preset duration; a distance between a touch position of the finger and a touch position of the stylus is less than or equal to a first preset distance; a quantity of fingers is greater than or equal to a preset quantity, touch pressure of the stylus is greater than or equal to preset pressure, touch duration of the stylus is greater than or equal to preset duration, and a distance between a touch position of the finger and a touch position of the stylus is less than or equal to a first preset distance; or a quantity of fingers is greater than or equal to a preset quantity, touch pressure of the stylus is greater than or equal to preset pressure, touch duration of the stylus is greater than preset duration, and a distance between different fingers is less than or equal to a second preset distance.

In some embodiments, the comment layer is further configured to store the correspondence between the first comment and the first content, and the content layer is further configured to store a correspondence between the first content and content at the content layer. After the electronic device receives the first comment, the method further includes: The electronic device determines, in response to a seventh operation of the stylus or an eighth operation of the finger, fourth content at the content layer based on the correspondence between the first comment and the first content and the correspondence between the first content and the content at the content layer, where the fourth content at least partially overlaps the first content. The electronic device saves, based on a first format, the fourth content including the first comment, where the first format is related to the seventh operation or the eighth operation.

In some embodiments, the first format includes any one of a picture format, a portable document format PDF, or a text document TXT format.

For the foregoing process, refer to the descriptions of steps S152 and S153 in the embodiment shown in FIG. 9A. Details are not described herein again.

In some embodiments, the comment layer is further configured to store a correspondence between the second comment and the second content, and the content layer is further configured to store a correspondence between the second content and the content at the content layer. After the electronic device receives the second comment, the method further includes: The electronic device determines, in response to an eleventh operation of the stylus or a twelfth operation of the finger, sixth content based on the correspondence between the second comment and the second content and the correspondence between the second content and the content at the content layer, where the sixth content at least partially overlaps the second content. The electronic device saves, based on a second format, the sixth content including the second comment, where the second format is related to the eleventh operation or the twelfth operation.

In some embodiments, the second format includes any one of the picture format, the portable document format PDF, or the text document TXT format.

For the foregoing process, refer to the descriptions of steps S191 and S192 in the embodiment shown in FIG. 9B. Details are not described herein again.

In some embodiments, after the electronic device loads the comment layer on the content layer, the method further includes: The electronic device receives a ninth operation of the finger and a tenth operation of the stylus within a second preset duration range. The electronic device displays, in the first region in response to the ninth operation and the tenth operation, fifth content at the content layer, where the fifth content is content displayed on the electronic device before the ninth operation and the tenth operation.

In some embodiments, the method further includes: The electronic device deletes content from the comment layer when a preset release condition is met.

For the foregoing process, refer to the descriptions of steps S1101 and S1102 in the embodiment shown in FIG. 9B. Details are not described herein again.

According to the comment adding method provided in this application, through cooperation between the finger and the stylus and based on hand touch information, stylus touch information, and a time interval for separately obtaining the hand touch information and the stylus touch information, the electronic device is quickly triggered to quickly provide a comment function for a user, so that the electronic device can add and display comment content in time, and the electronic device can complete interaction with a comment operation of the user when displaying any content. In this way, operation steps of the user are reduced, and a task procedure corresponding to content currently displayed on the electronic device does not need to be interrupted. In addition, an accidental touch during an operation of the user is prevented, application scenarios of the stylus are enriched, and user experience is improved. Moreover, the comment function of the electronic device can be implemented regardless of whether an application corresponding to the content currently displayed on the electronic device supports the comment function. In addition, based on an intention of the user, the electronic device in this application may further use a saying format such as a picture format, a PDF, or a TXT format to save the displayed content including the comment content in a folder, a gallery, or a note of the electronic device, so that the user can browse and/or edit the comment content again in the folder, the gallery, or the note.

For example, this application provides a communication apparatus. The communication apparatus in this application is configured to implement an operation corresponding to hardware and/or software of the electronic device in any one of the foregoing method embodiments. The communication apparatus may include a display manager, a displayed content storage module, a driver module, an input manager, and a window manager. For specific implementations of the display manager, the displayed content storage module, the driver module, the input manager, and the window manager, refer to the foregoing descriptions in FIG. 3. Details are not described herein again.

The display manager is configured to: obtain first content at a content layer from the displayed content storage module, where the content layer is configured to store content that can be displayed on a display electrically connected to the electronic device, and indicate the driver module to drive the display to display the first content in a first region.

The input manager is configured to receive a first instruction, where the first instruction is used to indicate that the electronic device receives a first operation of a finger and a second operation of a stylus within a first preset duration range.

The window manager is configured to load a comment layer on the content layer in response to the first instruction, and create a stylus service cache module, where the comment layer is configured to receive content corresponding to a moving track formed by the stylus on the display, and the stylus service cache module is configured to store content at the comment layer.

The input manager is further configured to receive a second instruction, where the second instruction is used to indicate that the electronic device receives a third operation of the stylus, the second instruction includes a first comment at the comment layer, and the first comment is content input by the stylus for the first content in the first region.

The window manager is further configured to store the first comment in the stylus service cache module in response to the second instruction.

The display manager is further configured to obtain the first comment from the stylus service cache module, and indicate the driver module to drive the display to display the first content including the first comment in the first region. The first region is any region that can be displayed on the display, and a display position of the first content in the first region remains unchanged.

It should be noted that the driver module mentioned herein includes at least the display driver shown in the embodiment in FIG. 3.

In some embodiments, the input manager is further configured to receive a third instruction, where the third instruction is used to indicate that the electronic device receives a fourth operation of the finger. The display manager is further configured to: in response to the third instruction, obtain second content at the content layer from the displayed content storage module, and indicate the driver module to drive the display to display the second content in the first region, where the second content and the first content are continuous, and the first comment is not displayed in the first region. The input manager is further configured to receive a fourth instruction, where the fourth instruction is used to indicate that the electronic device receives a fifth operation of the finger. The display manager is further configured to: in response to the fourth instruction, obtain third content at the content layer from the displayed content storage module, obtain the first comment from the stylus service cache module, and indicate the driver module to drive the display to display the third content including the first comment in the first region, where the third content at least partially overlaps the first content.

It should be noted that the driver module mentioned herein includes at least the display driver shown in the embodiment in FIG. 3.

In some embodiments, the displayed content storage module is further configured to store a correspondence between the third content and the first content. The window manager is further configured to store a correspondence between the first comment and the first content in the stylus service cache module in response to the second instruction. The display manager is specifically configured to: obtain the correspondence between the first comment and the first content from the stylus service cache module, obtain the correspondence between the third content and the first content from the displayed content storage module, determine a first position of the first comment in the third content based on the correspondence between the first comment and the first content and the correspondence between the third content and the first content, obtain the third content from the displayed content storage module, obtain the first comment from the stylus service cache module, and indicate the driver module to drive the display to display the third content in the first region and display the first comment at the first position in the third content.

It should be noted that the driver module mentioned herein includes at least the display driver shown in the embodiment in FIG. 3.

In some embodiments, a type of content displayed in the first region includes any one of a video, a web page, a picture, a document, or an interface.

In some embodiments. When the type of the content displayed in the first region is the web page, the correspondence between the first comment and the first content is a position of the first content on a web page on which the first content is located, or a position relationship between the first content and content other than the first content on the web page on which the first content is located.

In some embodiments, the input manager is further configured to receive a fifth instruction, where the fifth instruction is used to indicate that the electronic device receives a sixth operation of the stylus, the fifth instruction includes a second comment at the comment layer, and the second comment is content input by the stylus for the second content in the first region. The window manager is further configured to store the second comment in the stylus service cache module in response to the fifth instruction. The display manager is further configured to obtain the second comment from the stylus service cache module, and indicate the driver module to drive the display to display the second content including the second comment in the first region. A display position of the second content in the first region remains unchanged.

It should be noted that the driver module mentioned herein includes at least the display driver shown in the embodiment in FIG. 3.

In some embodiments, the first instruction is specifically used to indicate that the first operation of the finger and the second operation of the stylus that are received by the electronic device within the first preset duration range meet a preset trigger condition. The preset trigger condition includes any one of the following: a quantity of fingers is greater than or equal to a preset quantity, touch pressure of the stylus is greater than or equal to preset pressure, and touch duration of the stylus is greater than or equal to preset duration; a distance between a touch position of the finger and a touch position of the stylus is less than or equal to a first preset distance; a quantity of fingers is greater than or equal to a preset quantity, touch pressure of the stylus is greater than or equal to preset pressure, touch duration of the stylus is greater than or equal to preset duration, and a distance between a touch position of the finger and a touch position of the stylus is less than or equal to a first preset distance; or a quantity of fingers is greater than or equal to a preset quantity, touch pressure of the stylus is greater than or equal to preset pressure, touch duration of the stylus is greater than preset duration, and a distance between different fingers is less than or equal to a second preset distance.

In some embodiments, the displayed content storage module is further configured to store a correspondence between the first content and content at the content layer. The window manager is further configured to store the correspondence between the first comment and the first content in the stylus service cache module in response to the second instruction. The input manager is further configured to receive a sixth instruction, where the sixth instruction is used to indicate that the electronic device receives a seventh operation of the stylus or an eighth operation of the finger. A content provider is configured to determine, in response to the sixth instruction, fourth content at the content layer based on the correspondence between the first comment and the first content and the correspondence between the first content and the content at the content layer, where the fourth content at least partially overlaps the first content. The content provider is further configured to obtain the fourth content from the displayed content storage module, obtain the first comment from the stylus service cache module, and indicate the driver module to drive a memory that is electrically connected to the electronic device to save, based on a first format, the fourth content including the first comment, where the first format is related to the seventh operation or the eighth operation.

It should be noted that the driver module mentioned herein includes at least the storage driver shown in the embodiment in FIG. 3.

In some embodiments, the first format includes any one of a picture format, a portable document format PDF, or a text document TXT format.

In some embodiments, the displayed content storage module is further configured to store a correspondence between the second content and the content at the content layer. The window manager is further configured to store the correspondence between the second comment and the second content in the stylus service cache module in response to the fifth instruction. The input manager is further configured to receive an eighth instruction, where the eighth instruction is used to indicate that the electronic device receives an eleventh operation of the stylus or a twelfth operation of the finger. The content provider is configured to determine, in response to the eighth instruction, sixth content at the content layer based on the correspondence between the second comment and the second content and the correspondence between the second content and the content at the content layer, where the sixth content at least partially overlaps the second content. The content provider is further configured to obtain the sixth content from the displayed content storage module, obtain the second comment from the stylus service cache module, and indicate the driver module to drive the memory that is electrically connected to the electronic device to save, based on a second format, the sixth content including the second comment, where the second format is related to the eleventh operation or the twelfth operation.

It should be noted that the driver module mentioned herein includes at least the storage driver shown in the embodiment in FIG. 3.

In some embodiments, the second format includes any one of the picture format, the portable document format PDF, or the text document TXT format.

In some embodiments, the input manager is further configured to receive a seventh instruction, where the seventh instruction is used to indicate that the electronic device receives a ninth operation of the finger and a tenth operation of the stylus within a second preset duration range. The display manager is further configured to: in response to the seventh instruction, obtain fifth content at the content layer from the displayed content storage module, and indicate the driver module to drive the display to display the fifth content in the first region, where the fifth content is content displayed before the electronic device responds to the ninth operation and the tenth operation.

It should be noted that the driver module mentioned herein includes at least the display driver shown in the embodiment in FIG. 3.

In some embodiments, the communication apparatus further includes: the window manager is further configured to: in response to the seventh instruction, when a preset release condition is met, delete content from the comment layer, and delete the stylus service cache module from the content provider.

The communication apparatus provided in this application may be configured to perform the technical solutions of the electronic device in the foregoing embodiments. Implementation principles and technical effects thereof are similar. For implementation operations of the modules, refer to related descriptions in embodiments of the comment adding method. Details are not described herein again. The module herein may alternatively be replaced with a component or a circuit.

For example, this application provides an electronic device, including a display, a sensor, one or more processors, and one or more memories. The electronic device is electrically connected to a stylus, and the stylus is configured to form a moving track on the display. The one or more memories of the electronic device are coupled to the one or more processors. The one or more memories are configured to store computer program code, and the computer program code includes computer instructions. When the one or more processors execute the computer instructions, the electronic device performs the comment adding method in the foregoing embodiments.

For example, this application provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the comment adding method in the foregoing embodiments.

For example, this application provides an electronic device, including the communication apparatus configured to perform the foregoing embodiments.

For example, this application provides a communication system, including a stylus and the electronic device in the foregoing embodiments. The stylus is configured to form a moving track on a display electrically connected to the electronic device.

For example, this application provides a chip system. The chip system is applied to an electronic device including a memory, a display, and a sensor, and the chip system includes one or more interface circuits and one or more processors. The interface circuit and the processor are interconnected through a line. The interface circuit is configured to receive a signal from the memory, and send the signal to the processor. The signal includes computer instructions stored in the memory. When the processor executes the computer instructions, the electronic device performs the comment adding method in the foregoing embodiments.

The chip system may include one chip, or may include a plurality of chips. When the chip system includes a plurality of chips, parameters such as a type and a quantity of the chips are not limited in this application.

For example, this application provides a computer-readable storage medium. The computer-readable storage medium stores instructions, and when the instructions are run on an electronic device, the electronic device is enabled to perform the comment adding method in the foregoing embodiments.

For example, this application provides a computer program product. When the computer program product runs on a computer, the computer is enabled to perform the comment adding method in the foregoing embodiments.

In the foregoing embodiments, all or some of the functions may be implemented by using software, hardware, or a combination of software and hardware. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A comment adding method, comprising:
   displaying, by an electronic device, in a first region, first content at a content layer, wherein the content layer is configured to store content that can be displayed on a display of the electronic device;
   receiving, by the electronic device, a first operation of a finger and a second operation of a stylus within a first preset duration range;
   loading, by the electronic device, a comment layer on the content layer in response to the first operation and the second operation, wherein the comment layer is configured to receive content corresponding to a moving track formed by the stylus on the display;
   receiving, by the electronic device, at the comment layer in response to a third operation of the stylus, a first comment input by the stylus for the first content in the first region;
   displaying, by the electronic device, in the first region in response to the first comment, the first content comprising the first comment, wherein:
   the first region is any region that can be displayed on the display, and a display position of the first content in the first region remains unchanged;
   displaying, by the electronic device, in the first region in response to a fourth operation of the finger, second content at the content layer, wherein the second content and the first content are continuous, and the first comment is not displayed in the first region; and
   displaying, by the electronic device, in the first region in response to a fifth operation of the finger, third content comprising the first comment, wherein the third content is content at the content layer, and the third content at least partially overlaps the first content.

2. The comment adding method according to claim 1, wherein the comment layer is further configured to store a correspondence between the first comment and the first content, and the content layer is further configured to store a correspondence between the third content and the first content; and
   the displaying, by the electronic device, in the first region, third content comprising the first comment comprises:
   determining, by the electronic device based on the correspondence between the first comment and the first content and the correspondence between the third content and the first content, a first position of the first comment in the third content;
   displaying the third content in the first region; and
   displaying the first comment at the first position in the third content.

3. The comment adding method according to claim 1, wherein:
   a type of content displayed in the first region comprises at least one of a video, a web page, a picture, a document, or an interface.

4. The comment adding method according to claim 3, wherein:
   the type of the content displayed in the first region is the web page, and:
   the correspondence between the first comment and the first content is a position of the first content on a web page on which the first content is located, or
   a position relationship between the first content and content other than the first content on the web page on which the first content is located.

5. The comment adding method according to claim 1, wherein after the displaying, by the electronic device, in the first region, second content at the content layer, the method further comprises:
   receiving, by the electronic device, at the comment layer in response to a sixth operation of the stylus, a second comment input by the stylus for the second content in the first region; and
   displaying, by the electronic device, in the first region in response to the second comment, the second content comprising the second comment, wherein:
   a display position of the second content in the first region remains unchanged.

6. The comment adding method according to claim 1, comprising:
   loading, by the electronic device, the comment layer on the content layer wherein a preset trigger condition is met, and wherein:
   the preset trigger condition comprises at least one of the following:

a quantity of fingers is greater than or equal to a preset quantity, a touch pressure of the stylus is greater than or equal to a preset pressure, and a touch duration of the stylus is greater than or equal to a preset duration;

a distance between a touch position of the finger and a touch position of the stylus is less than or equal to a first preset distance;

a quantity of fingers is greater than or equal to a preset quantity, a touch pressure of the stylus is greater than or equal to a preset pressure, a touch duration of the stylus is greater than or equal to a preset duration, and a distance between a touch position of the finger and a touch position of the stylus is less than or equal to a first preset distance; or a quantity of fingers is greater than or equal to a preset quantity, a touch pressure of the stylus is greater than or equal to a preset pressure, a touch duration of the stylus is greater than or equal to a preset duration, and a distance between different fingers is less than or equal to a second preset distance.

7. The comment adding method according to claim 1, wherein the comment layer is further configured to store the correspondence between the first comment and the first content, and the content layer is further configured to store a correspondence between the first content and content at the content layer; and wherein:

after the receiving, by the electronic device, a first comment, the method further comprises:

determining, by the electronic device in response to a seventh operation of the stylus or an eighth operation of the finger, fourth content at the content layer based on the correspondence between the first comment and the first content and the correspondence between the first content and the content at the content layer, wherein the fourth content at least partially overlaps the first content; and saving, by the electronic device based on a first format, the fourth content comprising the first comment, wherein the first format is related to the seventh operation or the eighth operation.

8. The comment adding method according to claim 7, wherein:

the first format comprises any one of a picture format, a portable document format (PDF), or a text document (TXT) format.

9. The comment adding method according to claim 1, wherein after the loading, by the electronic device, the comment layer on the content layer, the method further comprises:

receiving, by the electronic device, a ninth operation of the finger and a tenth operation of the stylus within a second preset duration range; and displaying, by the electronic device, in the first region in response to the ninth operation and the tenth operation, fifth content at the content layer, wherein the fifth content is content displayed before the electronic device responds to the ninth operation and the tenth operation.

10. The comment adding method according to claim 9, wherein the method further comprises:

deleting, by the electronic device, content from the comment layer when a preset release condition is met.

11. A communication terminal, comprising:
at least one processor; and
at least one memory, the at least one memory comprising instructions that when executed by the at least one processor, cause the communication terminal to perform operations comprising:

displaying, by an electronic device, in a first region, first content at a content layer, wherein the content layer is configured to store content that can be displayed on a display of the electronic device;

receiving, a first operation of a finger and a second operation of a stylus within a first preset duration range;

loading, a comment layer on the content layer in response to the first operation and the second operation, wherein the comment layer is configured to receive content corresponding to a moving track formed by the stylus on the display;

receiving, at the comment layer in response to a third operation of the stylus, a first comment input by the stylus for the first content in the first region;

displaying, in the first region in response to the first comment, the first content comprising the first comment, wherein:

the first region is any region that can be displayed on the display, and a display position of the first content in the first region remains unchanged;

displaying, in the first region in response to a fourth operation of the finger, second content at the content layer, wherein the second content and the first content are continuous, and the first comment is not displayed in the first region; and displaying, in the first region in response to a fifth operation of the finger, third content comprising the first comment, wherein the third content is content at the content layer, and the third content at least partially overlaps the first content.

12. The communication terminal according to claim 11, wherein the comment layer is further configured to store a correspondence between the first comment and the first content, and the content layer is further configured to store a correspondence between the third content and the first content; and wherein the operations further comprise:

determining, based on the correspondence between the first comment and the first content and the correspondence between the third content and the first content, a first position of the first comment in the third content;

displaying the third content in the first region; and displaying the first comment at the first position in the third content.

13. The communication terminal according to claim 11, wherein a type of content displayed in the first region comprises at least one of a video, a web page, a picture, a document, or an interface.

14. The communication terminal according to claim 13, wherein the type of the content displayed in the first region is the web page, and:

the correspondence between the first comment and the first content is a position of the first content on a web page on which the first content is located, or a position relationship between the first content and content other than the first content on the web page on which the first content is located.

15. The communication terminal according to claim 11, wherein the operations further comprise:

receiving, at the comment layer in response to a sixth operation of the stylus, a second comment input by the stylus for the second content in the first region; and displaying, in the first region in response to the second comment, the second content comprising the second comment, wherein:
a display position of the second content in the first region remains unchanged.

16. The communication terminal according to claim 11, wherein the operations further comprise:
loading, the comment layer on the content layer, wherein a preset trigger condition is met, and wherein:
the preset trigger condition comprises at least one of the following:
a quantity of fingers is greater than or equal to a preset quantity, a touch pressure of the stylus is greater than or equal to a preset pressure, and a touch duration of the stylus is greater than or equal to a preset duration;
a distance between a touch position of the finger and a touch position of the stylus is less than or equal to a first preset distance;
a quantity of fingers is greater than or equal to a preset quantity, a touch pressure of the stylus is greater than or equal to a preset pressure, a touch duration of the stylus is greater than or equal to a preset duration, and a distance between a touch position of the finger and a touch position of the stylus is less than or equal to a first preset distance; or
a quantity of fingers is greater than or equal to a preset quantity, a touch pressure of the stylus is greater than or equal to a preset pressure, a touch duration of the stylus is greater than or equal to a preset duration, and a distance between different fingers is less than or equal to a second preset distance.

17. The communication terminal according to claim 11, wherein the comment layer is further configured to store the correspondence between the first comment and the first content, and the content layer is further configured to store a correspondence between the first content and content at the content layer; and wherein:
the operations further comprise:
after receiving, by the electronic device, the first comment, determining, in response to a seventh operation of the stylus or an eighth operation of the finger, fourth content at the content layer based on the correspondence between the first comment and the first content and the correspondence between the first content and the content at the content layer, wherein the fourth content at least partially overlaps the first content; and
saving, based on a first format, the fourth content comprising the first comment, wherein the first format is related to the seventh operation or the eighth operation.

18. The communication terminal according to claim 17, wherein the first format comprises any one of a picture format, a portable document format (PDF), or a text document (TXT) format.

19. The communication terminal according to claim 11, wherein after the loading the comment layer on the content layer, the operations further comprise:
receiving a ninth operation of the finger and a tenth operation of the stylus within a second preset duration range; and
displaying in the first region in response to the ninth operation and the tenth operation, fifth content at the content layer, wherein the fifth content is content displayed before the electronic device responds to the ninth operation and the tenth operation.

20. The communication terminal according to claim 19, wherein the operations further comprise:
deleting content from the comment layer when a preset release condition is met.

* * * * *